United States Patent [19]
Watanabe et al.

[11] Patent Number: 5,986,215
[45] Date of Patent: Nov. 16, 1999

[54] SUBMARINE CABLE PROTECTING DEVICE

[75] Inventors: Shuichi Watanabe; Kazuyuki Katogi; Michio Kondo; Taiichi Takeda, all of Kawasaki, Japan

[73] Assignee: Fujitsu Limited, Kanagawa, Japan

[21] Appl. No.: 08/839,228

[22] Filed: Apr. 21, 1997

[30] Foreign Application Priority Data

Nov. 20, 1996 [JP] Japan .................................. 8-309321

[51] Int. Cl.⁶ ...................................................... H01B 7/00
[52] U.S. Cl. ........................... 174/135; 174/136; 59/78.1; 138/111; 138/157
[58] Field of Search .................................... 174/135, 136, 174/72 C, 68.3, 92, 89, 95, 705, 68.1; 439/448; 138/120, 155, 157, 110, 111; 59/78.1; 285/39

[56] References Cited

U.S. PATENT DOCUMENTS

| | | | |
|---|---|---|---|
| 1,485,994 | 3/1924 | Salisbury | 174/5 R |
| 1,822,624 | 9/1931 | Hoeftmann | 285/154.3 |
| 4,358,634 | 11/1982 | Dienes | 174/88 R |
| 4,415,764 | 11/1983 | Priaroggia et al. | 174/37 |
| 4,692,564 | 9/1987 | Campbell et al. | 174/92 |
| 4,840,023 | 6/1989 | Borsani | 59/78.1 |
| 5,197,767 | 3/1993 | Kimura et al. | 285/39 |
| 5,561,269 | 10/1996 | Robertson et al. | 174/92 |
| 5,638,672 | 6/1997 | Furukawa | 59/78.1 |

*Primary Examiner*—Kristine Kincaid
*Assistant Examiner*—Dhiru R Patel
*Attorney, Agent, or Firm*—Helfgott & Karas, P.C.

[57] ABSTRACT

A submarine cable protecting device in which a plurality of pairs of half members are connected in series, includes a cylindrical portion which encloses a submarine cable. An outside spherical surface extending from one end of the cylindrical portion is provided at one end of each of the half members. An inside spherical surface extending from the other end of the cylindrical portion is provided at the other end of each of the half members, the inside spherical surface being shaped such that the inside spherical surface of one of the half members encompasses the outside spherical surface of another of the half members and the outside spherical surface cannot be detached from the inside spherical surface when the two half members are connected in series. The outside spherical surfaces of one pair of the half members has a reduced outside diameter when the outside spherical surfaces are contacted and the inside spherical surfaces are separated. The outside spherical surfaces are inserted into the inside spherical surfaces of another pair of the half members, and the two pairs of the half members are connected in series when the inside spherical surfaces are contacted.

16 Claims, 38 Drawing Sheets

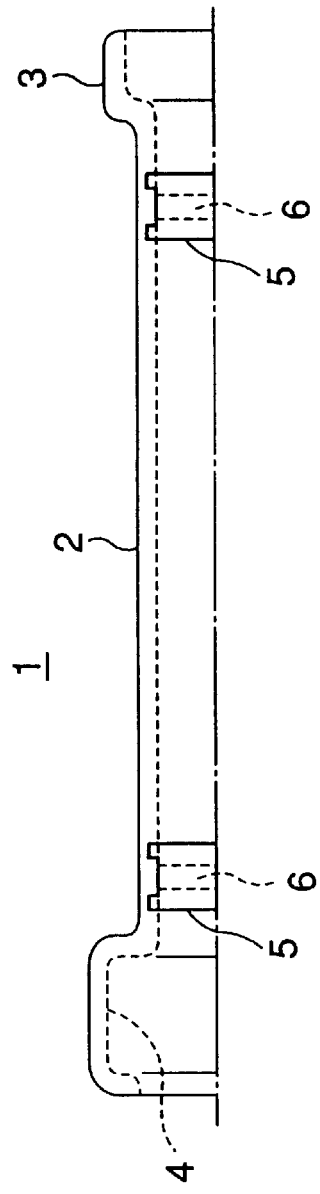
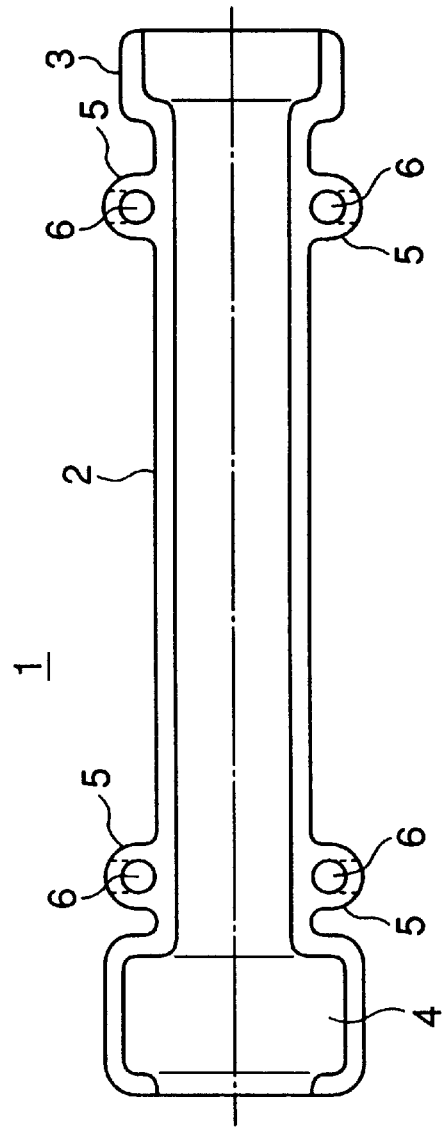

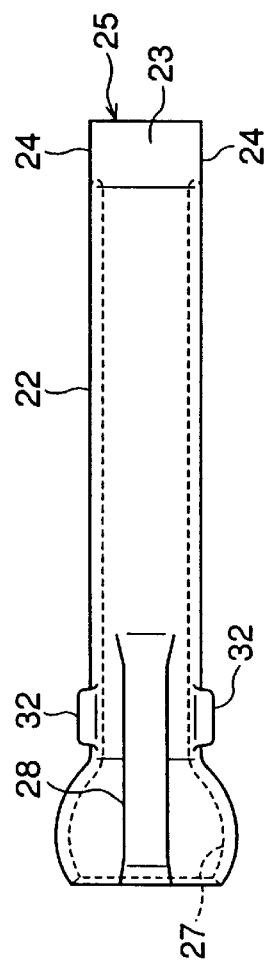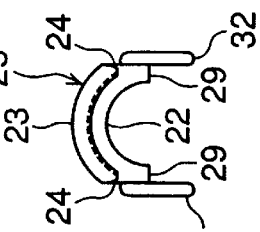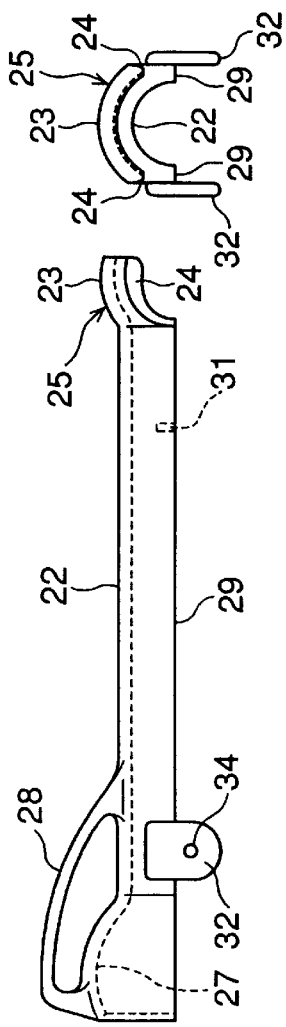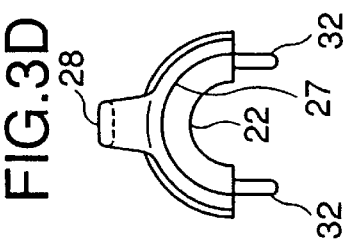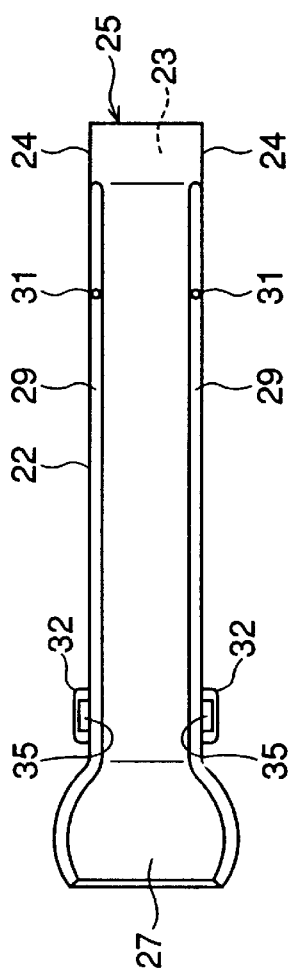

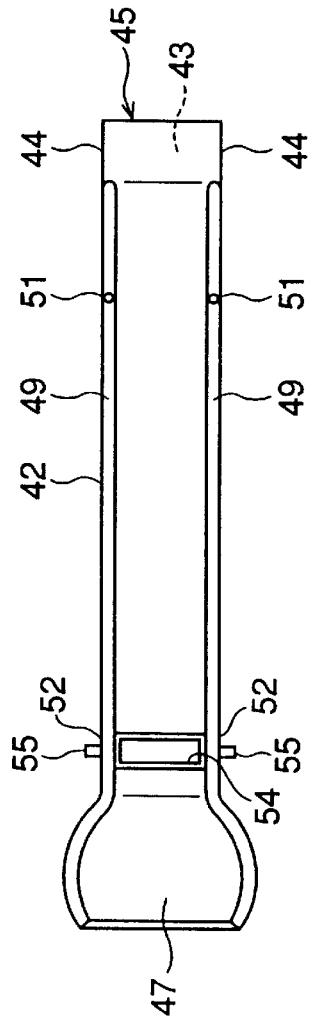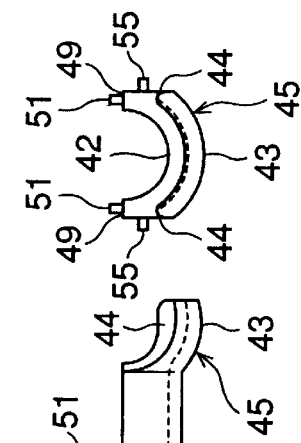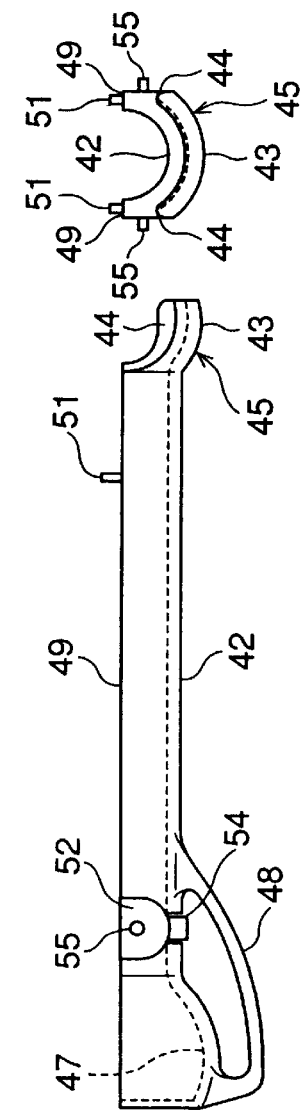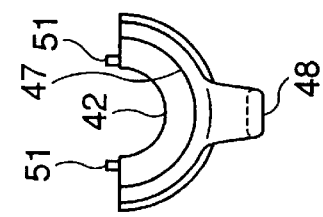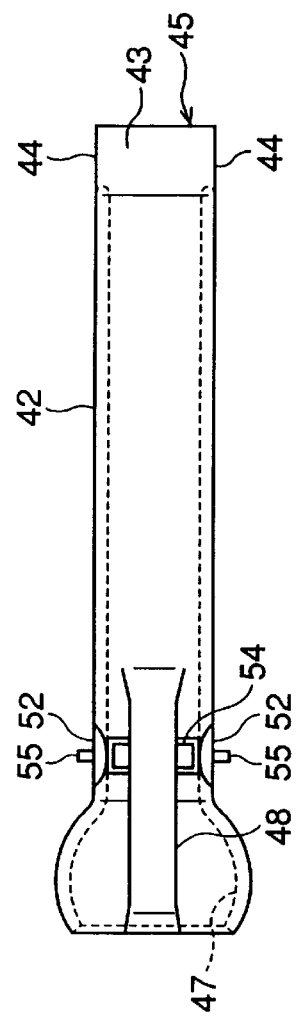

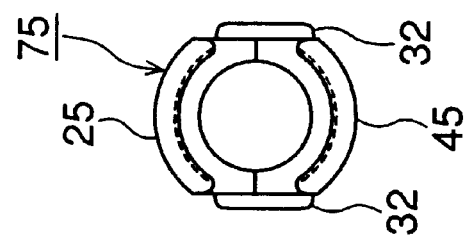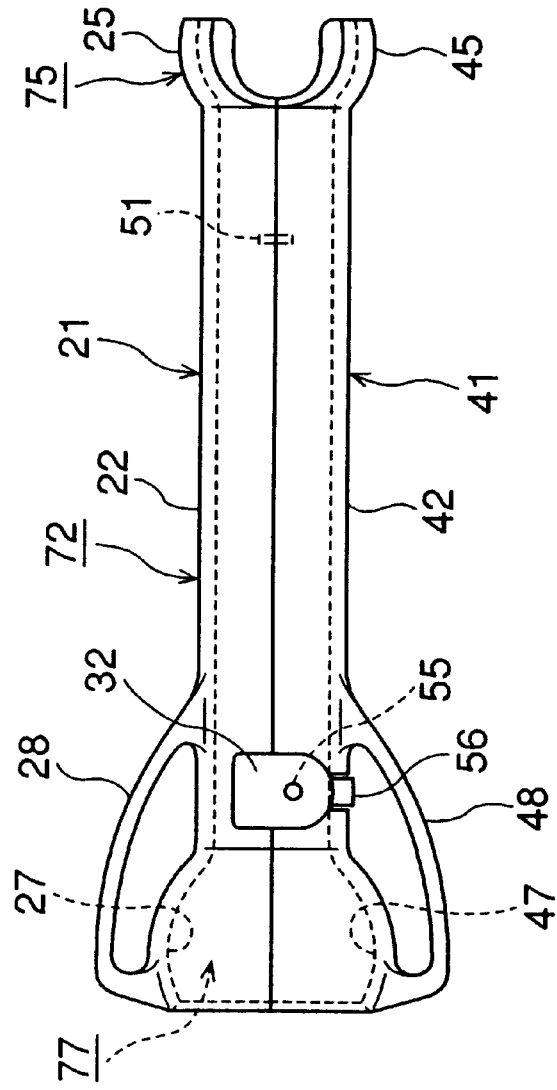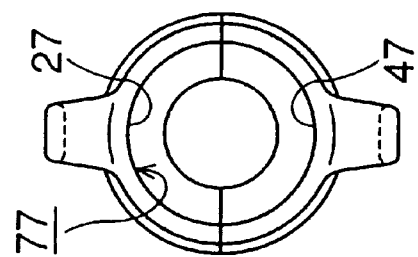

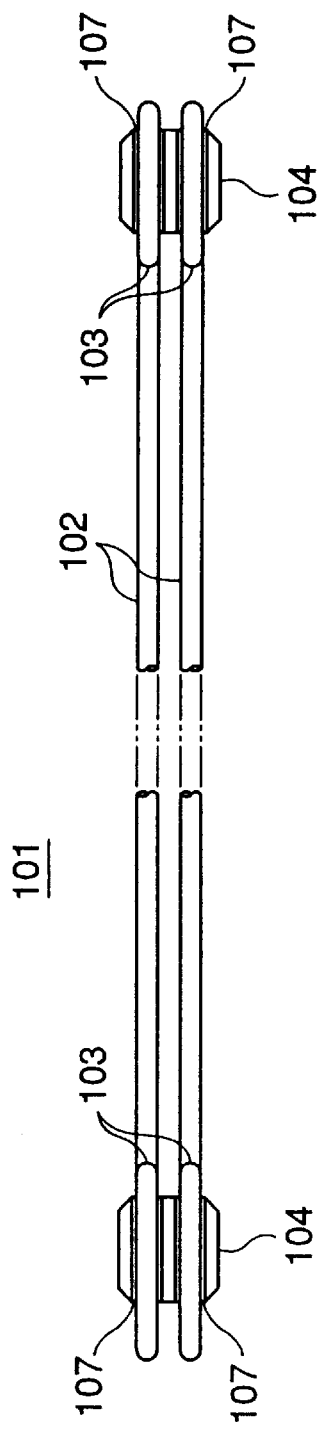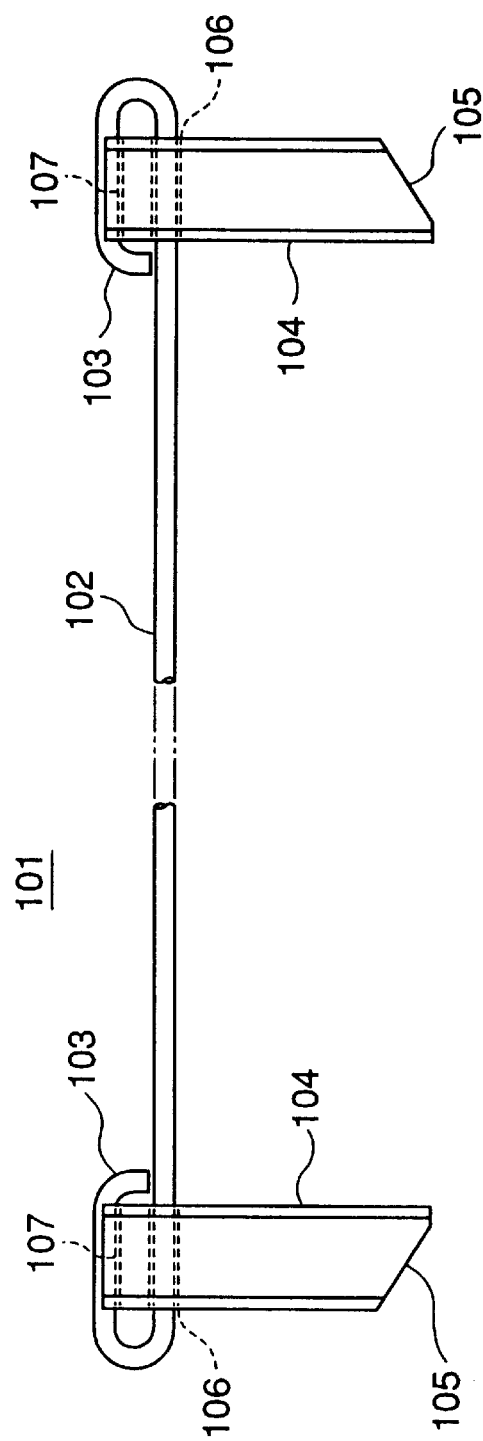

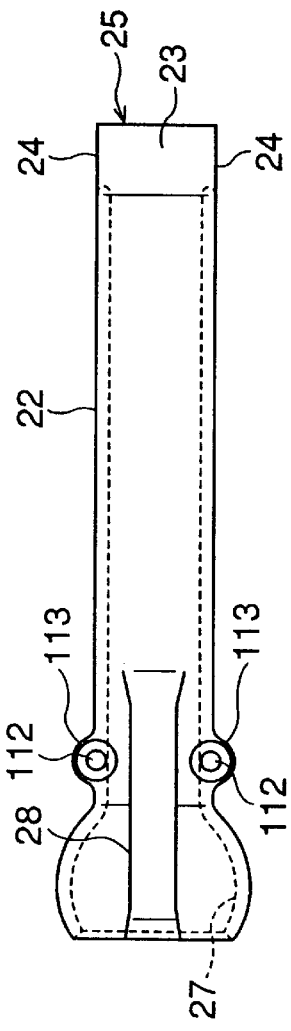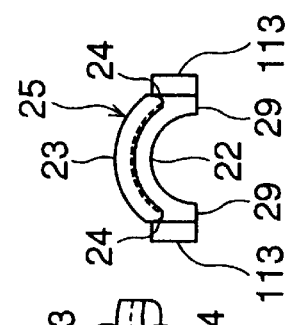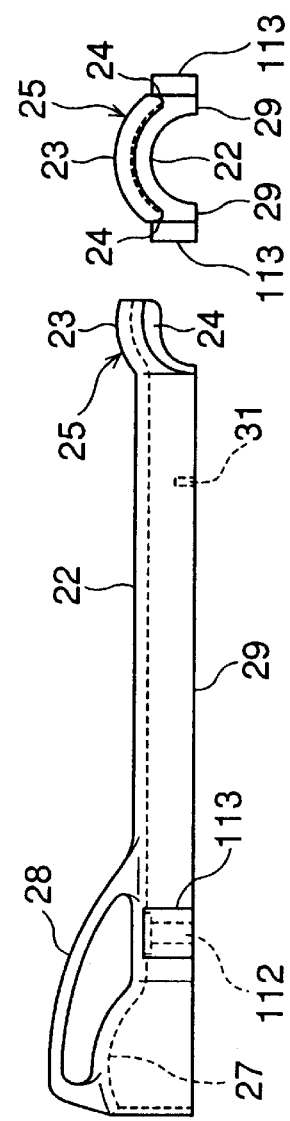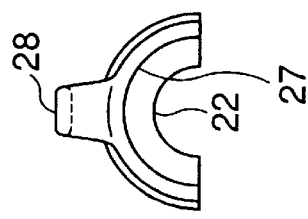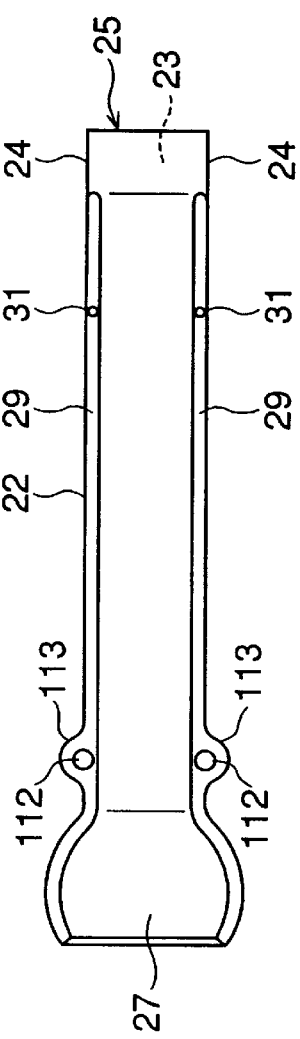

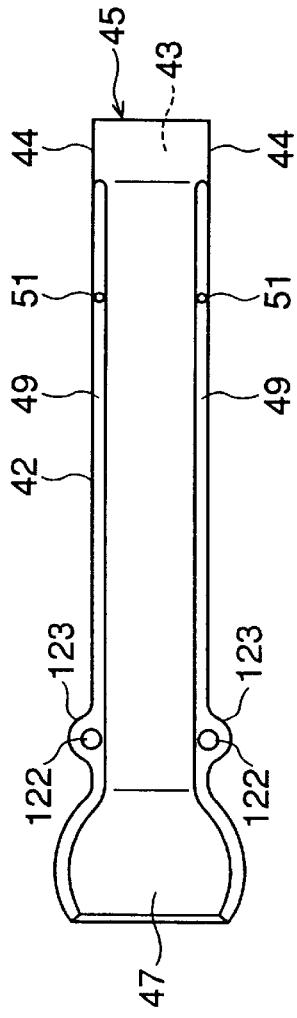
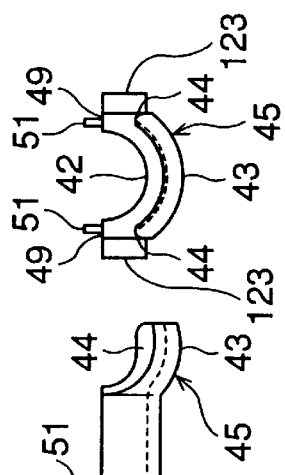
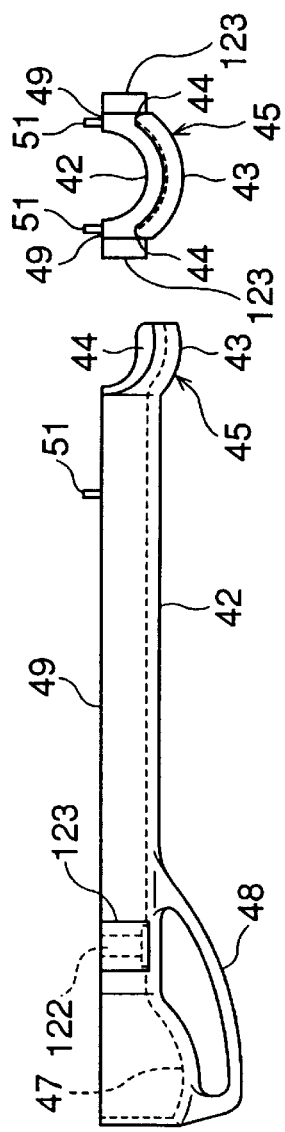
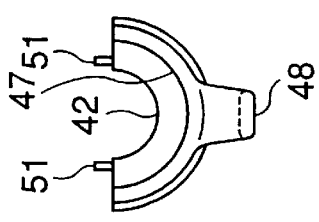
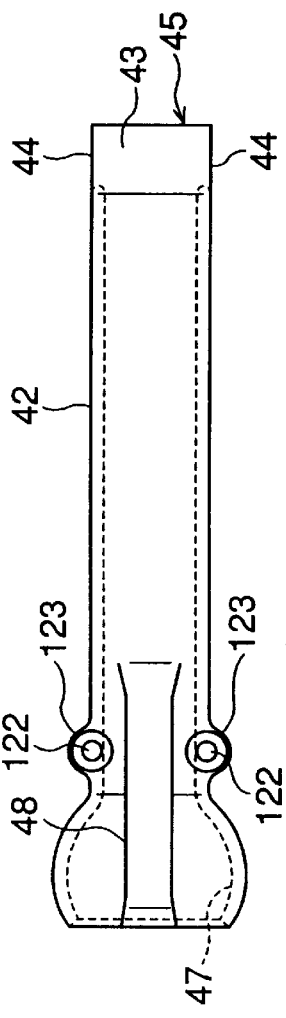

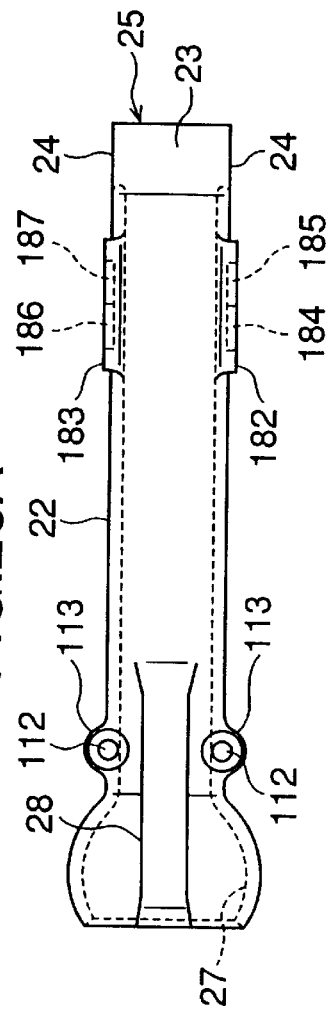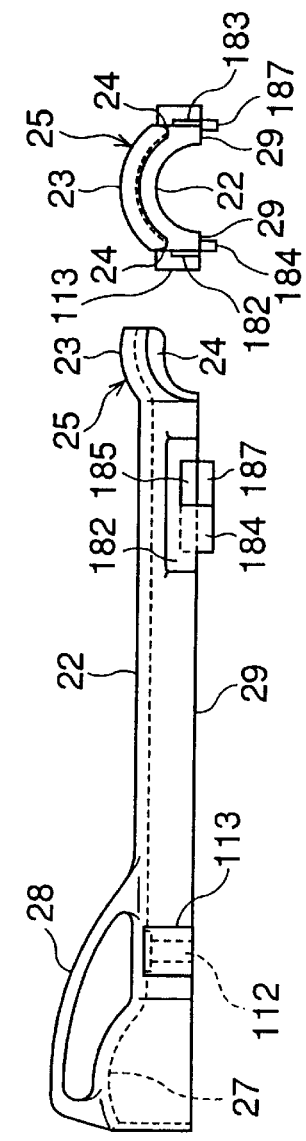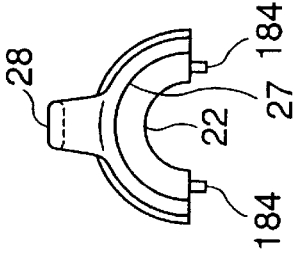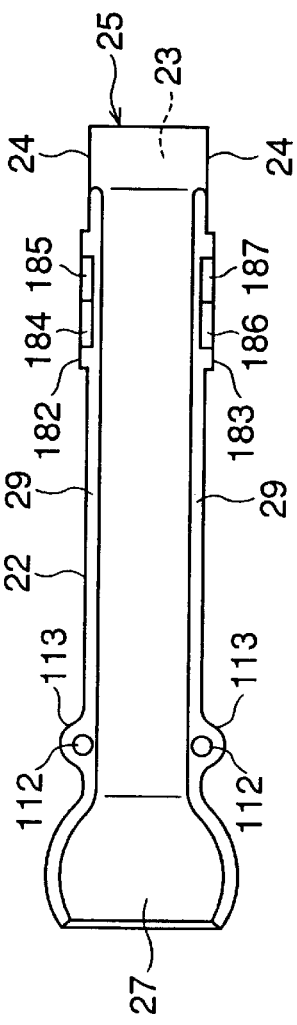

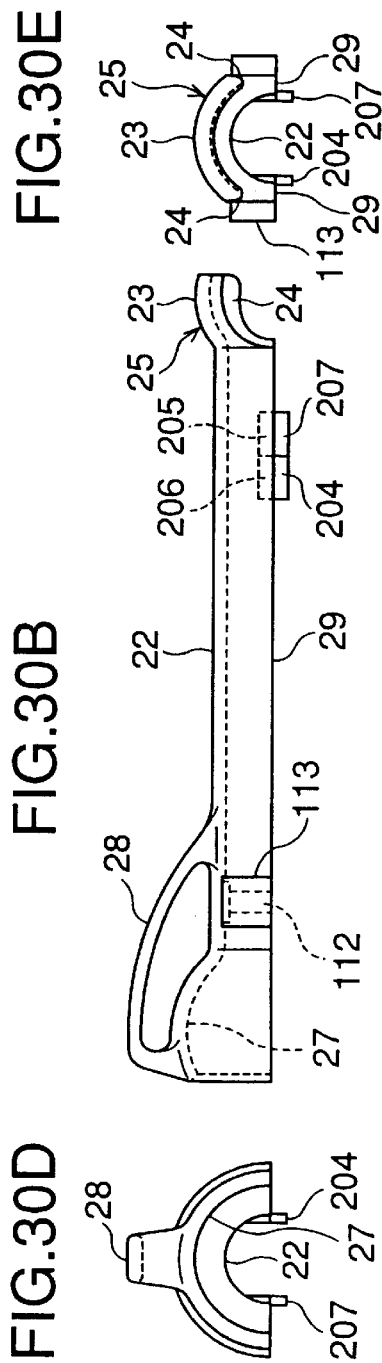

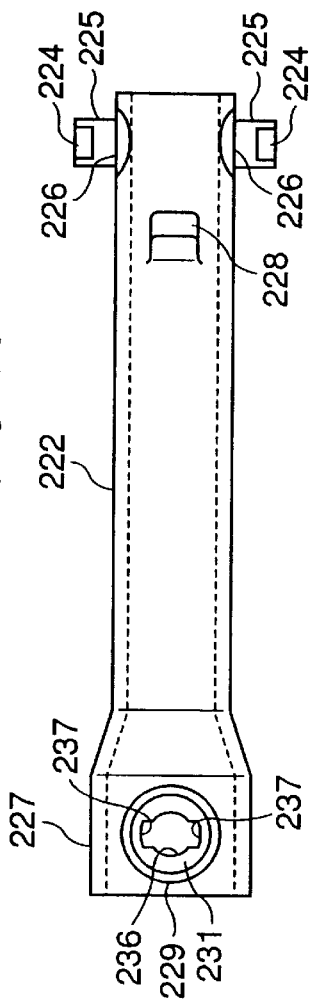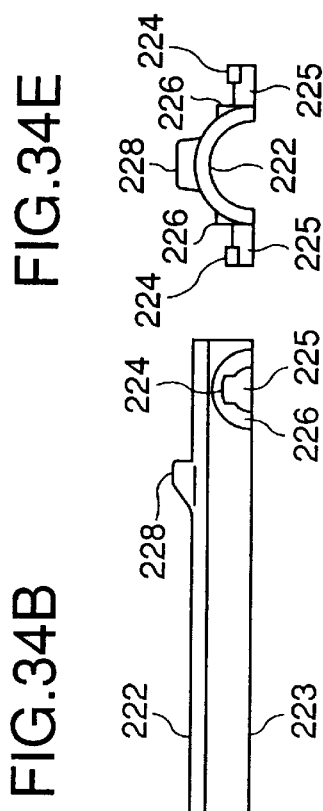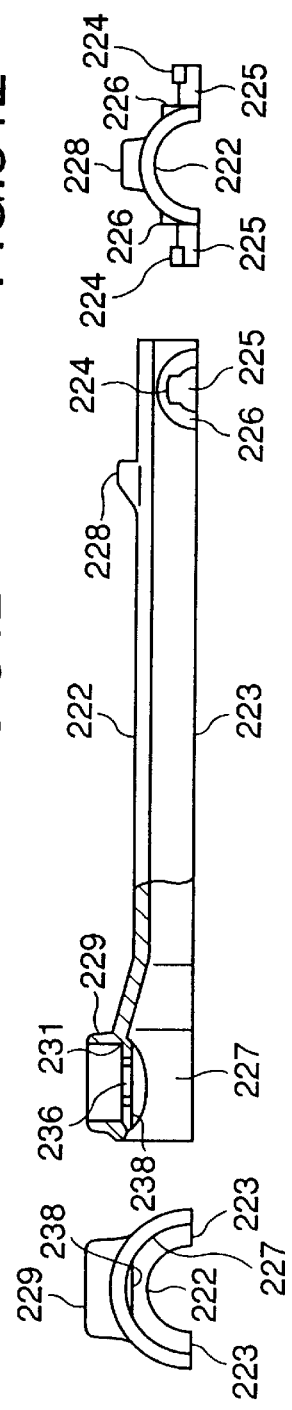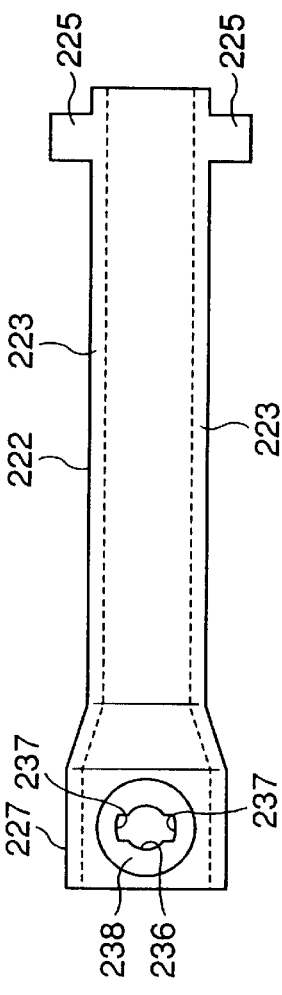

SUBMARINE CABLE PROTECTING DEVICE

BACKGROUND OF THE INVENTION (1) Field of the Invention

The present invention relates to a submarine cable protecting device which is installed at various locations which are susceptible to seashore waves or sea currents.

(2) Description of the Related Art

Transmission of various signals by coaxial cables or optical fiber cables is carried out through submarine cables which are installed at sea bottom and seashore locations. There are types of the submarine cables for shallow locations and for deep water locations. Since terminal stations for transmitting and receiving the signals are based on land, land-based and submarine cable systems which connect the terminal stations and the submarine cables are needed.

Submarine cable protecting devices are provided to protect the submarine cables installed at locations which are susceptible to seashore waves or sea currents. The submarine cable protecting devices are in a generally cylindrical shape and enclose the submarine cables therein. In order to prevent the submarine cables from being influenced by the seashore waves and stones or the sea currents, the submarine cable protecting devices are made of a metallic material and have a certain weight. The total length of the submarine cables installed in such locations is normally in a range between 200 meters and 300 meters, and the maximum length of the submarine cables may exceed 5 kilometers.

It is desirable to provide a submarine cable protecting device which safely protects the submarine cables and allows the installing work of the submarine cables in such locations to be easily performed.

FIGS. 1A and 1B show a half member 1 of a conventional submarine cable protecting device. A plurality of pairs of the half members 1 form the conventional submarine cable protecting device. FIG. 1A and FIG. 1B are a side view and a bottom view of the half member 1.

As shown in FIGS. 1A and 1B, the half member 1 comprises a cylindrical portion 2 which longitudinally extends along a central axis of the half member 1. The cylindrical portion 2 has a semicircular cross section.

In the half member 1, an outside cylindrical surface 3 extending from a rear end of the cylindrical portion 2 is formed. The outside cylindrical surface 3 has an outside diameter greater than an outside diameter of the cylindrical portion 2.

An inside cylindrical surface 4 extending from a front end of the cylindrical portion 2 is formed. The inside cylindrical surface 4 has an inside diameter greater than the outside diameter of the outside cylindrical surface 3. The inside cylindrical surface 4 is shaped such that the inside cylindrical surface 4 of this half member 1 encompasses the outside cylindrical surface 3 of another half member 1 when the two half members 1 are connected in series.

A pair of fitting lugs 5 on the sides of the cylindrical portion 2 at the rear end thereof near the outside cylindrical surface 3 and at the front end thereof near the inside cylindrical surface 4 are formed. The fitting lugs 5 outwardly project from the sides of the cylindrical portion 2. Each of the four fitting lugs 5 at the front and rear ends of the cylindrical portion 2 has a bolt insertion hole 6. The fitting lugs 5 and the bolt insertion holes 6 are used to position the cylindrical portions 2 of a pair of the half members 1 when they are attached to each other.

The half member 1 of FIGS. 1A and 1B is integrally formed through casting of a cast iron or the like. The half member 1 of the conventional submarine cable protecting device is formed from such a material such that it has a sufficient thickness and a sufficient weight. The conventional submarine cable protecting device has a strength sufficient to withstand the influences of seashore waves or sea currents.

FIG. 2 shows the conventional submarine cable protecting device 9 which is assembled with a plurality of pairs of the half members 1 of FIGS. 1A and 1B. After the conventional submarine cable protecting device 9 is assembled, the conventional submarine cable protecting device 9 encloses a submarine cable 8 therein and protects the same from the influences of seashore waves or sea currents at the installation locations.

The conventional submarine cable protecting device 9 is assembled while the submarine cable 8 is enclosed therein as shown in FIG. 2. The pairs of the half members 1 are continuously installed in series in one direction only, for example, in the direction from the left to the right.

The outside cylindrical surface 3 of each half member 1 is placed on the right side of FIG. 2, and the inside cylindrical surface 4 is placed on the left side of FIG. 2. Bolts 11 are inserted into the bolt insertion holes 6 of the half members 1, nuts 12 are attached to the bolts 11, and they are tightened together. In this manner, the pairs of the half members 1 are continuously connected to each other in series.

When a pair of the half members 1 is coupled to each other, the outside cylindrical surfaces 3 of the two members form an outside cylindrical surface 13 at the right end of the two members, and the inside cylindrical surfaces 4 of the two members form an inside cylindrical surface 14 at the left end of the two members. As described above, the inside cylindrical surfaces 4 have an inside diameter that is greater than the outside diameter of the outside cylindrical surfaces 3.

Therefore, when the pairs of the half members 1 are continuously installed in series in the direction from the left to the right, as shown in FIG. 2, the outside cylindrical surface 13 in one pair of the half members 1 which was previously installed is encompassed by the inside cylindrical surface 14 in another pair of the half members 1 which is presently to be installed. There is a small clearance between the outside cylindrical surface 13 and the inside cylindrical surface 14, and the half members 1 of one pair are rotatable around the central axis thereof with respect to the half members 1 of another pair.

When one pair of the half members 1 is coupled to each other, the cylindrical portions 2 of the two members form a fully cylindrical portion 15 in the middle of the half members 1. The inside cylindrical surface 14 has an inside diameter that is slightly greater than the outside diameter of the cylindrical portion 15, and one pair of the previously installed half members 1 and another pair of the presently installed half members 1 can be slightly inclined with respect to each other when they are installed. The inside cylindrical surface 14 of the presently installed half members 1 cannot be detached from the outside cylindrical surface 13 of the previously installed half members 1 when the two pairs of the half members 1 are connected in series.

When one pair of the half members 1 of the conventional submarine cable protecting device 9 is coupled to each other, four pairs of the bolts 11 and the nuts 12 must be attached and the bolts 11 and the nuts 12 must be tightened together. Therefore, it takes a long time to carry out the installing work of the submarine cable 8 by using the conventional submarine cable protecting device 9.

The assembly of the half members 1 of the conventional submarine cable protecting device 9 must be manually performed by using the bolts 11 and the nuts 12, and it is difficult to efficiently install the submarine cable 8 when the conventional submarine cable protecting device 9 is used.

Further, in the case of the conventional submarine cable protecting device 9, it is necessary that the installation of the pairs of the half members 1 be performed in series in one direction only. For example, if the pairs of the half members 1 are continuously installed in series starting from two separate locations, it is quite difficult to make the length of the finally-installed pair of the half members 1 equal to a remaining distance between the end of the pairs of the half members 1 already installed from one location and the end of the pairs of the half members 1 already installed from the other locations. If the length of the finally-installed pair of the half members 1 is not equal to the remaining distance, the installation of the pairs of the half members 1 cannot be finished. Therefore, it is practically difficult to facilitate the installation of the pairs of the half members 1 in series when the conventional submarine cable protecting device 9 is used.

SUMMARY OF THE INVENTION

An object of the present invention is to provide an improved submarine cable protecting device in which the above-mentioned problems are eliminated.

Another object of the present invention is to provide a submarine cable protecting device which remarkably facilitates the installation of the pairs of the half members in series and reduces the time needed for the installation of the pairs of the half members.

Still another object of the present invention is to provide a submarine cable protecting device which allows the installation of the pairs of the half members to be simultaneously performed at two or more separate locations.

The above-mentioned objects of the present invention are achieved by a submarine cable protecting device in which a plurality of pairs of half members are connected in series, each pair of the half members being coupled to each other to enclose a submarine cable therein, which comprises: a cylindrical portion provided in each of the half members for enclosing the submarine cable; an outside spherical surface provided at one end of each of the half members, the outside spherical surface extending from one end of the cylindrical portion of the half member; an inside spherical surface provided at the other end of each of the half members, the inside spherical surface extending from the other end of the cylindrical portion of the half member, the inside spherical surface being shaped such that the inside spherical surface of one of the half members encompasses the outside spherical surface of another of the half members and the outside spherical surface cannot be detached from the inside spherical surface when the two half members are connected in series, the outside spherical surfaces of a pair of the half members having a reduced outside diameter when the outside spherical surfaces are contacted with each other and the inside spherical surfaces of the pair of the half members are separated from each other, the outside spherical surfaces being inserted into the inside spherical surfaces of another pair of the half members, and the two pairs of the half members being connected in series when the inside spherical surfaces of the former pair of the half members are contacted with each other.

In the submarine cable protecting device of the present invention, the outside spherical surfaces of one pair of the half members have a reduced outside diameter when the outside spherical surfaces are contacted and the inside spherical surfaces are separated. The outside spherical surfaces of one pair of the half members can be easily inserted into the inside spherical surfaces of another pair of the half members, and the two pairs of the half members can be easily connected in series when the inside spherical surfaces are contacted. The outside spherical surfaces of the former pair of the half members cannot be detached from the inside spherical surfaces of the latter pair of the half members when the two pairs of the half members are connected in series. Therefore, in the submarine cable protecting device of the present invention, it is possible to easily install the pairs of the half members in series. The time needed for the installation of the pairs of the half members can be remarkably reduced.

Further, in the submarine cable protecting device of the present invention, additional half members are provided which enclose both the inside spherical surfaces of one pair of the half members which are installed and the outside spherical surfaces of another pair of the half members which are installed. Therefore, in the submarine cable protecting device of the present invention, it is possible that the installation of the pairs of the half members be simultaneously performed at two or more separate locations.

BRIEF DESCRIPTION OF THE DRAWINGS

The above and other objects, features and advantages of the present invention will be more apparent from the following detailed description when read in conjunction with the accompanying drawings in which:

FIGS. 1A and 1B are diagrams showing a half member of a conventional submarine cable protecting device;

FIGS. 3A through 3E are various views of a first half member of a submarine cable protecting device in a first embodiment of the present invention;

FIGS. 5A through 5E are various views of a second half member of the submarine cable protecting device;

FIGS. 11A, 11B and 11C are diagrams of the submarine cable protecting device of the first embodiment which is assembled;

FIGS. 18A and 18B are diagrams of a further example of the coupling unit;

FIGS. 19A through 19E are various views of a first half member of a submarine cable protecting device in a second embodiment of the present invention;

FIGS. 20A through 20E are various views of a second half member of the submarine cable protecting device of the second embodiment;

FIGS. 26A through 26E are various views of a half member of a submarine cable protecting device in a fifth embodiment of the present invention;

FIGS. 30A through 30E are various views of a half member of a submarine cable protecting device in a sixth embodiment of the present invention;

FIGS. 34A through 34E are various views of a half member of a submarine cable protecting apparatus in a seventh embodiment of the present invention;

DESCRIPTION OF THE PREFERRED EMBODIMENTS

Figure 2:
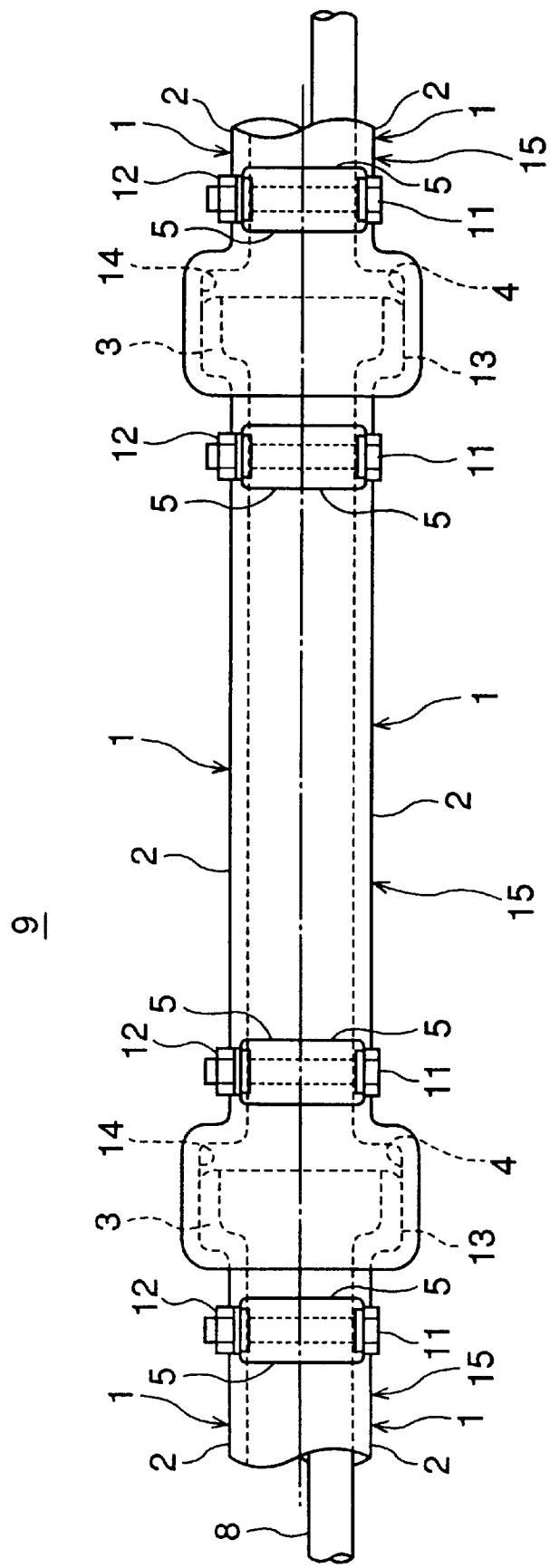
FIG. 2 is a diagram showing the conventional submarine cable protecting device which is assembled with pairs of the half members of FIGS. 1A and 1B.

A description will now be given of the preferred embodiments of the present invention with reference to the accompanying drawings.

In the accompanying drawings, the elements which are substantially the same for all the figures are designated by the same reference numerals.

In the following description, the terms front, rear, right, left, top and bottom are used for the sake of convenience of the explanation in conjunction with the accompanying drawings, and it is not intended that these terms specifically define the present invention.

FIGS. 3A through 3E show a first half member 21 of a submarine cable protecting device in a first embodiment of the present invention. FIG. 3A, FIG. 3B, FIG. 3C, FIG. 3D and FIG. 3E are a top view, a side view, a bottom view, a front view and a rear view of the first half member 21, respectively.

As shown in FIGS. 3A through 3E, the first half member 21 comprises a cylindrical portion 22 which longitudinally extends along a central axis of the first half member 21. The cylindrical portion 22 has a semicircular cross-section.

In the first half member 21, an outside spherical portion 25 extending rearward from a rear end of the cylindrical portion 22 is formed. In the spherical portion 25, an outside spherical surface 23 is formed. The outside spherical surface 23 has an outside diameter greater than an outside diameter of the cylindrical portion 22. The spherical portion 25 has straight parallel walls 24 on sides of the spherical portion 25. The parallel walls 24 have a width substantially equal to a width of the cylindrical portion 22.

An inside spherical surface 27 extending forward from a front end of the cylindrical portion 22 is formed. The inside spherical surface 27 is shaped such that the inside spherical surface 27 encompasses the outside spherical surface 23 of the spherical portion 25 of another first half member 21, and the spherical portion 25 of that first half member 21 cannot be detached from the spherical surface 27 of this first half member 21 when the two members are connected in series.

A handle portion 28 is attached at one end to the top of the outside surface of the cylindrical portion 22 and at the other end to the top of the outside surface of the spherical surface 27. The handle portion 28 serves to reinforce the cylindrical portion 22 and the spherical surface 27.

Fitting surfaces 29 on the bottom of the cylindrical portion 22 are formed. A pair of pin insertion holes 31 at rear positions of the fitting surfaces 29 near the spherical portion 25 are formed. The pin insertion holes 31 are used to position the cylindrical portion 22, which will be described later.

A pair of fitting lugs 32 of the first half member 21 on the sides of the cylindrical portion 22 are formed. The fitting lugs 32 outwardly project from the sides of the front end of the cylindrical portion 22 near the inside spherical surface 27. The fitting lugs 32 are used to position the cylindrical portion 22, which will be described later.

Figure 4A:
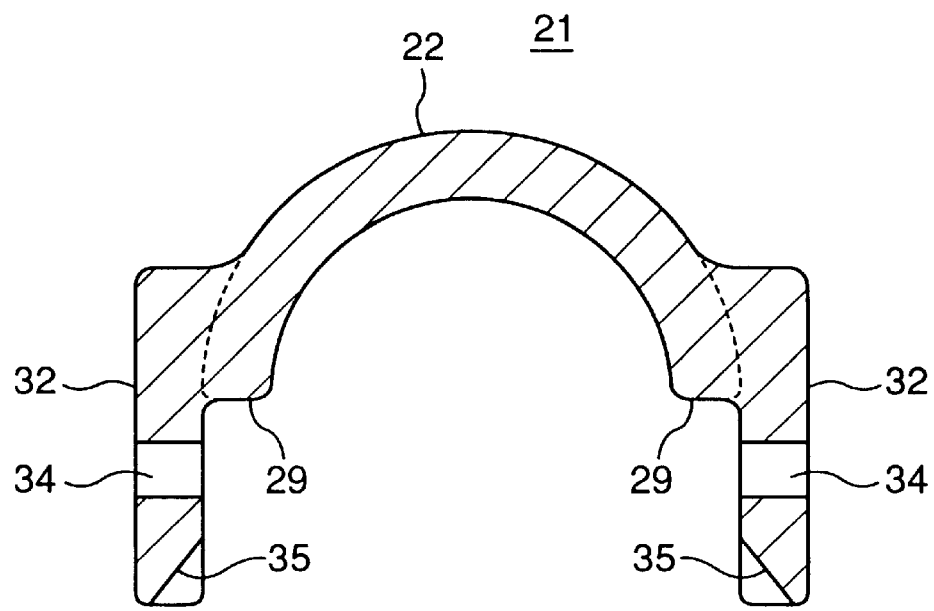
FIGS. 4A and 4B are enlarged views of a portion of the first half member of FIGS. 3A through 3E.
Figure 4B:
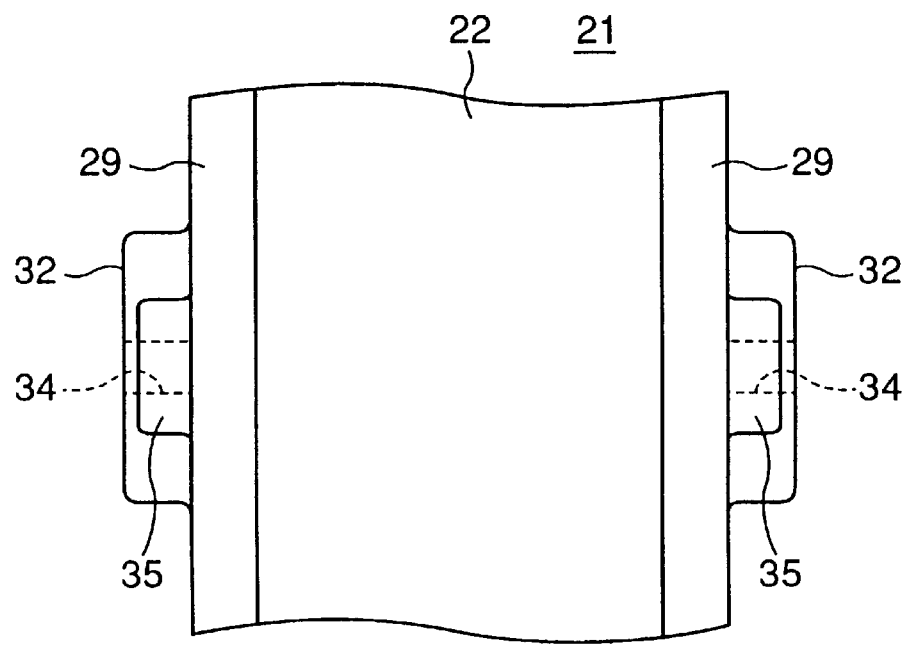

FIGS. 4A and 4B show a portion of the first half member 21 which is adjacent to the fitting lugs 32. FIG. 4A and FIG.

4B are a cross-sectional view and a bottom view of the first half member 21 adjacent to the fitting lugs 32.

As shown in FIGS. 4A and 4B, transversely extending through holes 34 in the fitting lugs 32 on the sides of the cylindrical portion 22 are formed. The through holes 34 in the fitting lugs 32 are located below the fitting surfaces 29. The through holes 34 are used to couple the first half member 21 to a second half member, which will be described later.

Slanting surfaces 35 on the bottom of the fitting lugs 32 are formed such that the top of the slanting surfaces 35 are increasingly widened in a transverse direction toward the bottom of the slanting surfaces 35. The central axis of the through holes 34 and the center line of the slanting surfaces 35 are substantially the same as each other with respect to the longitudinal direction of the first half member 21.

The first half member 21 of the present embodiment is integrally formed through casting of a cast iron, a cast steel or the like. The first half member 21 having a sufficient thickness and a sufficient weight is formed. The first half member 21 has a strength sufficient to withstand the influences of seashore waves or sea currents.

FIGS. 5A through 5E show a second half member 41 of the submarine cable protecting device of the first embodiment. FIG. 5A, FIG. 5B, FIG. 5C, FIG. 5D and FIG. 5E are a top view, a side view, a bottom view, a front view and a rear view of the second half member 41, respectively.

As shown in FIGS. 5A through 5E, the second half member 41 comprises a cylindrical portion 42 which longitudinally extends along a central axis of the second half member 41. The cylindrical portion 42 has a semicircular cross section.

In the second half member 41, an outside spherical portion 45 extending rearward from a rear end of the cylindrical portion 42 is formed. In the outside spherical portion 45, an outside spherical surface 43 is formed. The outside spherical surface 43 has an outside diameter greater than an outside diameter of the cylindrical portion 42. The spherical portion 45 has straight parallel walls 44 on sides of the spherical portion 45. The parallel walls 44 have a width substantially equal to a width of the cylindrical portion 42.

An inside spherical surface 47 extending forward from a front end of the cylindrical portion 42 is formed. The inside spherical surface 47 is shaped such that the inside spherical surface 47 encompasses the outside spherical surface 43 of the spherical portion 45 of another second half member 41, and the spherical portion 45 of that second half member 41 cannot be detached from the spherical surface 47 of this second half member 41 when the two members 41 are connected in series.

In the above-described embodiment, when the first half member 21 and the second half member 41 are coupled to each other, the inside spherical surface 27 and the inside spherical surface 47 are substantially an inside surface of a major spherical segment obtained by cutting off part of a first sphere by a plane, the major spherical segment being greater than half of the first sphere. At the same time, the outside spherical surface 23 and the outside spherical surface 43 are substantially an outside surface of a minor spherical segment obtained by cutting off part of a second, smaller sphere by a plane, the minor spherical segment being smaller than half of the second sphere.

A handle portion 48 is attached at one end to the bottom of the outside surface of the cylindrical portion 42 and at the other end to the bottom of the outside surface of the spherical surface 47. The handle portion 48 serves to reinforce the cylindrical portion 42 and the spherical surface 47.

Fitting surfaces 49 on the top of the cylindrical portion 42 are formed. A pair of connecting pins 51 at rear positions of the fitting surfaces 49 near the spherical portion 45 are embedded onto the fitting surfaces 49. The connecting pins 51 are fitted into the pin insertion holes 31 in order to position the cylindrical portion 42 and the cylindrical portion 22.

Parallel surfaces 52 on the sides of the front end of the cylindrical portion 42 near the spherical surface 47 are formed. The parallel surfaces 52 have an outside width substantially equal to an outside diameter of the cylindrical portion 42. The outside width of the parallel surfaces 52 is substantially equal to an inside width of the fitting lugs 32 of the first half member 21.

The parallel surfaces 52 are fitted into the inside walls of the fitting lugs 32 to position the cylindrical portion 42 and the cylindrical portion 22, which will be described later.

Figure 6A:
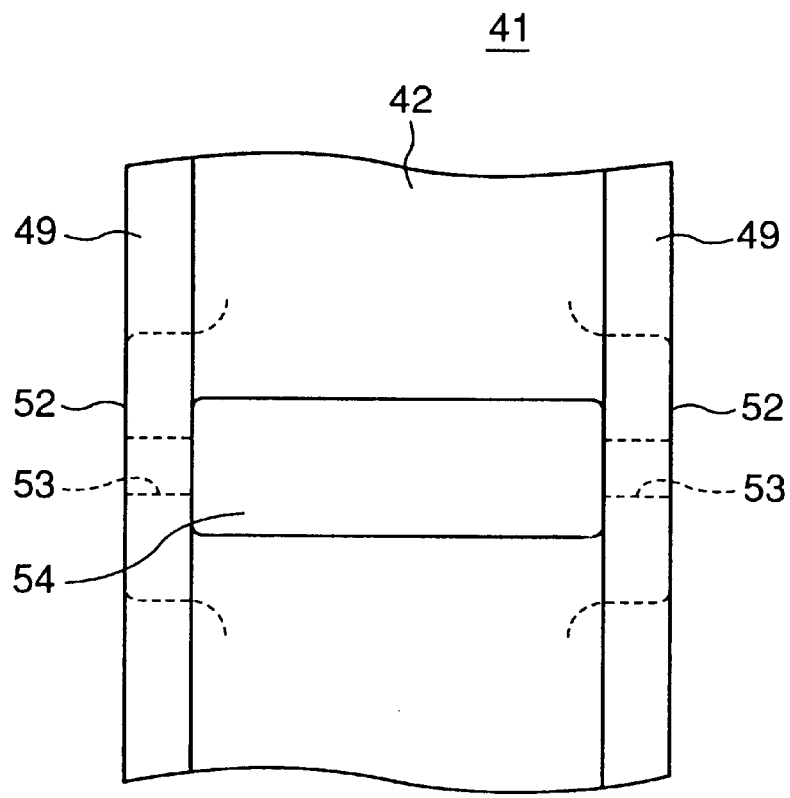
FIGS. 6A and 6B are enlarged views of a portion of the second half member of FIGS. 5A through 5E.
Figure 6B:
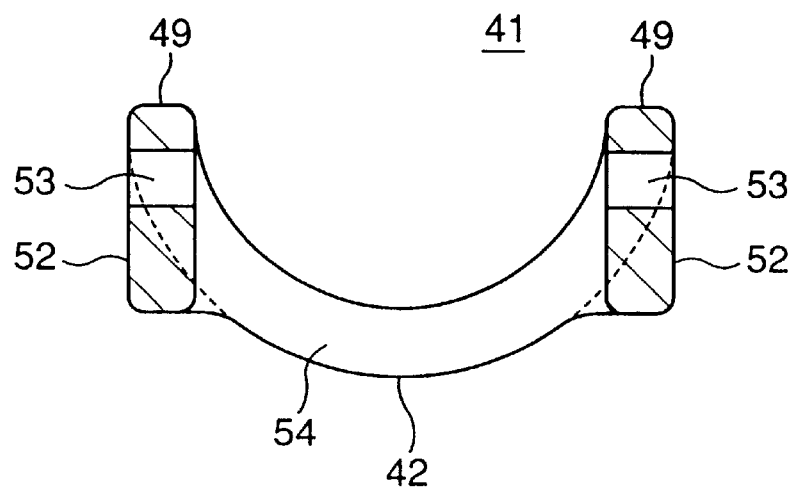

FIGS. 6A and 6B show a portion of the second half member 41 which is adjacent to the parallel surfaces 52. FIG. 6A and FIG. 6B are a top view and a cross-sectional view of the portion of the second half member 41 adjacent to the parallel surfaces 52.

As shown in FIGS. 6A and 6B, transversely extending through holes 53 in the parallel surfaces 52 on the sides of the cylindrical portion 42 are formed respectively. The through holes 53 in the parallel surfaces 52 are located below the fitting surfaces 49. The through holes 53 are used to couple the second half member 41 to the first half member 21, which will be described later.

A rectangular opening 54 in the cylindrical portion 42 which is located between the parallel surfaces 52 is formed. The central axis of the through holes 53 and the central transverse line of the rectangular opening 54 are substantially the same as each other with respect to the longitudinal direction of the second half member 41.

The second half member 41 of the present embodiment is integrally formed through casting of a cast iron, a cast steel or the like. The second half member 41 having a sufficient thickness and a sufficient weight is formed. The second half member 41 has a strength sufficient to withstand the influences of seashore waves or sea currents. Only the connecting pins 51 are made of a suitable metallic material having a high corrosion resistance and a high salt water resistance. For example, a stainless steel may be used for the connecting pins 51.

As shown in FIGS. 5A through 5E, a coupling unit 55 is fitted into the through holes 53 in the parallel surfaces 52. The coupling unit 55 has a spring part and a pair of coupling pins at ends of the spring part, which will be described below. In short, in the coupling unit 55, the spring part exerts an actuating force on the coupling pins so that the coupling pins outwardly project from the through holes 53 on the sides of the cylindrical portion 42.

Figure 7A:
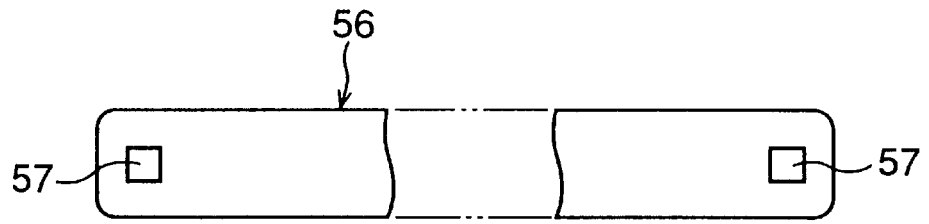
FIGS. 7A through 7E are diagrams of an example of a coupling unit of the submarine cable protecting device.
Figures 7B, 7C, 7D:
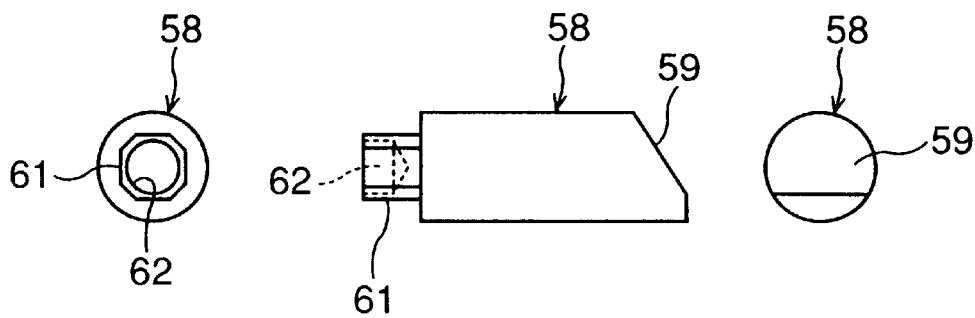
Figure 7E:
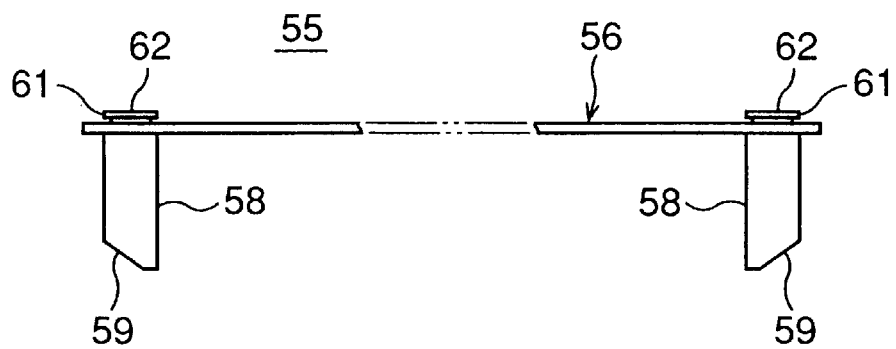

FIGS. 7A through 7E show an example of the coupling unit 55 for use in the submarine cable protecting device of the first embodiment. FIG. 7A shows a leaf spring 56 of the coupling unit 55. FIG. 7B is a side view of one of a pair of coupling pins 58 of the coupling unit 55. FIG. 7C and FIG. 7D are a rear view and a front view of the coupling pin 58 of FIG. 7B. FIG. 7E is a side view of the coupling unit 55 which is assembled.

As shown in FIG. 7A, the leaf spring 56 has rectangular holes 57 at ends of the leaf spring 56. As shown in FIGS. 7B through 7D, each of the coupling pins 58 has a generally cylindrical portion, and each includes a slanting surface 59 at the front end of the cylindrical portion and a rectangular head 61 at the rear end of the cylindrical portion. The rectangular head 61 has a circular recess 62 which is formed in the head 61 by drilling.

As shown in FIG. 7E, the rectangular heads 61 at the rear ends of the coupling pins 58 are fitted into the rectangular holes 57 of the leaf spring 56. The periphery of the circular recess 62 of each of the coupling pins 58 is deformed outward by crimping, such that the head 61 of each of the coupling pins 58 in the holes 57 cannot be detached from the leaf spring 56. The coupling pins 58 after the crimping are slightly movable relative to the leaf spring 56.

As shown in FIG. 7E, it is necessary that, when the coupling pins 58 are fitted into the leaf spring 56, the slanting surfaces 59 of the coupling pins 58 face toward the outside. Since the shafts 61 and the holes 57 are rectangular, the coupling pins 58 are not rotatable around the centers of the holes 57 relative to the leaf spring 56 after the coupling pins 58 are fitted into the leaf spring 56.

The leaf spring 56 and the coupling pins 58 are made of a suitable metallic material having a high corrosion resistance and a high salt water resistance. For example, a stainless steel may be used for the coupling unit 55.

In the above-described embodiment, the leaf spring 56 and the coupling pins 58 are joined by crimping. Alternatively, welding may be used to join the leaf spring 56 and the coupling pins 58. However, in the alternative, care must be taken not to damage the elasticity and/or the corrosion resistance of the leaf spring 56 due to the heat of the welding.

Figure 8:
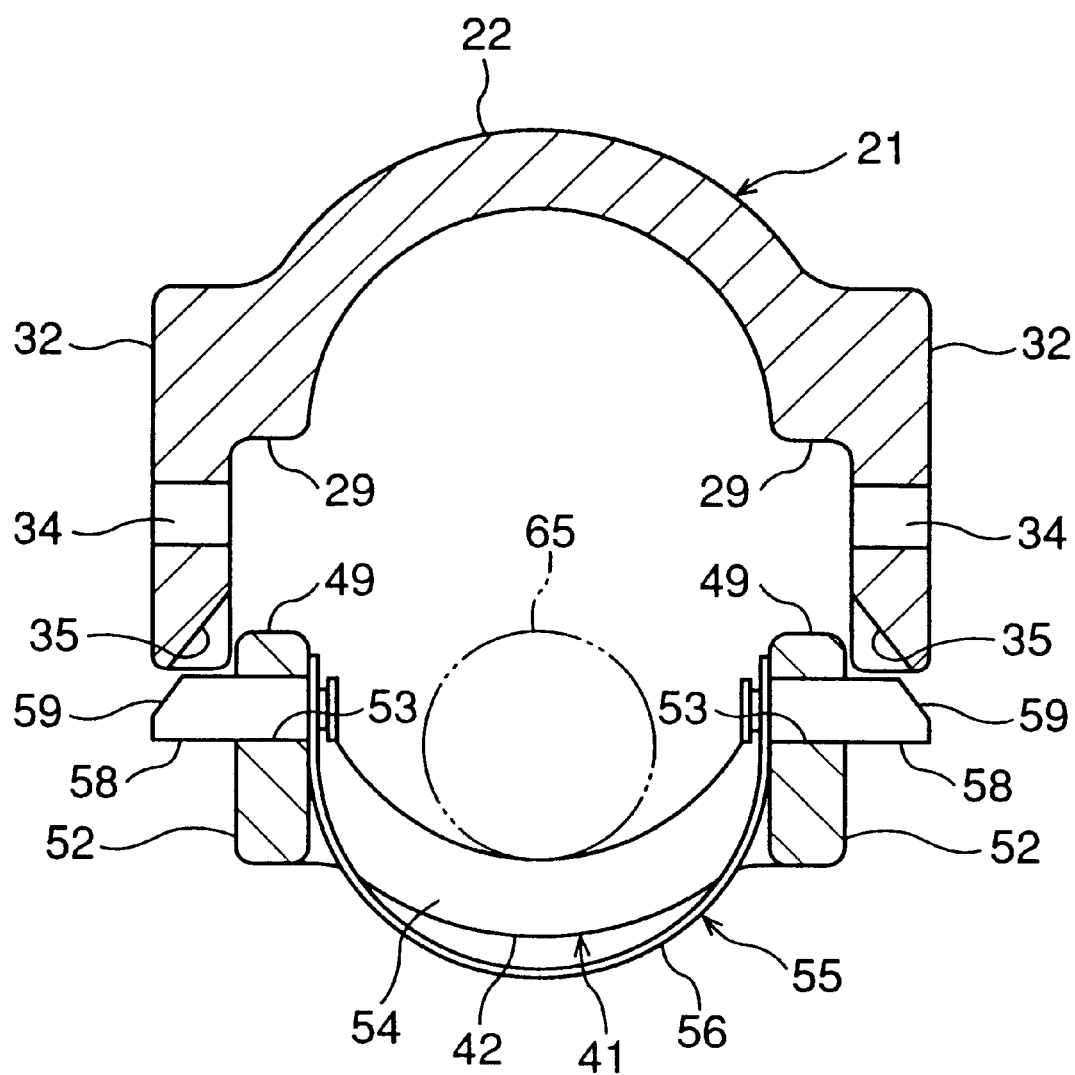
FIG. 8 and FIGS. 9A and 9B are diagrams for explaining a coupling procedure for coupling the first half member and the second half member by using the coupling unit of FIGS. 7A through 7E.
Figure 9A:
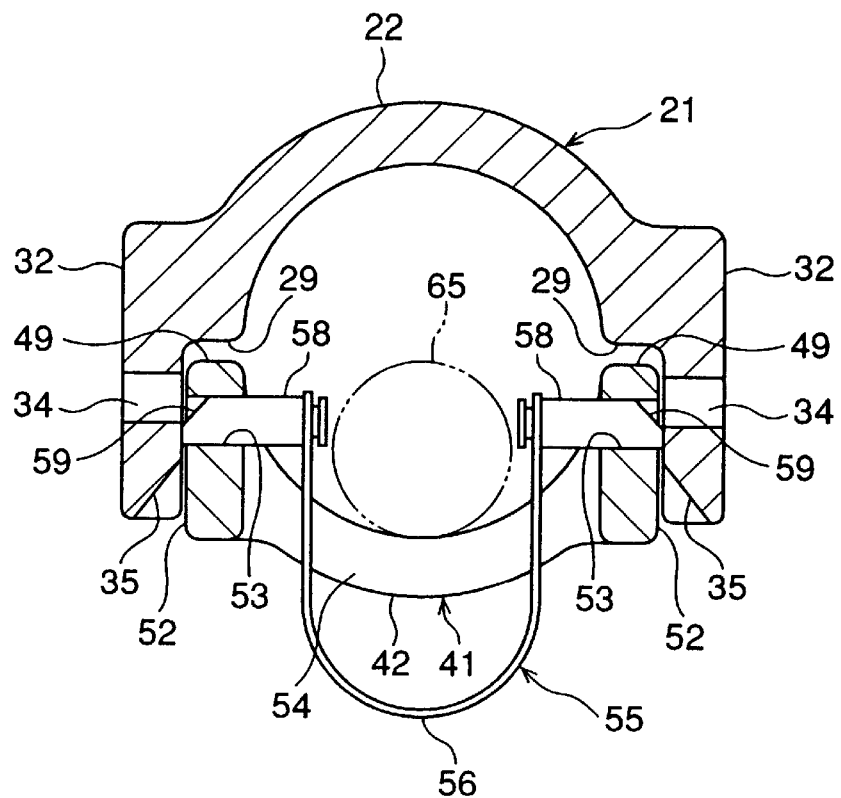
Figure 9B:
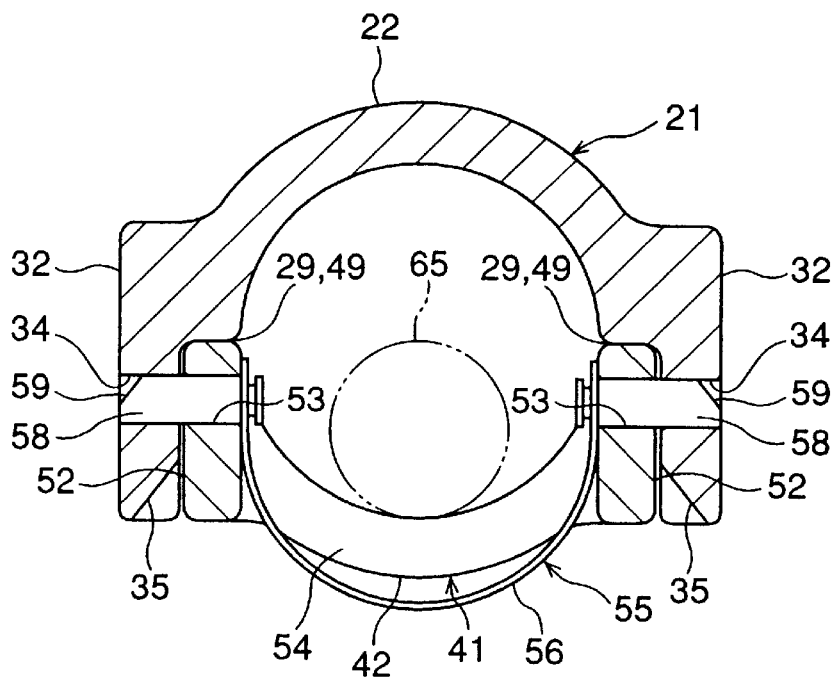

FIG. 8 and FIGS. 9A and 9B show a coupling procedure for coupling the first half member 21 and the second half member 41 by using the coupling unit 55 of FIGS. 7A through 7E.

As shown in FIG. 8, when the coupling unit 55 is attached to the second half member 41, the leaf spring 56 is bent in a U-shape, and the coupling pins 58 at the ends of the leaf spring 56 face the outside. The leaf spring 56 is fitted into the rectangular opening 54 of the second half member 41. The pins 58 of the coupling unit 55 are inserted into the through holes 53 of the second half member 41. The leaf spring 56 returns to its original shape, and the ends of the pins 58 are pushed outward from the parallel surfaces 52. The coupling unit 55 attached to the second half member 41 in this condition is shown in FIGS. 5A through 5E.

As shown in FIG. 8, the first half member 21 is placed above the second half member 41 with the coupling unit 55 attached, and the two members 21 and 41 are positioned with respect to each other such that the fitting lugs 32 and the fitting surfaces 52 confront each other. The slanting surfaces 59 of the coupling pins 58 and the slanting surfaces 35 of the fitting lugs 32 overlap each other. When the first half member 21 and the second half member 41 come within a certain distance of each other, the slanting surfaces 35 and the slanting surfaces 59 are easily contacted with each other.

As shown in FIG. 9A, when the two members 21 and 41 are moved closer to each other, the coupling pins 58 of the coupling unit 55 are moved inward along the slanting surfaces 35 of the fitting lugs 32 against the actuating force of the leaf spring 56. The pins 58 are pressed inward in the through holes 53 of the second half member 41. The front ends of the pins 58 touch the inside walls of the fitting lugs 32, and the inside walls of the fitting lugs 32 and the parallel surfaces 52 of the second half member 41 confront each other.

As shown in FIG. 9B, when the fitting surfaces 29 of the first half member 21 and the fitting surfaces 49 of the second half member 41 are contacted with each other, the coupling pins 58 are inserted into the through holes 34 of the first half member 21 due to the actuating force of the leaf spring 56. After the coupling unit 55 is set in this condition, the first half member 21 and the second half member 41 are connected to each other, and the second half member 41 cannot be detached from the first half member 21.

In FIGS. 8 through 9B, a submarine cable 65 enclosed in the submarine cable protecting device is indicated by a two-dot chain line.

Figure 10A:
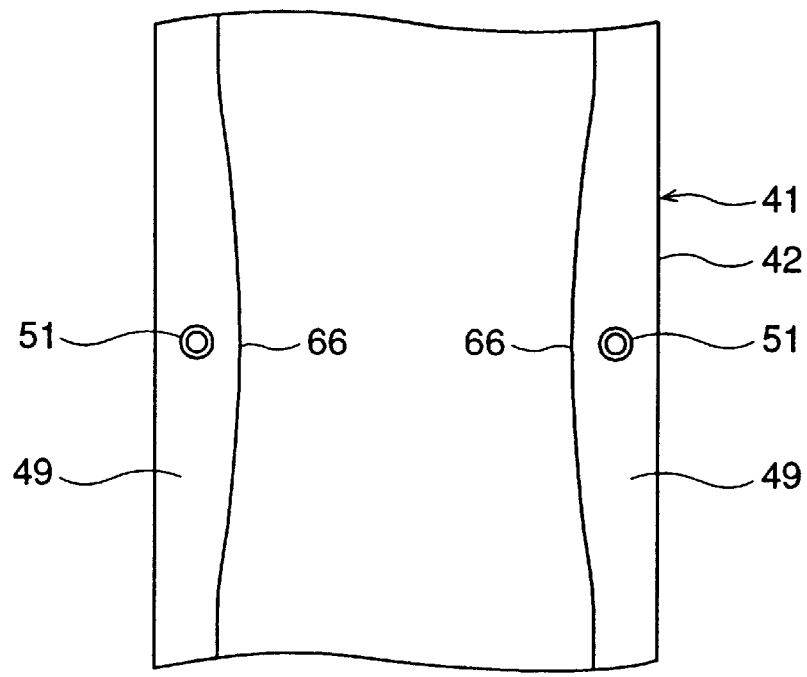
FIGS. 10A and 10B are diagrams of an example of a connecting unit of the submarine cable protecting device.
Figure 10B:
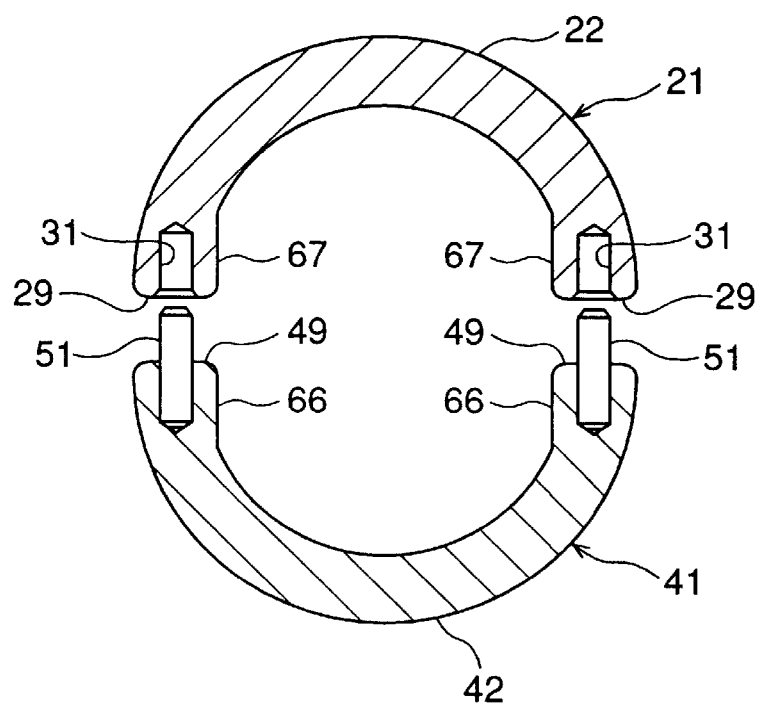

FIGS. 10A and 10B show a connecting unit of the submarine cable protecting device of the first embodiment.

As shown in FIGS. 10A and 10B, the connecting pins 51 on the fitting surfaces 49 of the top of the cylindrical portion 42 constitute the connecting unit of this embodiment. The connecting pins 51 are fitted into the fitting surfaces 49 of the cylindrical portion 42 by press fitting.

The connecting unit of FIGS. 10A and 10B is essentially the same as the connecting pins 51 of FIGS. 5A through 5E. In a case in which the thickness of the cylindrical portion 42 is not sufficient to press fit the connecting pins 51 into the fitting surfaces 49, it is desirable that bulged portions 66 in the cylindrical portion 42 be formed near the locations where the connecting pins 51 are fitted. As shown in FIG. 10A, the bulged portions 66 smoothly merge into the other walls of the cylindrical portion 42.

FIG. 10B shows a cross section of the connecting unit of FIG. 10A when the first half member 21 and the second half member 41 are connected to each other. As shown in FIG. 10B, the connecting pins 51 of the second half member 41 are fitted into the pin insertion holes 31 on the fitting surfaces 29 of the first half member 21 when the two members 21 and 41 are connected to each other. The pin insertion holes 31 of FIG. 10B are essentially the same as the pin insertion holes 31 of FIGS. 3A through 3E.

Similarly, in a case in which the thickness of the cylindrical portion 22 is not sufficient to form the pin insertion holes 31 in the fitting surfaces 29, it is desirable that bulged portions 67 in the cylindrical portion 22 be formed near the locations where the pin insertion holes 31 are formed. As shown in FIG. 10B, the bulged portions 67 smoothly merge into the other walls of the cylindrical portion 22.

As shown in FIGS. 10A and 10B, the connecting pins 51 which are press fitted into the fitting surfaces 49 of the second half member 41 are inserted into the pin insertion holes 31 of the first half member 21, and the fitting surfaces 49 and the fitting surfaces 29 are contacted with each other. The first half member 21 and the second half member 41 are connected to each other, and the rear sides of the first half member 21 and the second half member 41 are positioned by using the connecting pins 51. The fitting surfaces 29 and the fitting surfaces 49 after the insertion of the connecting pins 51 are not movable with respect to each other, and the coupling between the fitting surfaces 29 and the fitting surfaces 49 is maintained.

FIGS. 11A, 11B and 11C show the submarine cable protecting device 71 of the first embodiment which is assembled with the first half member 21 and the second half member 41. FIG. 11A, FIG. 11B and FIG. 11C are a side view, a front view and a rear view of the submarine cable protecting device 71, respectively.

As shown in FIGS. 11A through 11C, the submarine cable protecting device 71 comprises a cylindrical portion 72, an outside spherical surface 75, and an inside spherical surface 77. The cylindrical portion 72 is formed with the cylindrical portions 22 and 42 of the first and second half members 21 and 41. The outside spherical surface 75 is formed with the spherical portions 25 and 45. The inside spherical surface 77 is formed with the inside spherical surfaces 27 and 47.

The connecting pins 51 constitute a connecting unit for the cylindrical portion 72, and the rear side of the cylindrical portion 72 near the outside spherical surface 75 is positioned by inserting the connecting pins 51 into the pin insertion holes 31. The coupling unit 55 constitute a coupling unit for the cylindrical portion 72, and the front side of the cylindrical portion 72 near the inside spherical surface 77 is positioned by fitting the coupling unit 55 thereto. The first half member 21 and the second half member 41 are connected to each other by the coupling unit 55.

The coupling of the front side between the first half member 21 and the second half member 41 by the coupling unit 55 cannot be canceled unless other special operations are performed. However, the coupling of the rear side between the first half member 21 and the second half member 41 by the connecting pins 51 can be canceled. That is, the first half member 21 and the second half member 41 at the rear side of the cylindrical portion 72 near the spherical portion 75 are detachable from each other in mutually opposite directions perpendicular to the fitting surfaces 29.

If it is desired to avoid the detachment of the rear side of the cylindrical portion 72, coupling pins which are the same as the coupling pins 58 or other similar parts may be used instead of the connecting pins 51. However, taking such alternative measures is not needed in order to accomplish the object of the present invention, which will be apparent from the following description.

As described above, the outside spherical surface 75 is the outside surface of the minor part smaller than half of the first sphere, and the inside spherical surface 77 is the inside surface of the major part greater than half of the second sphere.

Figure 12:
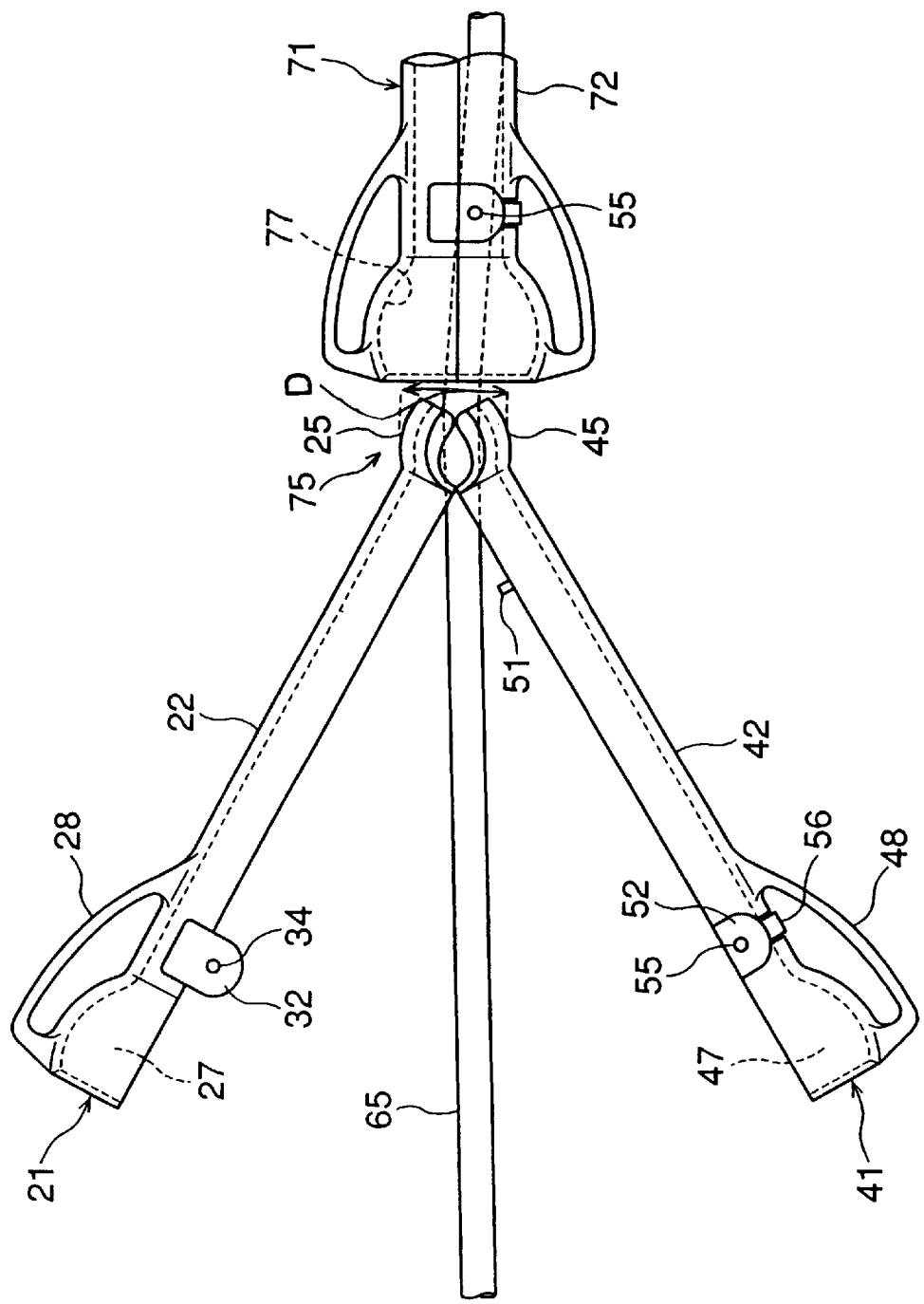
FIG. 12 is a diagram for explaining an installing procedure of the submarine cable protecting device of the first embodiment.

FIG. 12 shows an installing procedure of the submarine cable protecting device of the first embodiment.

Referring to FIG. 12, a previously installed submarine cable protecting device 71 at the read end of the submarine cable 65 is shown on the right side of FIG. 12. The spherical portion 25 and the spherical portion 45 of a presently installed submarine cable protecting device 71 are positioned near the inside spherical surface 77 of the previously installed submarine cable protecting device 71.

Hereinafter, for the sake of simplicity of the explanation of FIG. 12, the previously installed submarine cable protecting device 71 will be referred to as the first device 71, and the presently installed submarine cable protecting device 71 will be referred to as the second device 71.

In the second device 71, as shown in FIG. 12, the cylindrical portion 22 of the first half member 21 and the cylindrical portion 42 of the second half member 41 are contacted at their rear ends and separated from each other at their front ends. The outside diameter of the outside spherical portion 75 of the second device 71 at this time is substantially reduced.

The reduced distance indicated by the arrow D in FIG. 12, of the outside spherical portion 75 of the second device 71 is sufficiently smaller than the inside diameter of the inside spherical portion 77 of the first device 71. By moving the second device 71 in the right direction along the central axis of the submarine cable 65, the outside spherical portion 75 of the second device 71 can be easily inserted into the inside spherical portion 77 of the first device 71.

After the insertion of the outside spherical portion 75, the cylindrical portion 22 of the first half member 21 and the cylindrical portion 42 of the second half member 41 are contacted at their front ends. In the second device 71, the fitting surfaces 29 and the fitting surfaces 49 are contacted with each other, and the spherical surface 27 and the spherical surface 47 form the inside spherical surface 77. The outside diameter of the outside spherical portion 75 of the second device 71 returns to the original outside diameter. As described above in conjunction with FIGS. 8 through 11C, the connecting unit (or the connecting pins 51) and the coupling unit 55 are fitted to the second device 71, and the second device 71 is installed in the same condition as the first device 71.

The second device 71 is installed as shown in FIGS. 11A–11C, and the inside spherical surface 77 of the first device 71 encompasses the outside spherical surface 75 of the second device 71, and the outside spherical surface 75 of the second device 71 cannot be detached from the inside spherical surface 77 of the first device 71 when the first and second devices 71 are connected in series.

In the present embodiment, the handle portions 28 and 48 are useful when the above installing procedure is performed. That is, by using the handle portions 28 and 48 of the second device 71, the above installing procedure is easily performed. In addition, the handle portions 28 and 48 are useful when carrying the submarine cable protecting device 71.

Figure 13:
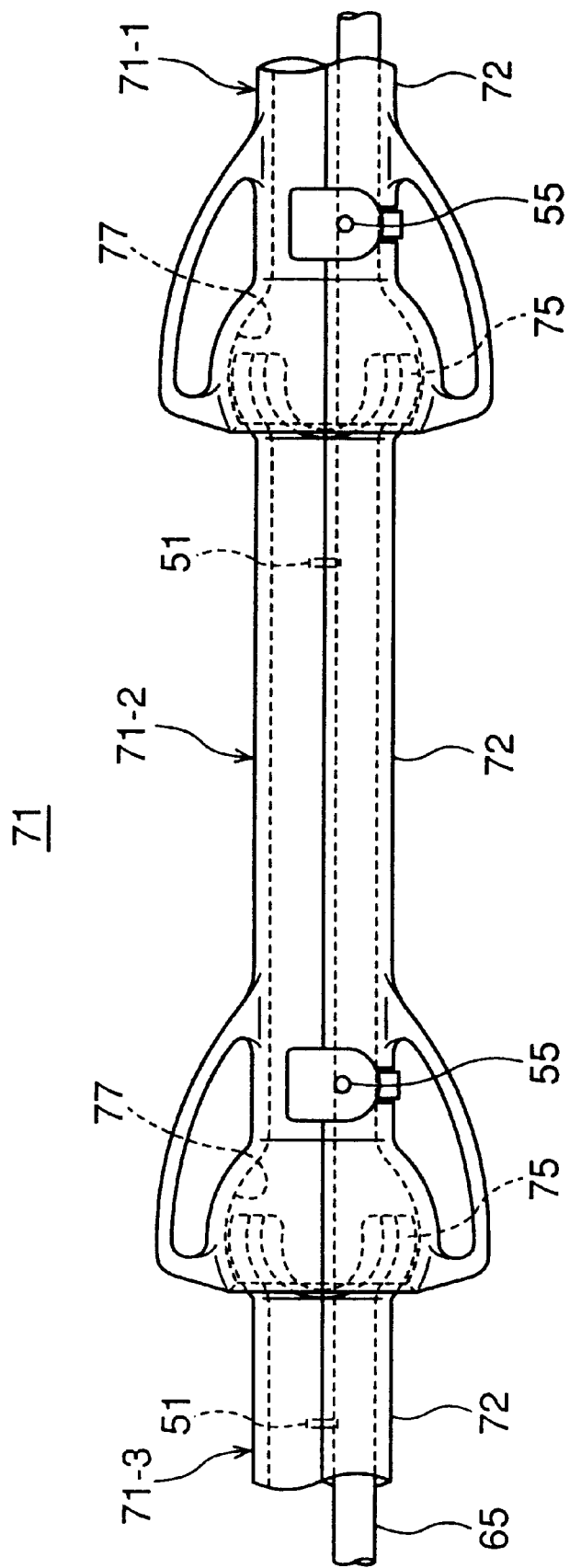
FIG. 13 is a diagram for explaining an installed condition of a plurality of pairs of the first and second half members of the first embodiment which are installed in series.

FIG. 13 shows an installed condition of a plurality of pairs of the first and second half members of the first embodiment which are installed in series.

As shown in FIG. 13, a submarine cable protecting device 71-1, a submarine cable protecting device 71-2 and a submarine cable protecting device 71-3 are installed in series, and the submarine cable 65 is enclosed therein. There is a small clearance between the outside spherical surface 75 and the inside spherical surface 77 at locations where two adjacent ones of the submarine cable protecting devices 71-1, 71-2 and 71-3 are connected in series. The submarine cable protecting devices 71-1, 71-2 and 71-3 are slightly movable in the longitudinal direction with respect to each other, and are slightly rotatable around the central axis thereof with respect to each other. Therefore, the submarine cable protecting device of the present embodiment is useful to facilitate the installation of the pairs of the half members in series.

Figure 14:
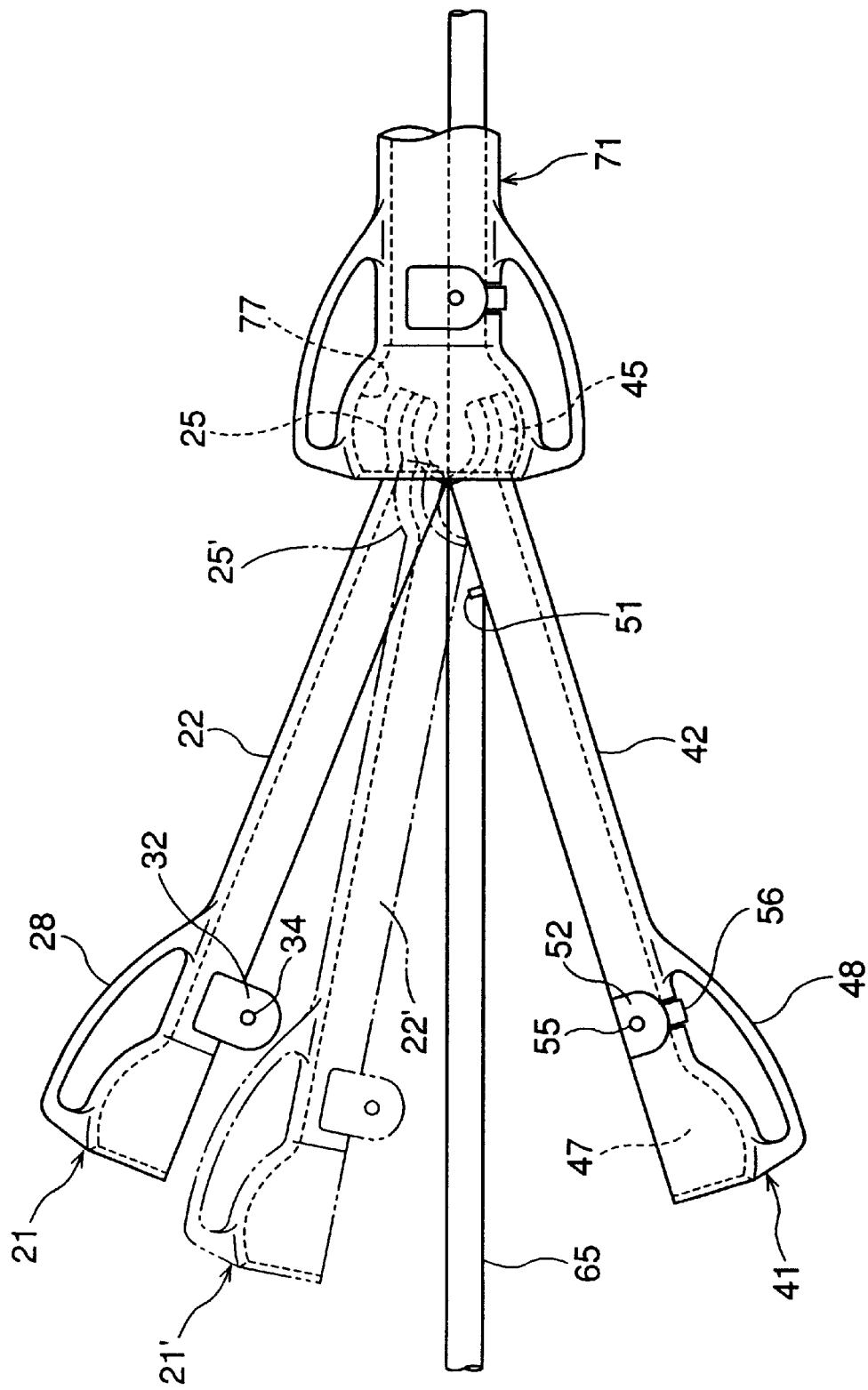
FIG. 14 is a diagram for explaining another installing procedure of the submarine cable protecting device of the first embodiment.

FIG. 14 shows another installing procedure of the submarine cable protecting device of the first embodiment.

Referring to FIG. 14, a previously installed submarine cable protecting device 71 at the rear end of the submarine cable 65 is shown on the right side of FIG. 14. One of the outside spherical portion 25 and the outside spherical portion 45 of a presently installed submarine cable protecting device 71 is first inserted into the inside spherical surface 77 of the previously installed submarine cable protecting device 71. One of the inside spherical surface 27 and the inside spherical surface 47 of the presently-installed submarine cable protecting device 71, which is located opposite to the inserted one of the spherical portion 25 and the spherical portion 45, is separated from the submarine cable 65.

Hereinafter, for the sake of simplicity of the explanation of FIG. 14, the previously installed submarine cable protecting device 71 will be referred to as the first device 71, and the presently installed submarine cable protecting device 71 will be referred to as the second device 71.

In the installing procedure of FIG. 14, the outside spherical portion 45 of the second half member 41 of the second device 71 is inserted, and the inside spherical surface 47 of the second half member 41 is separated from the submarine cable 65.

After the second half member 41 is inserted, the outside spherical portion 25' of the first half member 21' of the second device 71 is inserted into the inside spherical surface 77 of the first device 71, which is indicated by a two-dot chain line in FIG. 14. Then, the inside spherical portion 27 of the first half member 21 of the second device 71 is separated from the submarine cable 65, which is indicated by a solid line of FIG. 14. Since the installing condition of the second device 71 at this time is the same as that of the installing procedure of FIG. 12, steps which are the same as those corresponding steps of the installing procedure of FIG. 12 are performed.

After the insertion of the outside spherical portion 25, the cylindrical portion 22 of the first half member 21 and the cylindrical portion 42 of the second half member 41 are contacted at their front ends. In the second device 71, the fitting surfaces 29 and the fitting surfaces 42 are contacted with each other, and the spherical surface 27 and the spherical surface 47 form the inside spherical surface 77. The connecting unit (or the connecting pins 51) and the coupling unit 55 are fitted to the second device 71, and the second device 71 is installed in the same condition as the first device 71.

The second device 71 is installed as shown in FIGS. 11A–11C, and the inside spherical surface 77 of the first device 71 encompasses the outside spherical surface 75 of the second device 71, and the outside spherical surface 75 of the second device 71 cannot be detached from the inside spherical surface 77 of the first device 71 when the first and second devices 71 are connected in series.

According to the installing procedure of FIG. 14, the first half member 21 and the second half member 41 can be separately installed, and the present embodiment can remarkably facilitate the installation of the pairs of the half members in series.

Figure 15:
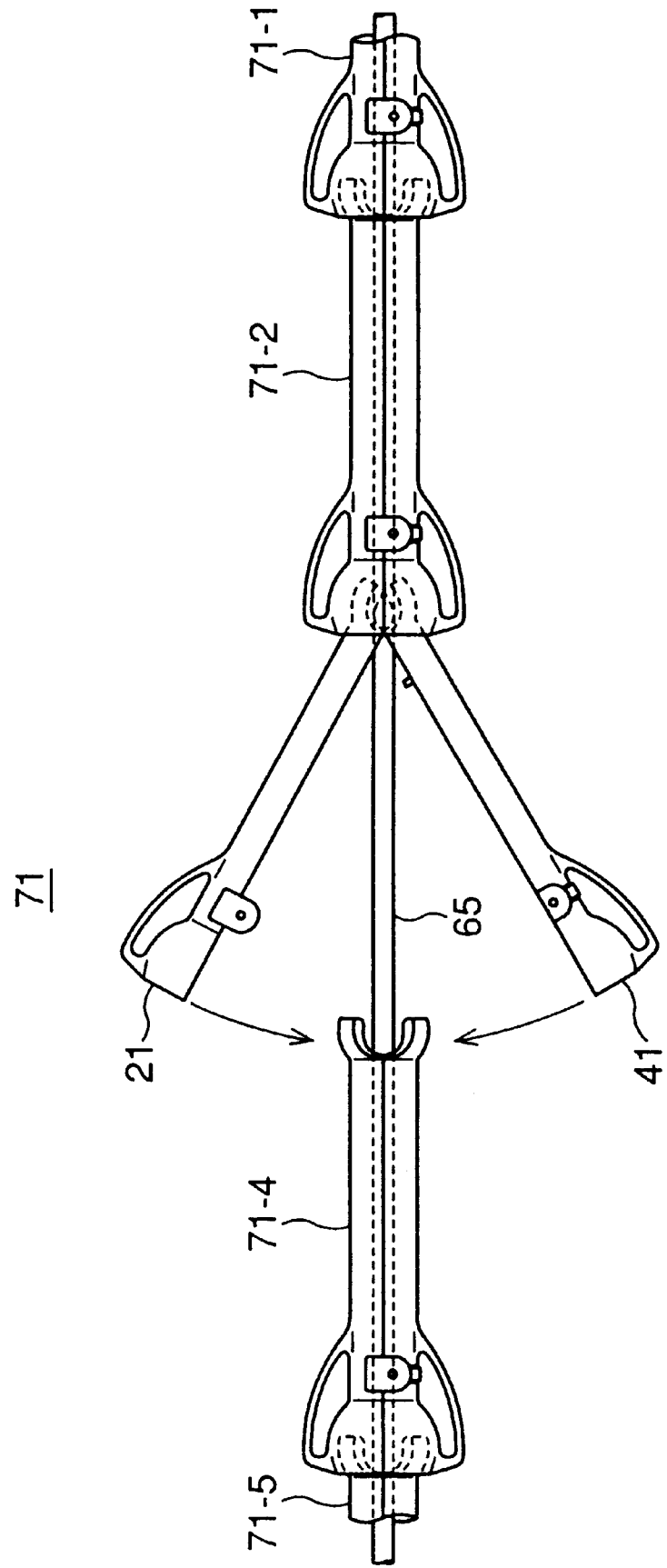
FIG. 15 is a diagram for explaining a further installing procedure of the submarine cable protecting device of the first embodiment.

FIG. 15 shows a further installing procedure of the submarine cable protecting device of the first embodiment.

As shown in FIG. 15, a submarine cable protecting device 71-1 and a submarine cable protecting device 71-2 are previously installed in series at the rear end of the submarine cable 65, and a submarine cable protecting device 71-4 and a submarine cable protecting device 71-5 are previously installed in series at the front end of the submarine cable 65. In the present embodiment, the installation of the devices 71-1 and 71-2 and the installation of the devices 71-4 and 71-5 can be simultaneously performed at the two locations. The submarine cable protecting device 71-2 is a final one with which the installation of the devices 71-1 and 71-2 is finished. The submarine cable protecting device 71-4 is a starting one with which the installation of the devices 71-4 and 71-5 is started.

In the present embodiment, a presently installed submarine cable protecting device 71 is installed at a location between the final submarine cable protecting device 71-2 and the starting submarine cable protecting device 71-4. Similarly to the installing procedures of FIG. 12 and FIG. 14, the cylindrical portion 22 of the first half member 21 and the cylindrical portion 42 of the second half member 41 are contacted at their rear ends and separated from each other at their front ends.

By moving the presently installed device 71 in the right direction along the central axis of the submarine cable 65, the outside spherical portion 75 of the presently installed device 71 is inserted into the inside spherical portion 77 of the device 71-2.

After the insertion of the outside spherical portion 75, the cylindrical portion 22 of the first half member 21 and the cylindrical portion 42 of the second half member 41 are contacted at their front ends, as indicated by the arrows in FIG. 15. In the presently installed device 71, the fitting surfaces 29 and the fitting surfaces 49 are contacted with each other, and the spherical surface 27 and the spherical surface 47 form the inside spherical surface 77. The connecting unit (or the connecting pins 51) and the coupling unit 55 are fitted to the presently installed device 71, and the device 71 is installed in the same condition as the device 71-2.

In order to carry out the installing procedure of FIG. 15, the positioning of the final device 71-2 and the starting device 71-4 with respect to the submarine cable 65 before the installation is started is needed. That is, it is necessary that the length of the presently installed device 71 is the same as the distance between the final submarine cable protecting device 71-2 and the starting submarine cable protecting device 71-4.

The positioning mentioned above is performed in several manners. For example, a distance from the front end of the final device 71-2 which is substantially the same as the length of the presently installed device 71 is measured and a starting point on the submarine cable 65 for installing the starting device 71-4 is determined before the installation of the devices 71-4 and 71-5 is started. Alternatively, positioning marks are attached to the submarine cable 65 before the installation of the devices is started, the positioning marks defining the length of each of the devices 71-1, 71-2, 71, 71-4 and 71-5.

According to the installing procedure of FIG. 15, it is possible that the installation of the pairs of the half members be simultaneously performed at two or more separate locations, by performing the positioning of the submarine cable protecting devices on the submarine cable in advance.

FIGS. 16A through 16E show another example of the coupling unit for use in the submarine cable protecting device of the first embodiment.

Figure 16A:
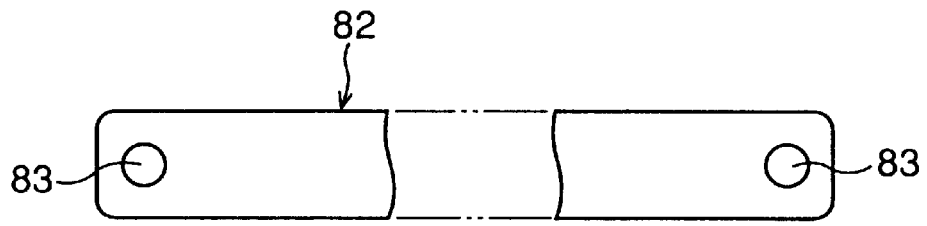
FIGS. 16A through 16E are diagrams of another example of the coupling unit.
Figures 16B, 16C, 16D:
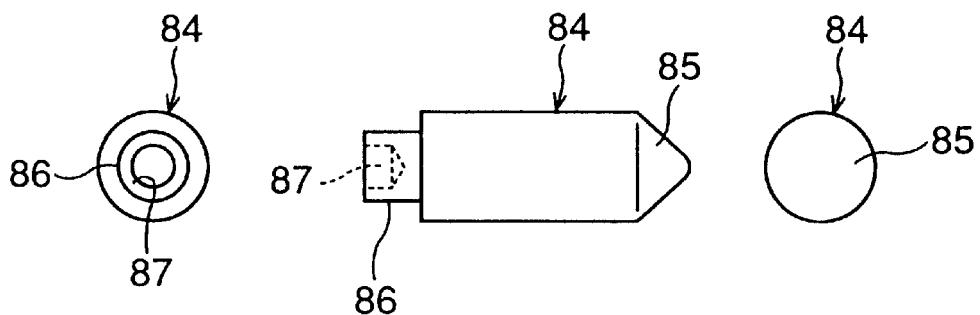
Figure 16E:
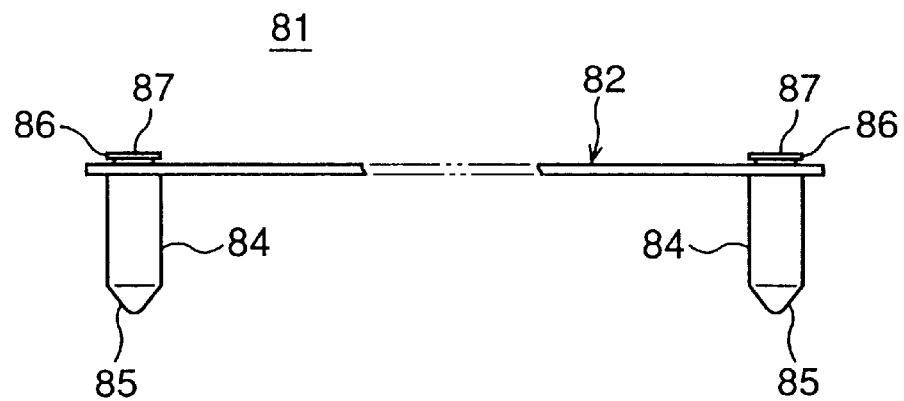

Similarly to the coupling unit 51 of FIGS. 7A through 7E, this coupling unit 81 is fitted into the through holes 53 of the second half member 41. FIG. 16A shows a leaf spring 82 of the coupling unit 81. FIG. 16B, FIG. 16C and FIG. 16D are a side view, a rear view and a front view of one of a pair of coupling pins 84 of the coupling unit 81. FIG. 16E is a side view of the coupling unit 81 which is assembled.

As shown in FIG. 16A, the leaf spring 82 has circular holes 83 at ends of the leaf spring 82. As shown in FIGS. 16B through 16D, each of the coupling pins 84 has a generally cylindrical portion, and each includes a tapered end 85 at the front end of the cylindrical portion and a circular head 86 at the rear end of the cylindrical portion. The head 86 has a circular recess 87 which is formed inside the head 86 by drilling.

As shown in FIG. 16E, the circular heads 86 at the rear ends of the coupling pins 84 are fitted into the circular holes 83 of the leaf spring 81. The periphery of the circular recess 87 of each of the coupling pins 84 is deformed outward by crimping, such that the head 86 of each coupling pin 84 in the holes 83 cannot be detached from the leaf spring 82. The coupling pins 84 after the crimping are freely rotatable around the centers of the holes 83 of the leaf spring 82.

The leaf spring 82 and the coupling pins 84 are made of a suitable metallic material having a high corrosion resistance and a high salt water resistance. For example, a stainless steel may be used for the coupling unit 81.

In the above-described example, the leaf spring 82 and the coupling pins 84 are joined by crimping. Alternatively, welding may be used to join the leaf spring 82 and the coupling pins 84. However, in the alternative, care must be taken not to damage the elasticity and/or the corrosion resistance of the leaf spring 82 due to the heat of the welding.

Similarly to the coupling procedure of FIGS. 8–9B, by using the coupling unit 81 of this embodiment, the first half member 21 and the second half member 41 are coupled to each other.

When the coupling unit 81 is attached to the second half member 41, the leaf spring 82 is bent in a U-shape, and the coupling pins 84 at the ends of the leaf spring 82 face the outside. The leaf spring 82 is fitted into the opening 54 of the second half member 4L. The pins 84 of the coupling unit 81 are inserted into the through holes 53 of the second half member 41L. The leaf spring 82 returns to its original shape, and the ends of the pins 84 are pushed outward from the parallel surfaces 52.

The first half member 21 is placed above the second half member 41 with the coupling unit 81 attached, and the two members 21 and 41 are positioned with respect to each other such that the fitting lugs 32 and the fitting surfaces 52 confront each other. The tapered ends 85 of the coupling pins 84 and the slanting surfaces 35 of the fitting lugs 32 overlap each other. When the first half member 21 and the second half member 41 come within a certain distance of each other, the slanting surfaces 35 and the tapered ends 85 are easily contacted with each other.

When the two members 21 and 41 are moved closer to each other, the coupling pins 84 of the coupling unit 81 are moved inward along the slanting surfaces 35 of the fitting lugs 32 against the actuating force of the leaf spring 82. The pins 84 are pressed inward in the through holes 53 of the second half member 41. The front ends of the pins 84 touch the inside walls of the fitting lugs 32, and the inside walls of the fitting lugs 32 and the parallel surfaces 52 of the second half member 41 confront each other.

When the fitting surfaces 29 of the first half member 21 and the fitting surfaces 49 of the second half member 41 are contacted, the coupling pins 84 are inserted into the through holes 34 of the first half member 21 due to the actuating force of the leaf spring 82. After the coupling unit 81 is set in this condition, the first half member 21 and the second half member 41 are connected to each other, and the second half member 41 cannot be detached from the first half member 21.

In the above-described example, the coupling unit 81 has the coupling pins 84 with the tapered ends 85. There is no restriction that, when the coupling pins 84 are fitted into the leaf spring 82, the tapered ends 85 of the coupling pins 84 face in specified directions. According to the above-described example, it is possible to further facilitate the installation of the pairs of the half members in series.

FIGS. 17A through 17E show still another example of the coupling unit for use in the submarine cable protecting device of the first embodiment.

Figure 17A:
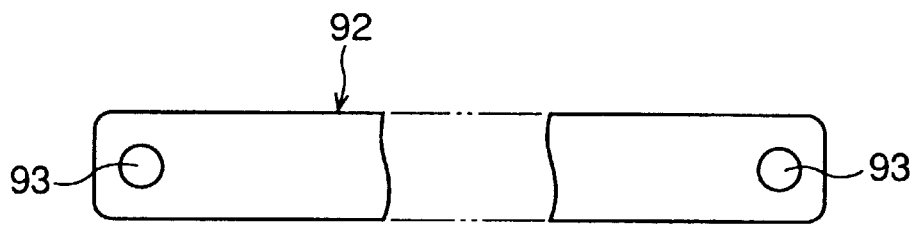
FIGS. 17A through 17E are diagrams of still another example of the coupling unit.
Figures 17B, 17C, 17D:
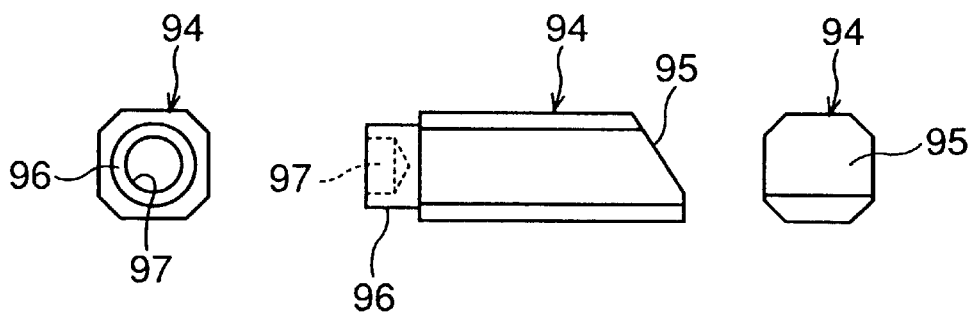
Figure 17E:
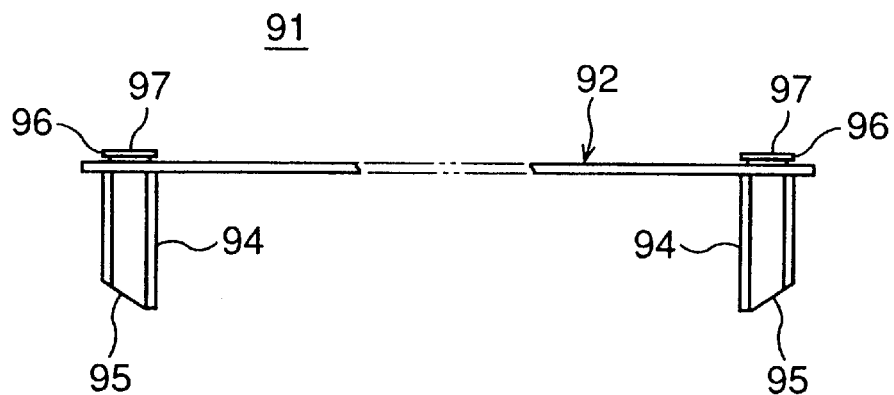

Similarly to the coupling unit 51 of FIGS. 7A through 7E, this coupling unit 91 is fitted into the through holes 53 of the second half member 41. FIG. 17A shows a leaf spring 92 of the coupling unit 91. FIG. 17B, FIG. 17C and FIG. 17D are a side view, a rear view and a front view of one of a pair of coupling pins 94 of the coupling unit 91. FIG. 17E is a side view of the coupling unit 91 which is assembled.

As shown in FIG. 17A, the leaf spring 92 has circular holes 93 at ends of the leaf spring 92. Each of the coupling pins 94 has a rectangular portion with its edges chamfered.

As shown in FIGS. 17B through 17D, each of the coupling pins 94 has a slanting surface 95 at the front end of the rectangular portion and a circular head 96 at the rear end of the rectangular portion. The head 96 has a circular recess 97 which is formed inside the head 96 by drilling.

As shown in FIG. 17E, the circular heads 96 at the rear ends of the coupling pins 94 are fitted into the circular holes 93 of the leaf spring 92. The periphery of the circular recess 97 of each of the coupling pins 94 is deformed outward by crimping, such that the head 96 of each coupling pin 94 in the holes 93 cannot be detached from the leaf spring 92. The coupling pins 94 after the crimping are freely rotatable around the centers of the holes 93 of the leaf spring 92.

The leaf spring 92 and the coupling pins 94 are made of a suitable metallic material having a high corrosion resistance and a high salt water resistance. For example, a stainless steel may be used for the coupling unit 91.

In the above-described example, the leaf spring 92 and the coupling pins 94 are joined by crimping. Alternatively, welding may be used to join the leaf spring 92 and the coupling pins 94. However, in the alternative, care must be taken not to damage the elasticity and/or the corrosion resistance of the leaf spring 92 due to the heat of the welding.

Similarly to the coupling procedure of FIGS. 8–9B, by using the coupling unit 91 of this embodiment, the first half member 21 and the second half member 41 are coupled to each other. In the above-described example, it is necessary that the through holes 53 of the second half member 41 and the through holes 34 of the first half member 21 be shaped into rectangular holes instead of the circular holes shown in FIG. 5B, the rectangular holes corresponding to the cross-sectional shape of the coupling pins 94.

When the coupling unit 91 is attached to the second half member 41, the leaf spring 92 is bent in a U-shape, and the coupling pins 94 at the ends of the leaf spring 92 face the outside. The leaf spring 92 is fitted into the opening 54 of the second half member 41. The pins 94 of the coupling unit 91 are inserted into the through holes 53 of the second half member 41. The leaf spring 92 returns to the original shape, and the ends of the pins 94 are pushed outward from the parallel surfaces 52 of the second half member 41.

The first half member 21 is placed above the second half member 41 with the coupling unit 91 attached, and the two members 21 and 41 are positioned with respect to each other such that the fitting lugs 32 and the fitting surfaces 52 confront each other. The slanting surfaces 95 of the coupling pins 94 and the slanting surfaces 35 of the fitting lugs 32 overlap each other. When the first half member 21 and the second half member 41 come within a certain distance of each other, the slanting surfaces 35 and the slanting surfaces 95 are easily contacted with each other.

When the two members 21 and 41 are moved closer to each other, the coupling pins 94 of the coupling unit 91 are moved inward along the slanting surfaces 35 of the fitting lugs 32 against the actuating force of the leaf spring 92. The pins 94 are pressed inward in the through holes 53 of the second half member 41. The front ends of the pins 94 touch the inside walls of the fitting lugs 32, and the inside walls of the fitting lugs 32 and the parallel surfaces 52 of the second half member 41 confront each other.

When the fitting surfaces 29 of the first half member 21 and the fitting surfaces 49 of the second half member 41 are contacted, the coupling pins 94 are inserted into the through holes 34 of the first half member 21 due to the actuating force of the leaf spring 92. After the coupling unit 91 is set in this condition, the first half member 21 and the second half member 41 are connected to each other, and the second half member 41 cannot be detached from the first half member 21.

In the above-described example, the coupling pins 94 can be easily produced from rectangular bar materials. According to the above-described example, it is possible to further facilitate the installation of the pairs of the half members in series.

FIGS. 18A and 18B show a further example of the coupling unit for use in the submarine cable protecting device of the first embodiment.

Similarly to the coupling unit 51 of FIGS. 7A through 7E, this coupling unit 101 is fitted into the through holes 53 of the second half member 41. FIG. 18A and FIG. 18B are a top view and a side view of the coupling unit 101 which is assembled.

As shown in FIGS. 18A and 18B, the coupling unit 101 includes a pair of wire springs 102. The wire springs 102 are arranged in two parallel lines. Each of the wire springs 102 has a generally straight portion and a pair of fold-back portions 103 at ends of the straight portion of the wire spring 102.

Each of the coupling pins 104 has a rectangular portion with its edges chamfered. Each of the coupling pins 104 has a slanting surface 105 on the bottom of the rectangular portion and two parallel grooves 107 on the top of the rectangular portion. Each of the coupling pins 104 has two parallel through holes 106 at an upper portion of the coupling pin 104. The straight portions of the wire springs 102 are inserted into the through holes 106 of the coupling pins 104, and the fold-back portions 103 of the wire springs 102 are fitted into the grooves 107 of the coupling pins 104.

As shown in FIGS. 18A and 18B, the slanting surfaces 105 of the coupling pins 104 at the ends of the wire springs 102 face outward. The coupling pins 104 are neither movable nor rotatable with respect to the wire springs 102.

The wire springs 102 and the coupling pins 104 are made of a suitable metallic material having a high corrosion resistance and a high salt water resistance. For example, a stainless steel may be used for the coupling unit 101.

In the above-described example, the wire springs 102 and the coupling pins 104 are joined by the fitting of the fold-back portions 103. It is not necessary to perform the crimping in order to join the wire springs 102 and the coupling pins 104. Alternatively, welding may be used to join the wire springs 102 and the coupling pins 104. However, in the alternative, care must be taken not to damage the elasticity and/or the corrosion resistance of the wire springs 102 due to the heat of the welding.

Similarly to the coupling procedure of FIGS. 8–9B, by using the coupling unit 101 of this embodiment, the first half member 21 and the second half member 41 are coupled to each other. In the above-described example, it is necessary that the through holes 53 of the second half member 41 and the through holes 34 of the first half member 21 be shaped into rectangular holes instead of the circular holes shown in FIG. 5B, the rectangular holes corresponding to the cross-sectional shape of the coupling pins 104.

When the coupling unit 101 is attached to the second half member 41, the wire springs 102 are bent in a U-shape, and the coupling pins 104 at the ends of the wire springs 102 face outward. The wire springs 102 are fitted into the opening 54 of the second half member 41. The pins 104 of the coupling unit 101 are inserted into the through holes 53 of the second half member 41. The wire springs 102 return to their original shape, and the ends of the pins 104 are pushed outward from the parallel surfaces 52 of the second half member 41.

The first half member 21 is placed above the second half member 41 with the coupling unit 101 attached, and the two members 21 and 41 are positioned with respect to each other such that the fitting lugs 32 and the fitting surfaces 52 confront each other. The slanting surfaces 105 of the coupling pins 104 and the slanting surfaces 35 of the fitting lugs 32 overlap each other. When the first half member 21 and the second half member 41 come within a certain distance of each other, the slanting surfaces 35 and the slanting surfaces 105 are easily contacted with each other.

When the two members 21 and 41 are moved closer to each other, the coupling pins 104 of the coupling unit 101 are moved inward along the slanting surfaces 35 of the fitting lugs 32 against the actuating force of the wire springs 102. The pins 104 are pressed inward in the through holes 53 of the second half member 41. The front ends of the pins 104 touch the inside walls of the fitting lugs 32, and the inside walls of the fitting lugs 32 and the parallel surfaces 52 of the second half member 41 confront each other.

When the fitting surfaces 29 of the first half member 21 and the fitting surfaces 49 of the second half member 41 are contacted, the coupling pins 104 are inserted into the through holes 34 of the first half member 21 due to the actuating force of the wire springs 102. After the coupling unit 101 is set in this condition, the first half member 21 and the second half member 41 are connected to each other, and the second half member 41 cannot be detached from the first half member 21.

In the above-described example, the coupling pins 104 can be easily produced from rectangular bar materials. It is not necessary to perform the crimping in order to join the coupling pins 104 and the wire springs 102. According to the above-described example, it is possible to further facilitate the installation of the pairs of the half members in series.

FIGS. 19A through 19E show a first half member 111 of a submarine cable protecting device in a second embodiment of the present invention. FIG. 19A, FIG. 19B, FIG. 19C, FIG. 19D and FIG. 19E are a top view, a side view, a bottom view, a front view and a rear view of the first half member 111, respectively.

As shown in FIGS. 19A through 19E, the first half member 111 comprises the cylindrical portion 22 which longitudinally extends along a central axis of the first half member 111. The cylindrical portion 22 has a semicircular cross section.

In the first half member 111, the outside spherical portion 25 extending rearward from the rear end of the cylindrical portion 22 is formed. In the spherical portion 25, the outside spherical surface 23 is formed. The outside spherical surface 23 has the outside diameter greater than the outside diameter of the cylindrical portion 22. The spherical portion 25 has the parallel walls 24 on the sides of the spherical portion 25. The parallel walls 24 have the width substantially equal to the width of the cylindrical portion 22.

The inside spherical surface 27 extending forward from the front end of the cylindrical portion 22 is formed. The inside spherical surface 27 is shaped such that the inside spherical surface 27 encompasses the outside spherical surface 23 of the spherical portion 25 of another first half member 111, and the spherical portion 25 of that first half member 111 cannot be detached from the spherical surface 27 of this first half member 111 when the two members 111 are connected in series.

The handle portion 28 is attached at one end to the top of the outside surface of the cylindrical portion 22 and at the other end to the top of the outside surface of the spherical surface 27. The handle portion 28 serves to reinforce the cylindrical portion 22 and the spherical surface 27.

The fitting surfaces 29 on the bottom of the cylindrical portion 22 are formed. The pin insertion holes 31 at the rear positions of the fitting surfaces 29 near the spherical portion 25 are formed. The connecting pins 51 of a second half member 121 (which will be described later) are inserted into the pin insertion holes 31 in order to position the cylindrical portion 22.

A pair of fitting lugs 113 of the first half member 111 on the sides of the cylindrical portion 22 are formed. The fitting lugs 113 outwardly project from the sides of the front end of the cylindrical portion 22 near the inside spherical surface 27. Each of the fitting lugs 113 has a vertically extending bolt insertion hole 112 formed in the fitting lug 113. The fitting lugs 113 of the first half member 111 and a pair of fitting lugs 123 (which will be described later) of the second half member 121 are used to position the cylindrical portion 22. The bolt insertion holes 112 are used to couple the first half member 111 to the second half member 121.

The first half member 111 of the present embodiment is integrally formed through casting of a cast iron, a cast steel or the like. The first half member 111 having a sufficient thickness and a sufficient weight is formed. The first half member 111 has a strength sufficient to withstand the influences of seashore waves or sea currents.

FIGS. 20A through 20E show a second half member 121 of the submarine cable protecting device of the second embodiment. FIG. 20A, FIG. 20B, FIG. 20C, FIG. 20D, and FIG. 20E are a top view, a side view, a bottom view, a front view, and a rear view of the second half member 121 of this embodiment, respectively.

As shown in FIGS. 20A through 20E, the second half member 121 comprises the cylindrical portion 42 which longitudinally extends along the central axis of the second half member 121. The cylindrical portion 121 has a semi-circular cross section.

In the second half member 121, the outside spherical portion 45 extending rearward from the rear end of the cylindrical portion 42 is formed. In the outside spherical portion 45, the outside spherical surface 43 is formed. The outside spherical surface 43 has the outside diameter greater than the outside diameter of the cylindrical portion 42. The spherical portion 45 has the parallel walls 44 on the sides of the spherical portion 45. The parallel walls 44 have the width substantially equal to the width of the cylindrical portion 42.

The inside spherical surface 47 extending forward from the front end of the cylindrical portion 42 is formed. The inside spherical surface 47 is shaped such that the inside spherical surface 47 encompasses the outside spherical surface 43 of the spherical portion 45 of another second half member 121, and the spherical portion 45 of that second half member 121 cannot be detached from the spherical surface 47 of this second half member 121 when the two members 121 are connected in series.

In the above-described embodiment, when the first half member 111 and the second half member 121 are connected to each other, the outside spherical surface 23 and the outside spherical surface 43 form an outside surface of a minor part into which a first sphere is cut by a vertical plane, the minor part being smaller than half of the first sphere. Further, the inside spherical surface 27 and the inside spherical surface 47 form an inside surface of a major part into which a second sphere is cut by a vertical plane, the major part being greater than half of the second sphere.

The handle portion 48 is attached at one end to the bottom of the outside surface of the cylindrical portion 42 and at the other end to the bottom of the outside surface of the spherical surface 47. The handle portion 48 serves to reinforce the cylindrical portion 42 and the spherical surface 47.

The fitting surfaces 49 on the top of the cylindrical portion 42 are formed. The connecting pins 51 at the rear positions of the fitting surfaces 49 near the spherical portion 45 are embedded onto the fitting surfaces 49. The connecting pins 51 of the second half member 121 are fitted into the pin insertion holes 31 of the first half member 111 in order to position the cylindrical portion 42 and the cylindrical portion 22. Those described above in conjunction with FIGS. 10A and 10B are applicable to the second embodiment.

A pair of fitting lugs 123 on the sides of the front end of the cylindrical portion 42 near the spherical surface 47 are formed. The fitting lugs 123 have a shape which is the same as the shape of the fitting lugs 113, and the fitting lugs 113 and the fitting lugs 123 are snugly fitted to each other. Each of the fitting lugs 123 has a vertically extending bolt insertion hole 122 formed in the fitting lug 123. The bolt insertion holes 122 and the bolt insertion holes 112 continuously extend when the first half member 111 and the second half member 121 are connected to each other. The fitting lugs 123 of the second half member 121 and the fitting lugs 113 of the first half member 111 are fitted to each other to position the cylindrical portion 42 and the cylindrical portion 22.

The second half member 121 of the present embodiment is integrally formed through casting of a cast iron, a cast steel or the like. The second half member 121 having a sufficient thickness and a sufficient weight is formed. The second half member 41 has a sufficient strength. Only the connecting pins 51 are made of a suitable metallic material having a high corrosion resistance and a high salt water resistance. For example, a stainless steel may be used for the connecting pins 51.

Figure 21:
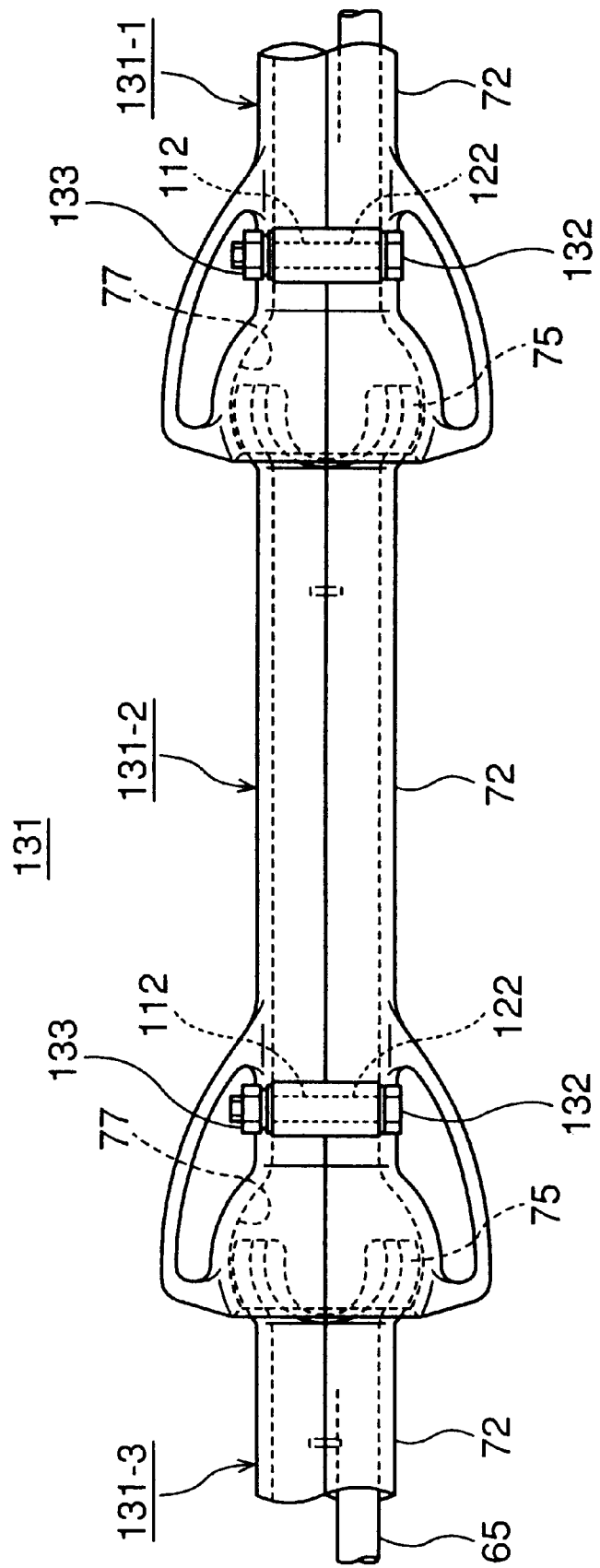
FIG. 21 is a diagram showing an installed condition of a plurality of pairs of the half members of the second embodiment which are installed in series.
Figure 22A:
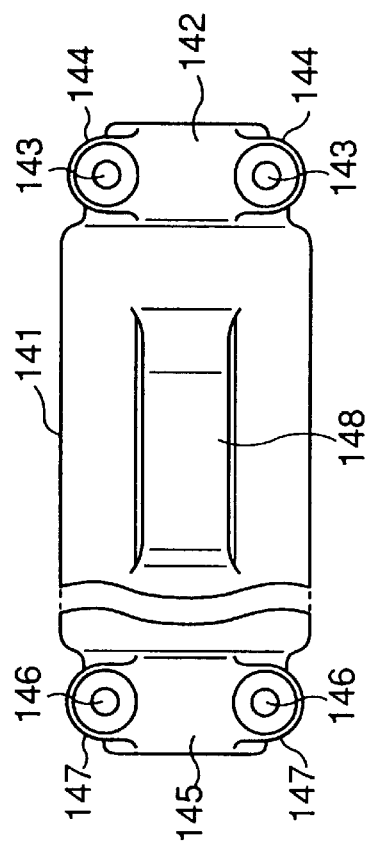
FIGS. 22A through 22D are various views of an additional half member of a submarine cable protecting device in a third embodiment of the present invention.
Figure 22D:
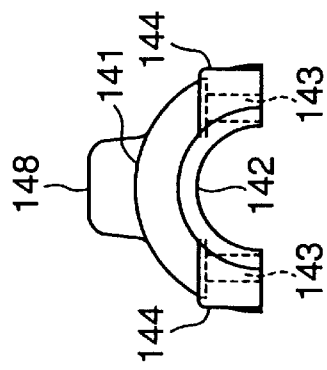
Figure 22B:
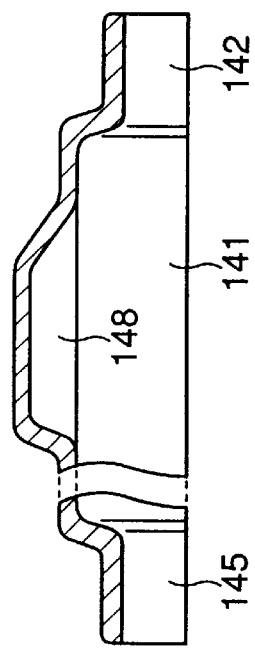
Figure 22C:
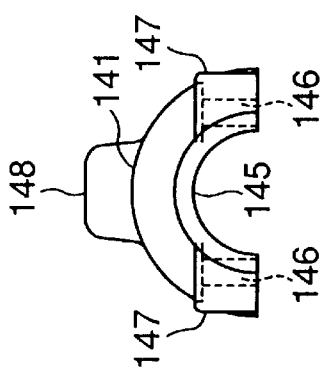

FIG. 21 shows an installed condition of a plurality of pairs of the half members of the second embodiment which are installed in series.

In FIG. 21, a submarine cable protecting device 131-1, a submarine cable protecting device 131-2 and a submarine cable protecting device 131-3 are installed in series in this order, and the submarine cable 65 is enclosed therein. The installing procedure described above in conjunction with FIG. 12 is applicable to the installation of these devices.

Referring to FIG. 21, the submarine cable protecting device 131-1 at the rear end of the submarine cable 65 is shown on the right side of FIG. 21. A pair of bolts 132 are inserted into the bolt insertion holes 112 and 122 of the device 131-1, and a pair of nuts 133 are attached to the bolts 132, and the bolts 132 and the nuts 133 are tightened together. The first half member 111 and the second half member 121 of the device 131-1 are fixed to each other, and the submarine cable protecting device 131-1 is installed.

The submarine cable protecting device 131-2 shown in the middle of FIG. 21 is installed to the front end of the previously installed device 131-1 in the same manner as the installing procedure of FIG. 12 or FIG. 14. The bolts 132 and the nuts 133 are used to install the device 131-2 in the same manner as described above concerning the previously installed device 131-1. The first half member 111 and the second half member 121 of the device 131-2 are fixed to each other, and the submarine cable protecting device 131-2 is installed.

Further, the submarine cable protecting device 131-3 at the front end of the submarine cable 65 shown on the left side of FIG. 21 is installed to the front end of the previously installed device 131-2 in the same manner. By performing the same installing procedure, it is possible that a plurality of pairs of the half members of the second embodiment be installed in series.

It should be noted that the installing procedure of FIG. 15 is also applicable to a plurality of pairs of the half members of the second embodiment.

In the above-described embodiment, the total number of the bolts 132 and the nuts 133 required to install the submarine cable protecting devices 131 of the second embodiment in series is reduced to half the total number of the bolts and the nuts required to install the conventional submarine cable protecting devices 9 of FIG. 2 in series. Therefore, the time needed for the installation of the pairs of the half members is remarkably reduced.

Further, in the above-described embodiment, there is a small clearance between the outside spherical surface 75 and the inside spherical surface 77 at each location where two adjacent ones of the submarine cable protecting devices 131 are connected in series. The submarine cable protecting devices 131 are slightly movable in the longitudinal direction with respect to each other, and are slightly rotatable around the central axis thereof with respect to each other. The submarine cable protecting device of the second embodiment is useful to facilitate the installation of the pairs of the half members in series.

FIGS. 22A through 22D show an additional half member 151 of a submarine cable protecting device in a third embodiment of the present invention. FIG. 22A, FIG. 22B, FIG. 22C and FIG. 22D are a top view, a side view, a front view and a rear view of the additional half member 151.

As shown in FIGS. 22A through 22D, the additional half member 151 comprises a cylindrical portion 141 which longitudinally extends along a central axis of the additional half member 151. The cylindrical portion 141 has a semicircular cross section.

In the additional half member 151, a reduced cylindrical portion 142 extending rearward from a rear end of the cylindrical portion 141 is formed. A reduced cylindrical portion 145 extending forward from a front end of the cylindrical portion 141 is formed. Further, a rectangular raised portion 148 on the top of the cylindrical portion 141 is formed. The reduced cylindrical portion 142 and the reduced cylindrical portion 145 have the same inside diameter, and the inside diameter of each of the reduced cylindrical portions 142 and 145 is smaller than the inside diameter of the cylindrical portion 141.

The additional half member 151 of the present embodiment is integrally formed through casting of a cast iron or a cast steel. The additional half member 151 having a sufficient thickness and a sufficient weight is formed, and it has also a sufficient strength. Further, the additional half member 151 has a longitudinal length smaller than the longitudinal length of each of the half members 21 and 41 of the first embodiment.

Figure 23:
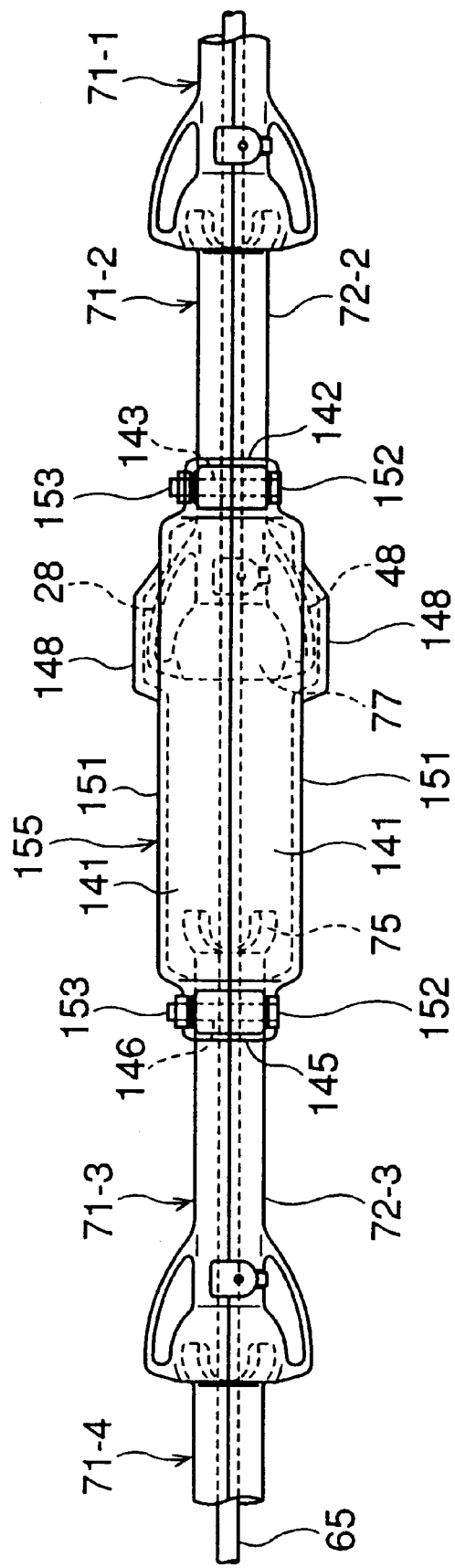
FIG. 23 is a diagram for explaining an installed condition of a plurality of pairs of the half members which are installed in series by using the half members of the third embodiments.
Figure 24A:
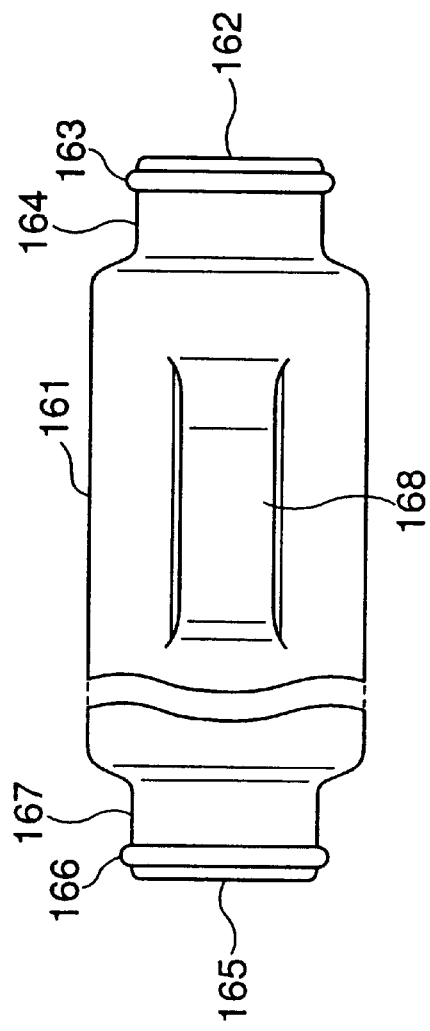
FIGS. 24A through 24D are various views of an additional half member of a submarine cable protecting device in a fourth embodiment of the present invention.
Figure 24D:
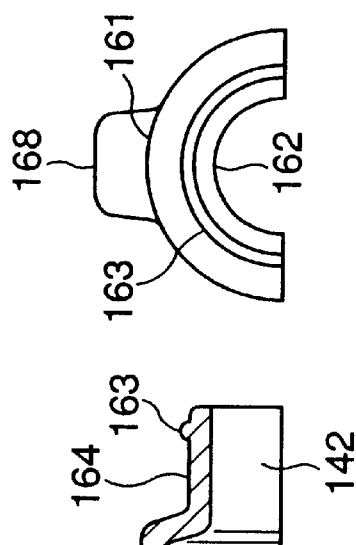
Figure 24B:
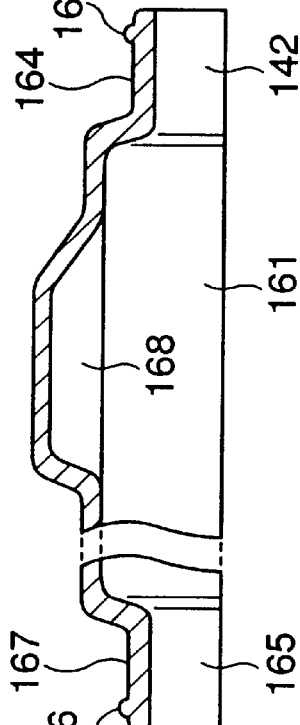
Figure 24C:
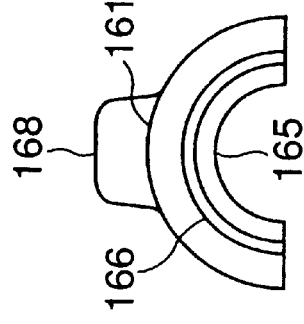

FIG. 23 shows an installed condition of a plurality of pairs of the half members which are installed in series by using the additional half members of the third embodiment.

As shown in FIG. 23, the submarine cable protecting device 71-1 and the submarine cable protecting device 71-2 are previously installed in series at the rear end of the submarine cable 65, and the submarine cable protecting device 71-3 and the submarine cable protecting device 71-4 are previously installed in series at the front end of the submarine cable 65. In the present embodiment, the installation of the devices 71-1 and 71-2 and the installation of the devices 71-3 and 71-4 can be simultaneously performed at the two locations. A submarine cable protecting device 155 which is assembled with a pair of the additional half members 151 of the third embodiment is a final one with which the installation of the devices 71-1 and 71-2 and the installation of the devices 71-3 and 71-4 are finished.

In the present embodiment, the finally installed submarine cable protecting device 155 is installed at a location between the submarine cable protecting device 71-2 and the submarine cable protecting device 71-3. In the case of the installing procedure of FIG. 15, it has been necessary that the length of the finally installed device is the same as the distance between the device 71-2 and the device 71-3. If the length of the finally installed device is greater than the distance between the device 71-2 and the device 71-3, it is impossible to properly finish the installation of the finally installed device. Therefore, in the case of the installing procedure of FIG. 15, the positioning of the device 71-2 and the device 71-3 with respect to the submarine cable 65 is needed.

However, in the third embodiment, it is no longer necessary that the length of the finally installed device 155 is the same as the distance between the device 71-2 and the device 71-3. As shown in FIG. 23, the half members 151 of the submarine cable protecting device 155 are connected to each other at the location between the device 71-2 and the device 71-3. The cylindrical portions 72-2 and 72-3 of the devices 71-2 and 71-3 are encompassed by the reduced cylindrical portions 142 and 145 of the device 155. Bolts 152 are inserted into the bolt insertion holes 143 and 146 of the device 155, and nuts 153 are attached to the bolts 152, and the bolts 152 and the nuts 153 are tightened together.

The cylindrical portion 141 of the additional half member 151 is formed such that it encompasses the outside spherical surface 75 of the device 71-3 and the inside spherical surface 77 of the device 71-2. The raised portion 148 of the additional half member 151 is formed such that it contains the handle portions 28 and 48 of the device 71-2. The reduced cylindrical portions 142 and 145 are formed such that they suitably contain the cylindrical portions 72-2 and 72-3 of the devices 71-2 and 71-3.

Accordingly, if the installing procedure of FIG. 15 is not applicable, the installation of the plurality of pairs of the half members can be easily carried out by using the additional half members of the third embodiment.

According to the installing procedure of FIG. 23, by using the additional half members of the third embodiment as the finally installed device, it is possible that the installation of the pairs of the half members be simultaneously performed at two or more separate locations. It is not necessary to perform the positioning of the submarine cable protecting devices on the submarine cable in advance.

It should be noted that the use of the half members of the above-described embodiment is not limited to the submarine cable protecting devices 71 of FIGS. 11A through 11C, and that the half members of the above-described embodiment may be used without restriction in combination with the submarine cable protecting devices 131 of FIG. 21 or other embodiments of the present invention.

FIGS. 24A through 24D show an additional half member 171 of a submarine cable protecting device in a fourth embodiment of the present invention. FIG. 24A, FIG. 24B, FIG. 24C and FIG. 24D are a top view, a side view, a front view and a rear view of the additional half member 171.

As shown in FIGS. 24A through 24D, the additional half member 171 comprises a cylindrical portion 161 which longitudinally extends along a central axis of the additional half member 171. The cylindrical portion 161 has a semicircular cross section.

In the additional half member 171, a reduced cylindrical portion 162 extending rearward from a rear end of the cylindrical portion 161 is formed. A reduced cylindrical portion 165 extending forward from a front end of the cylindrical portion 161 is formed. Further, a rectangular raised portion 168 on the top of the cylindrical portion 161 is formed. The reduced cylindrical portion 162 and the reduced cylindrical portion 165 have the same inside diameter, and the inside diameter of each of the reduced cylindrical portions 162 and 165 is smaller than the inside diameter of the cylindrical portion 161.

In the reduced cylindrical portion 162, an annular projection 163 at the rear end of the reduced cylindrical portion 162 is formed. A fitting recess 164 between the annular projection 163 and the rear end of the cylindrical portion 161 is formed. Similarly, in the reduced cylindrical portion 165, an annular projection 166 at the front end of the reduced cylindrical portion 165 is formed. A fitting recess 167 between the annular projection 166 and the front end of the cylindrical portion 162 is formed.

The additional half member 171 of the present embodiment is integrally formed through casting of a cast iron, a cast steel or the like. The half member 171 having a sufficient thickness and a sufficient weight is formed, and the additional half member 171 also has a sufficient strength. Further, the additional half member 171 has a longitudinal length smaller than the longitudinal length of each of the half members 21 and 41 of the first embodiment.

Figure 25:
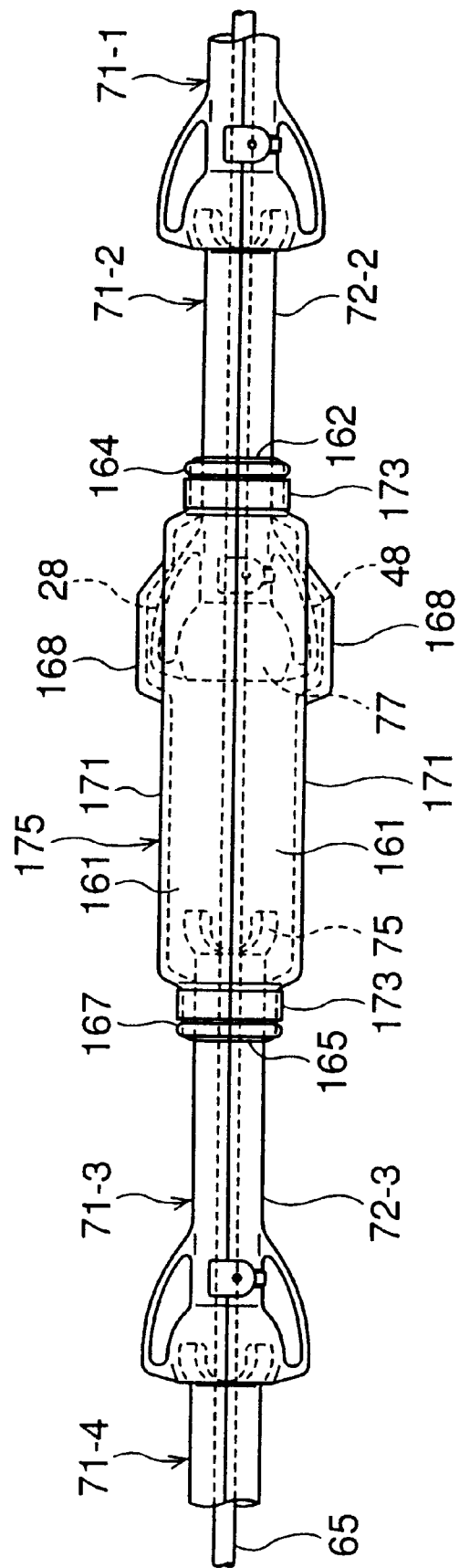
FIG. 25 is a diagram for explaining an installed condition of a plurality of pairs of the half members which are installed in series by using the additional half members of the fourth embodiment.

FIG. 25 shows an installed condition of a plurality of pairs of the half members which are installed in series by using the additional half members of the fourth embodiment.

As shown in FIG. 25, the submarine cable protecting device 71-1 and the submarine cable protecting device 71-2 are previously installed in series at the rear end of the submarine cable 65, and the submarine cable protecting device 71-3 and the submarine cable protecting device 71-4 are previously installed in series at the front end of the submarine cable 65. In the present embodiment, the installation of the devices 71-1 and 71-2 and the installation of the devices 71-3 and 71-4 can be simultaneously performed at two locations. A submarine cable protecting device 175 which is assembled with a pair of the additional half members 171 of the fourth embodiment is a final one with which the installation of the devices 71-1 and 71-2 and the installation of the devices 71-3 and 71-4 are finished.

In the fourth embodiment, the finally installed submarine cable protecting device 175 is installed at a location between the device 71-2 and the device 71-3. In the case of the installing procedure of FIG. 15, it has been necessary that the length of the finally installed device is the same as the distance between the device 71-2 and the device 71-3. If the length of the finally installed device is greater than the distance between the device 71-2 and the device 71-3, it is impossible to properly finish the installation of the finally installed device. Therefore, in the case of the installing procedure of FIG. 15, the positioning of the device 71-2 and the device 71-3 with respect to the submarine cable 65 is needed.

However, in the fourth embodiment, it is no longer necessary that the length of the finally installed device 175 is the same as the distance between the device 71-2 and the device 71-3.

As shown in FIG. 25, the additional half members 171 of the submarine cable protecting device 175 are connected to each other at the location between the device 71-2 and the device 71-3. The cylindrical portions 72-2 and 72-3 of the devices 71-2 and 71-3 are encompassed by the reduced cylindrical portions 162 and 165 of the device 175.

A pair of fasteners 173 are made of a metallic band material having a corrosion resistance and a sea water resistance. The fasteners 173 are fitted into the fitting recesses 164 and 167 of the device 175, and the fasteners 173 are tightened so that the finally installed device 175 is fixed at the location between the device 71-2 and the device 71-3.

The cylindrical portion 161 of the additional half member 171 is formed such that it encompasses the outside spherical surface 75 of the device 71-3 and the inside spherical surface 77 of the device 71-2. The raised portion 168 of the additional half member 171 is formed such that it contains the handle portions 28 and 48 of the device 71-2. The reduced cylindrical portions 162 and 165 are formed such that they suitably contain the cylindrical portions 72-2 and 72-3 of the devices 71-2 and 71-3.

Accordingly, if the installing procedure of FIG. 15 is not applicable, the installation of a plurality of pairs of the half members can be easily carried out by using the half members of the fourth embodiment.

According to the installing procedure of FIG. 25, by using the additional half members 171 of the fourth embodiment as the finally installed device, it is possible that the installation of the pairs of the half members be simultaneously performed at two or more separate locations. It is not necessary to perform the positioning of the submarine cable protecting devices on the submarine cable in advance.

It should be noted that the use of the half members of the above-described embodiment is not limited to the submarine cable protecting devices 71 of FIGS. 11A through 11C, and that the half members of the above-described embodiment may be used without restriction in combination with the submarine cable protecting devices 131 of FIG. 21 or other embodiments of the present invention.

FIGS. 26A through 26E show a half member 181 of a submarine cable protecting device in a fifth embodiment of the present invention. FIG. 26A, FIG. 26B, FIG. 26C, FIG. 26D and FIG. 26E are a top view, a side view, a bottom view, a front view and a rear view of the half member 181, respectively.

As shown in FIGS. 26A through 26E, the half member 181 comprises the cylindrical portion 22 which longitudinally extends along a central axis of the half member 181. The cylindrical portion 22 has a semicircular cross section.

In the half member 181, the outside spherical portion 25 extending rearward from the rear end of the cylindrical portion 22 is formed. In the spherical portion 25, the outside spherical surface 23 is formed. The outside spherical surface 23 has the outside diameter greater than the outside diameter of the cylindrical portion 22. The spherical portion 25 has the parallel walls 24 on the sides of the spherical portion 25. The parallel walls 24 have the width substantially equal to the width of the cylindrical portion 22.

The inside spherical surface 27 extending forward from the front end of the cylindrical portion 22 is formed. The inside spherical surface 27 is shaped such that the inside spherical surface 27 encompasses the outside spherical surface 23 of the spherical portion 25 of another half member 181, and the spherical portion 25 of that half member 181 cannot be detached from the spherical surface 27 of this half member 181 when the two half members 181 are connected in series.

The handle portion 28 is attached at one end to the top of the outside surface of the cylindrical portion 22 and at the other end to the top of the outside surface of the spherical surface 27. The handle portion 28 serves to reinforce the cylindrical portion 22 and the spherical surface 27.

Figure 27A:
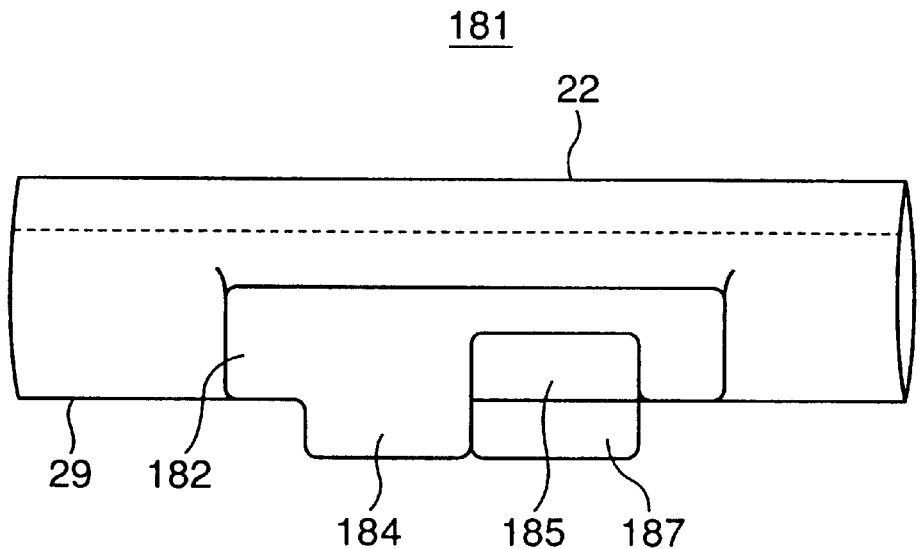
FIGS. 27A and 27B are enlarged views of a portion of the half member of FIGS. 26A through 26E.
Figure 27B:
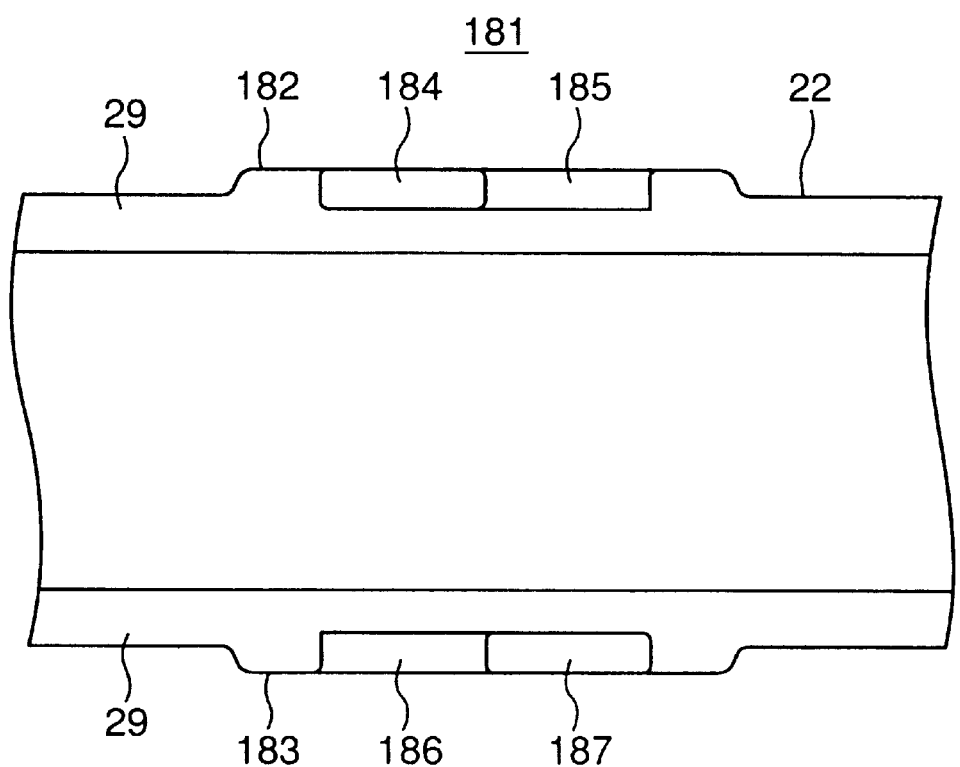

The fitting surfaces 29 on the bottom of the cylindrical portion 22 are formed. As shown in FIGS. 27A and 27B, a pair of fitting lugs 182 and 183 at rear positions of the cylindrical portion 22 near the spherical portion 25 are formed. The fitting lugs 182 and 183 outwardly project from the sides of the cylindrical portion 22.

The fitting lug 182 on the left side of the cylindrical portion 22 includes a projecting portion 184 and a recessed portion 185 which are adjacent to each other. The fitting lug 183 on the right side of the cylindrical portion 22 includes a recessed portion 186 and a projecting portion 187 which are adjacent to each other. The projecting portion 184 and the recessed portion 186 as well as the recessed portion 185 and the projecting portion 187 are provided at locations which are symmetrical with respect to the central axis of the cylindrical portion 22.

The projecting portion 184 and the recessed portion 185 of the fitting lug 182 and the recessed portion 186 and the projecting portion 187 of the fitting lug 183 constitute a connecting unit of the present embodiment.

Further, in the half member 181, a pair of fitting lugs 113 on the sides of the cylindrical portion 22 are formed. The fitting lugs 113 outwardly project from the sides of the front end of the cylindrical portion 22 near the inside spherical surface 27. Each of the fitting lugs 113 has a vertically extending bolt insertion hole 112 formed in the fitting lug 113. The fitting lugs 113 of the half member 181 are used to position the cylindrical portion 22. The bolt insertion holes 112 are used to couple a pair of the half members 181 to each other.

The half member 181 of the present embodiment is integrally formed through casting of a cast iron, a cast steel or the like. The half member 181 having a sufficient thickness and a sufficient weight is formed. The half member 181 has a strength sufficient to withstand the influences of seashore waves or sea currents.

Figure 28:
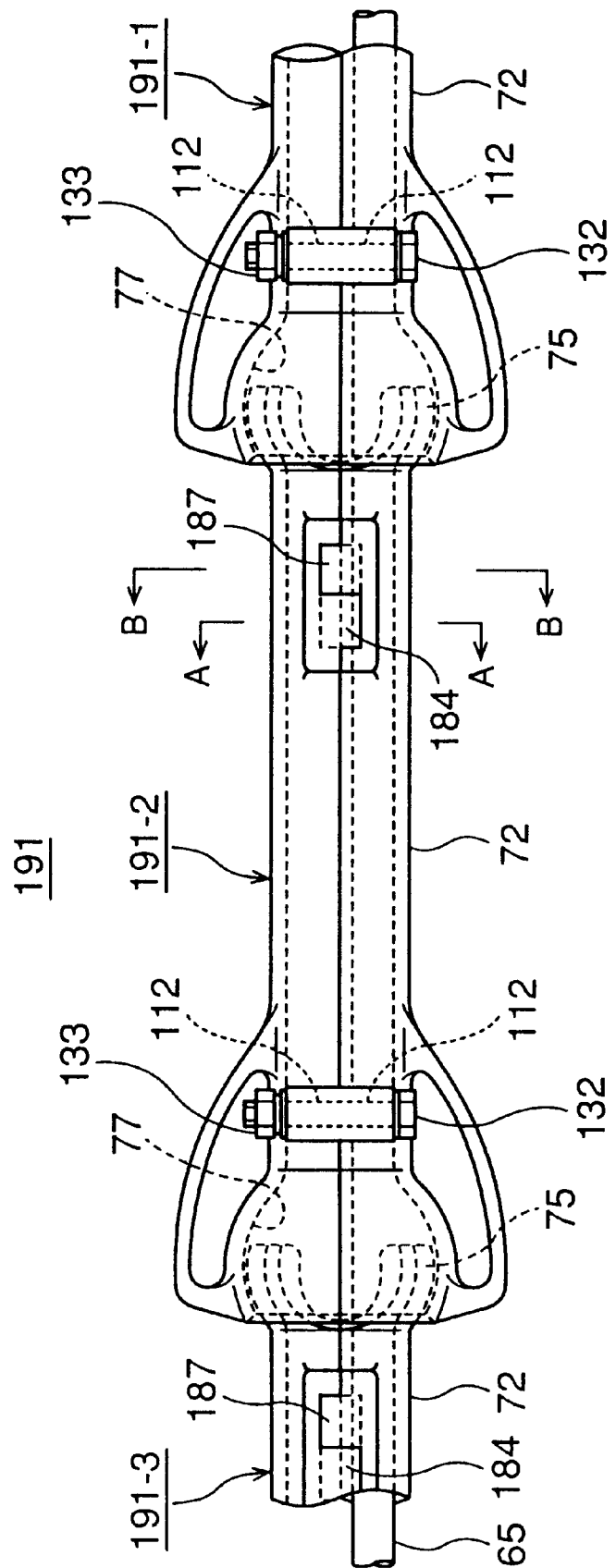
FIG. 28 is a diagram for explaining an installed condition of a plurality of pairs of the half members of the fifth embodiment which are installed in series.

FIG. 28 shows an installed condition of a plurality of pairs of the half members 181 of the fifth embodiment which are installed in series. A pair of the half members 181 of this embodiment are coupled to each other to form a submarine cable protecting device 191.

As shown in FIG. 28, a submarine cable protecting device 191-1, a submarine cable protecting device 191-2 and a submarine cable protecting device 191-3 are installed in series in this order, and the submarine cable 65 is enclosed therein. The installing procedure described above in conjunction with FIG. 12 is applicable to the installation of these devices.

Referring to FIG. 28, the submarine cable protecting device 191-1 at the rear end of the submarine cable 65 is shown on the right side of FIG. 28. A pair of bolts 132 are inserted into the bolt insertion holes 112 of the device 191-1, and a pair of nuts 133 are attached to the bolts 132, and the bolts 132 and the nuts 133 are tightened together. The two half members 181 of the device 191-1 are fixed to each other, and the submarine cable protecting device 191-1 is installed.

The submarine cable protecting device 191-2 shown in the middle of FIG. 28 is installed to the front end of the previously installed device 191-1 in the same manner as the installing procedure of FIG. 12 or FIG. 14. The bolts 132 and the nuts 133 are used to install the device 191-2 in the same manner as described above concerning the previously installed device 191-1. The two half members 181 of the device 191-2 are fixed to each other, and the device 191-2 is installed.

Further, the submarine cable protecting device 191-3 at the front end of the submarine cable 65 shown on the left side of FIG. 28 is installed to the front end of the previously installed device 191-2 in the same manner. By performing the same installing procedure, it is possible that a plurality of pairs of the half members 181 of the fifth embodiment be installed in series.

It should be noted that the installing procedure of FIG. 15 is also applicable to a plurality of pairs of the half members 181 of the fifth embodiment.

Figure 29A:
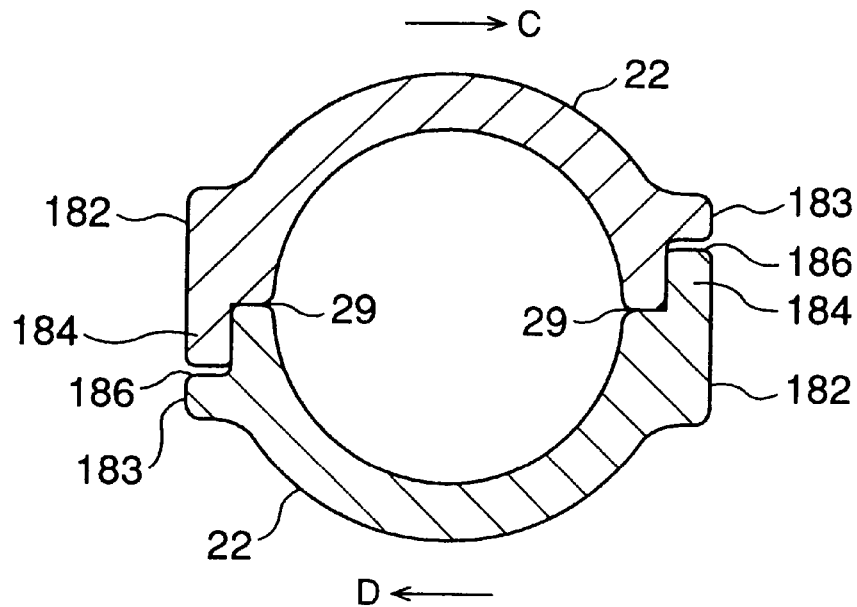
FIGS. 29A and 29B are cross-sectional views of the pairs of the half members of the fifth embodiment taken along lines A—A and B—B of FIG. 28.
Figure 29B:
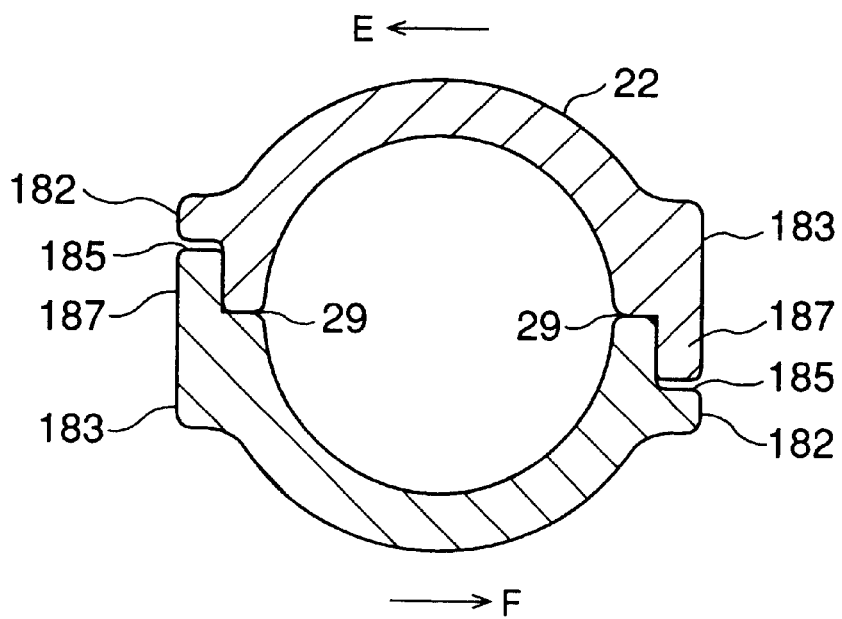

FIGS. 29A and 29B show cross sections of a portion of the pairs of the half members 181 of the fifth embodiment taken along lines A—A and B—B of FIG. 28. That is, the connecting unit of the fifth embodiment is shown in detail in FIGS. 29A and 29B.

As shown in FIG. 29A, the projecting portion 184 and the recessed portion 186, which constitute a part of the connecting unit of this embodiment, are coupled to each other when the two half members 181 are connected to each other. The connection of the projecting portions 184 and the recessed portions 186 of the two half members 181 inhibits relative movement of the two half members 181 in transverse directions indicated by the arrows C and D in FIG. 29A.

As shown in FIG. 29B, the projecting portion 187 and the recessed portion 185, which constitute a part of the connecting unit of this embodiment, are coupled to each other when the two half members 181 are connected to each other. The connection of the projecting portions 187 and the recessed portions 185 of the two half members 181 inhibits relative movement of the two half members 181 in transverse directions indicated by the arrows E and F in FIG. 29B.

Accordingly, the connecting unit of the fifth embodiment effectively prevents the relative movement of each pair of the half members 181.

In FIGS. 29A and 29B, the submarine cable 65 enclosed in the pairs of the half members 181 is omitted for the sake of convenience.

In the installing procedure of FIG. 28, the total number of the bolts 132 and the nuts 133 required to install the pairs of the half members 181 of the fifth embodiment in series is reduced to half the total number of the bolts and the nuts required to install the conventional submarine cable protecting devices 9 of FIG. 2 in series. Therefore, the time needed for the installation of the pairs of the half members is remarkably reduced. In addition, the connecting unit of the fifth embodiment effectively prevents the relative movement of each pair of the half members 181.

Further, in the above-described embodiment, there is a small clearance between the outside spherical surface 75 and the inside spherical surface 77 at each location where two adjacent ones of the submarine cable protecting devices 191 are connected in series. The pairs of the half members 181 of the fifth embodiment are slightly movable in the longitudinal direction with respect to each other, and slightly rotatable around the central axis thereof with respect to each other. The submarine cable protecting device of the fifth embodiment is useful to facilitate the installation of the pairs of the half members 181 in series.

FIGS. 30A through 30E show a half member 201 of a submarine cable protecting device in a sixth embodiment of the present invention. FIG. 30A, FIG. 30B, FIG. 30C, FIG. 30D and FIG. 30E are a top view, a side view, a bottom view, a front view and a rear view of the half member 201, respectively.

As shown in FIGS. 30A through 30E, the half member 201 comprises the cylindrical portion 22 which longitudinally extends along a central axis of the half member 201. The cylindrical portion 22 has a semicircular cross section.

In the half member 201, the outside spherical portion 25 extending rearward from the rear end of the cylindrical portion 22 is formed. In the spherical portion 25, the outside spherical surface 23 is formed. The outside spherical surface 23 has the outside diameter greater than the outside diameter of the cylindrical portion 22. The spherical portion 25 has the parallel walls 24 on the sides of the spherical portion 25. The parallel walls 24 have the width substantially equal to the width of the cylindrical portion 22.

The inside spherical surface 27 extending forward from the front end of the cylindrical portion 22 is formed. The inside spherical surface 27 is shaped such that the inside spherical surface 27 encompasses the outside spherical surface 23 of the spherical portion 25 of another half member 201, and the spherical portion 25 of that half member 201 cannot be detached from the spherical surface 27 of this half member 201 when the two half members 201 are connected in series.

The handle portion 28 is attached at one end to the top of the outside surface of the cylindrical portion 22 and at the other end to the top of the outside surface of the spherical surface 27. The handle portion 28 serves to reinforce the cylindrical portion 22 and the spherical surface 27.

Figure 31A:
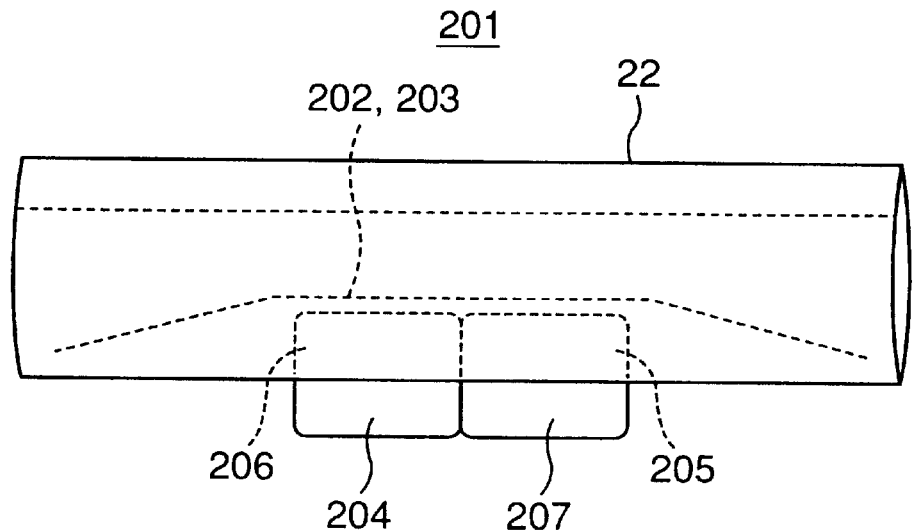
FIGS. 31A and 31B are enlarged views of a portion of the half member of FIGS. 30A through 30E.
Figure 31B:
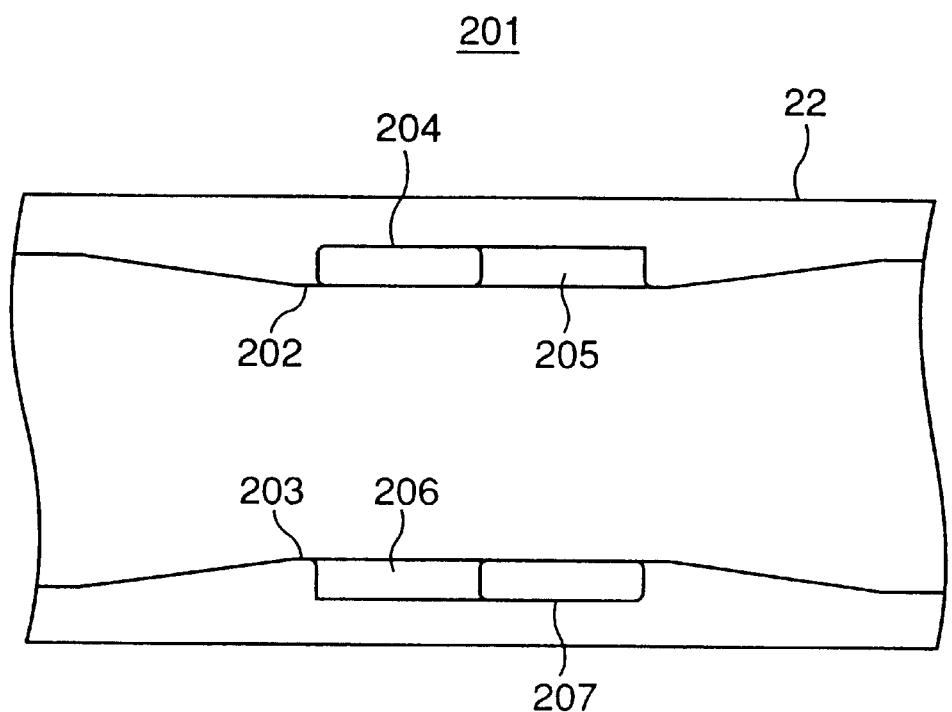

The fitting surfaces 29 on the bottom of the cylindrical portion 22 are formed. As shown in FIGS. 31A and 31B, a pair of bulged areas 202 and 203 at rear positions of the cylindrical portion 22 near the spherical portion 25 are formed. The bulged areas 202 and 203 inwardly project from the inside walls of the cylindrical portion 22.

The bulged area 202 on the left side of the cylindrical portion 22 includes a projecting portion 204 and a recessed portion 205 which are adjacent to each other. The bulged area 203 on the right side of the cylindrical portion 22 includes a recessed portion 206 and a projecting portion 207 which are adjacent to each other. The projecting portion 204 and the recessed portion 205 as well as the recessed portion 206 and the projecting portion 207 are provided at locations which are symmetrical with respect to the central axis of the cylindrical portion 22.

The projecting portion 204 and the recessed portion 205 of the bulged area 202 and the recessed portion 206 and the projecting portion 207 of the bulged area 203 constitute a connecting unit of the present embodiment.

Further, in the half member 201, the fitting lugs 113 on the sides of the cylindrical portion 22 are formed. The fitting lugs 113 outwardly project from the sides of the front end of the cylindrical portion 22 near the inside spherical surface 27. Each of the fitting lugs 113 has the vertically extending bolt insertion hole 112 formed in the fitting lug 113. The fitting lugs 113 of the half member 201 are used to position the cylindrical portion 22. The bolt insertion holes 112 are used to couple a pair of the half members 201 to each other.

The half member 201 of the present embodiment is integrally formed through casting of a cast iron, a cast steel or the like. The half member 201 having a sufficient thickness and a sufficient weight is formed. The half member 201 has a strength sufficient to withstand the influences of seashore waves or sea currents.

Figure 32:
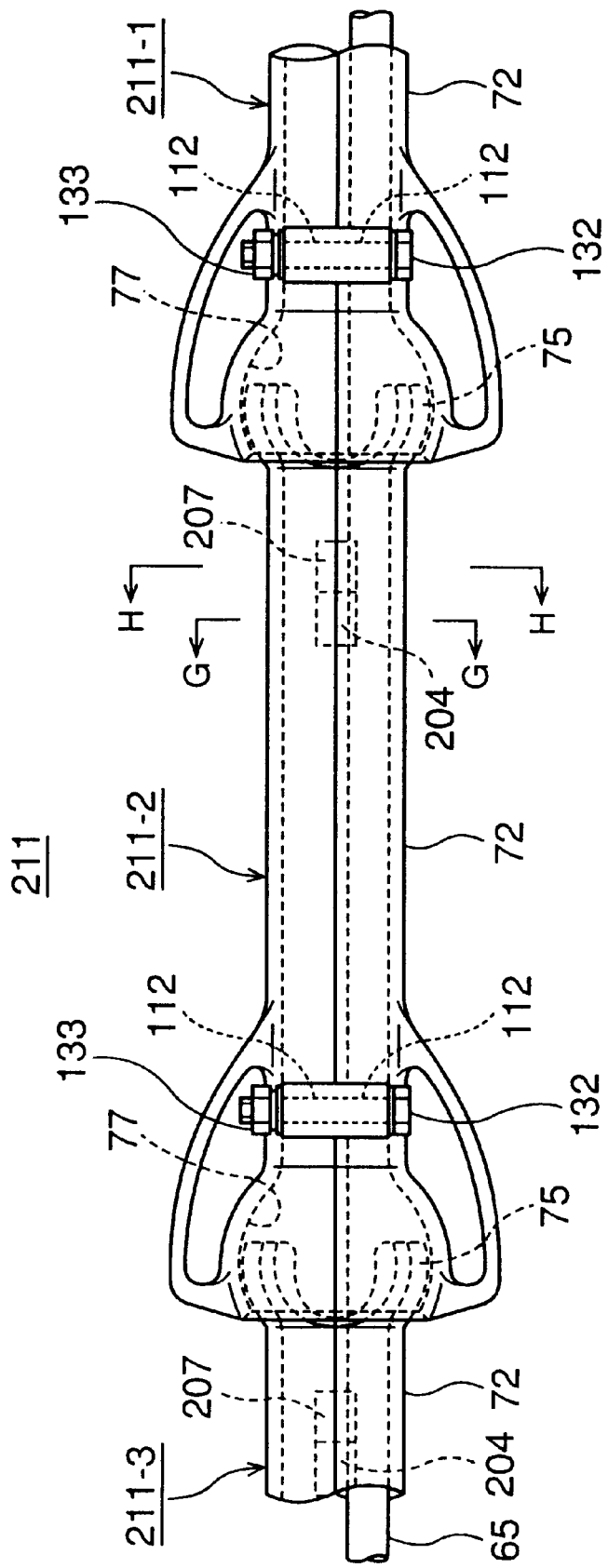
FIG. 32 is a diagram for explaining an installed condition of a plurality of pairs of the half members of the sixth embodiment which are installed in series.

FIG. 32 shows an installed condition of a plurality of pairs of the half members of the sixth embodiment which are installed in series. A pair of the half members 201 of this embodiment are coupled to each other to form a submarine cable protecting device 211.

As shown in FIG. 32, a submarine cable protecting device 211-1, a submarine cable protecting device 211-2 and a submarine cable protecting device 211-3 are installed in series in this order, and the submarine cable 65 is enclosed therein. The installing procedure described above in conjunction with FIG. 12 is applicable to the installation of these devices.

Referring to FIG. 32, the submarine cable protecting device 211-1 at the rear end of the submarine cable 65 is shown on the right side of FIG. 32. A pair of bolts 132 are inserted into the bolt insertion holes 112 of the device 211-1, and a pair of nuts 133 are attached to the bolts 132, and the bolts 132 and the nuts 133 are tightened together. The two half members 201 of the device 211-1 are fixed to each other, and the submarine cable protecting device 211-1 is installed.

The submarine cable protecting device 211-2 shown in the middle of FIG. 28 is installed to the front end of the previously installed device 211-1 in the same manner as the installing procedure of FIG. 12 or FIG. 14. The bolts 132 and the nuts 133 are used to install the device 211-2 in the same manner as described above concerning the previously installed device 211-1. The two half members 201 of the device 211-2 are fixed to each other, and the device 211-2 is installed.

Further, the submarine cable protecting device 211-3 at the front end of the submarine cable 65 shown on the right side of FIG. 28 is installed to the front end of the previously installed device 211-2 in the same manner. By performing the same installing procedure, it is possible that a plurality of pairs of the half members 201 of the fifth embodiment be installed in series.

It should be noted that the installing procedure of FIG. 15 is also applicable to a plurality of pairs of the half members 201 of the fifth embodiment.

Figure 33A:
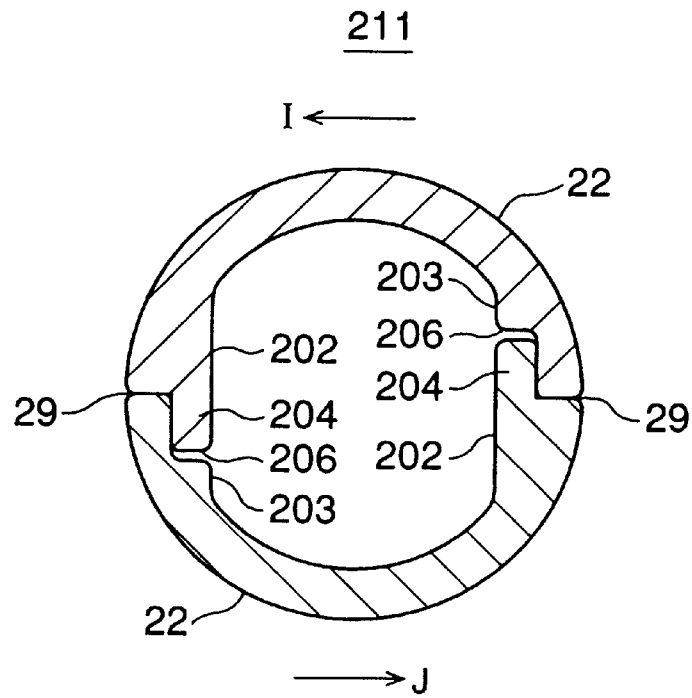
FIGS. 33A and 33B are cross-sectional views of the pairs of the half members of the sixth embodiment taken along lines G—G and H—H of FIG. 32.
Figure 33B:
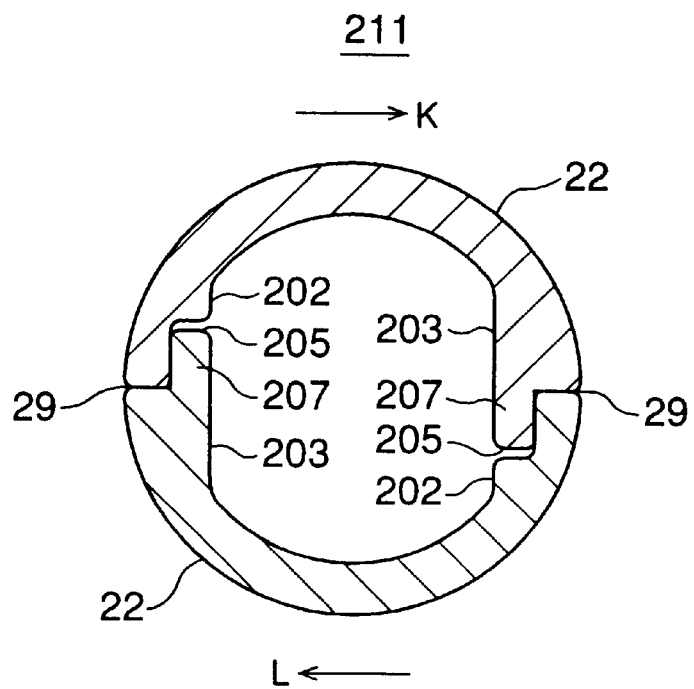

FIGS. 33A and 33B show cross sections of the pairs of the half members 201 of the sixth embodiment taken along lines G—G and H—H of FIG. 32. That is, the connecting unit of the sixth embodiment is shown in detail in FIGS. 33A and 33B.

As shown in FIG. 33A, the projecting portion 204 and the recessed portion 206, which constitute a part of the connecting unit of this embodiment, are coupled to each other when the two half members 201 are connected to each other. The connection of the projecting portions 204 and the recessed portions 206 of the two half members 201 inhibits relative movement of the two half members 201 in transverse directions indicated by the arrows I and J in FIG. 33A.

As shown in FIG. 33B, the projecting portion 207 and the recessed portion 205, which constitute a part of the connecting unit of this embodiment, are coupled to each other when the two half members 201 are connected to each other. The connection of the projecting portions 207 and the recessed portions 205 of the two half members 201 inhibits relative movement of the two half members 201 in transverse directions indicated by the arrows K and L in FIG. 33B.

The relative movement of each of the two half members 201 in both the transverse directions are canceled by each other because of the connection of the projecting portion 204 and the recessed portion 205 and the connection of the recessed portion 205 and the projecting portion 207. Accordingly, the connecting unit of the fifth embodiment effectively prevents the misalignment of the pairs of the half members 201 of the fifth embodiment.

In FIGS. 33A and 33B, the submarine cable 65 enclosed in the pairs of the half members 201 is omitted for the sake of convenience.

In the installing procedure of FIG. 32, the total number of the bolts 132 and the nuts 133 required to install the pairs of the half members 201 of the fifth embodiment in series is reduced to half the total number of the bolts and the nuts required to install the conventional submarine cable protecting devices 9 of FIG. 2 in series. Therefore, the time needed for the installation of the pairs of the half members is remarkably reduced. In addition, the connecting unit of the fifth embodiment effectively prevents the relative movement of each pair of the half members 201.

Further, in the above-described embodiment, there is a small clearance between the outside spherical surface 75 and the inside spherical surface 77 at each location where two adjacent ones of the submarine cable protecting devices 211 are connected in series. The pairs of the half members 201 of the fifth embodiment are slightly movable in the longitudinal direction with respect to each other, and slightly rotatable around the central axis thereof with respect to each other.

Further, in the above-described embodiment, the outside surface of the cylindrical portion 72 is in a completely circular shape and has no externally projecting area.

Therefore, the submarine cable protecting device of the fifth embodiment is useful to facilitate the installation of the pairs of the half members 201 in series.

FIGS. 34A through 34E show a half member 221 of a submarine cable protecting apparatus in a seventh embodiment of the present invention. FIG. 34A, FIG. 34B, FIG. 34C, FIG. 34D and FIG. 34E are a top view, a side view, a bottom view, a front view and a rear view of the half member 221, respectively.

As shown in FIGS. 34A through 34E, the half member 221 comprises a first cylindrical portion 222 which longitudinally extends along a central axis of the half member 221. The first cylindrical portion 222 has a semicircular cross section. A pair of fitting surfaces 223 on the bottom of the first cylindrical portion 222 are formed.

In the half member 221, a pair of projecting shafts 225 outwardly projecting from the rear end of the first cylindrical portion 222 are formed, and each of the projecting shafts 225 has a semicircular cross section. A pair of connecting lugs 224 at the side edges of the top of the projecting shafts 225 are formed. The projecting shafts 225 are based on the sides of the rear end of the first cylindrical portion 222, and a pair of parallel bearing surfaces 226 vertically extending on the sides of the rear end of the first cylindrical portion 222 are formed. The bearing surfaces 226 are in a semicircular shape. The bearing surfaces 226 have a width substantially equal to a width of the first cylindrical portion 222.

A second cylindrical portion 227 extending forward from the front end of the first cylindrical portion 222 is formed. The second cylindrical portion 227 has a semicircular cross section. The second cylindrical portion 227 has such an inside diameter that the second cylindrical portion 227 encompasses the first cylindrical portion 222 of another half member 221 and that the first cylindrical portion 222 of the other half member 221 cannot be detached from the second cylindrical portion 227 of this half member 221 when the two half members 221 are connected in series.

A positioning projection 228 on the top of the first cylindrical portion 222 at a given distance from the projecting shafts 225 is formed. An annular land 229 on the top of the second cylindrical portion 227 is formed. The annular land 229 has a circular bottom 231 within the annular land 229, and a bearing hole 236 on the bottom 231 of the annular land is formed. In the bearing hole 236, a pair of cut-out portions 237 are formed. A pair of shaft portions 235 (which will be described later) which are formed by a pair of the projecting shafts 225 coupled to each other can be inserted into the bearing hole 236. The pair of the connecting lugs 224 can pass through the cut-out portions 237 of the bearing hole 236.

A circular bearing surface 238 on the inside wall of the second cylindrical portion 227 is formed, the bearing surface 238 being opposite to the bottom 231 of the bearing hole 236 on the outside of the second cylindrical portion 227. The bearing surface 238 and the bottom 231 extend in parallel with each other.

The half member 221 of the present embodiment is integrally formed through casting of a cast iron, a cast steel or the like. The half member 221 having a sufficient thickness and a sufficient weight is formed. The half member 221 has a strength sufficient to withstand the influences of seashore waves or sea currents.

Figure 35B:
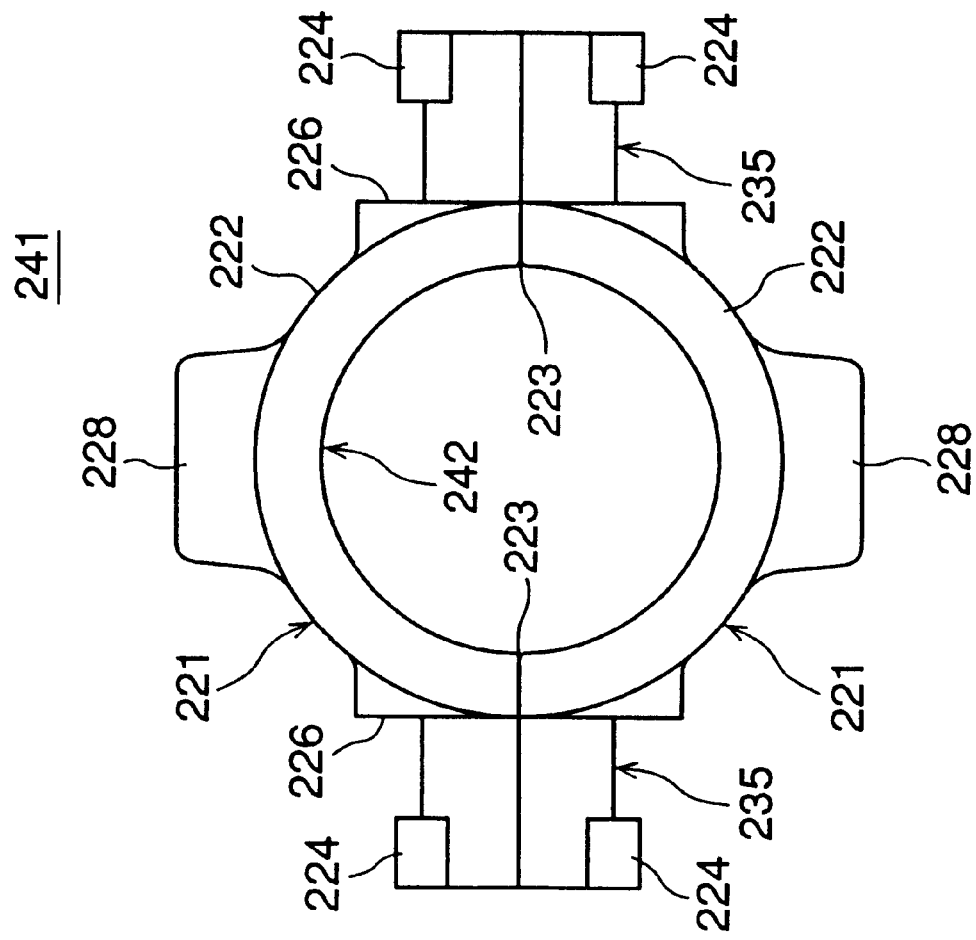
FIGS. 35A and 35B are diagrams for explaining an installing procedure of the submarine cable protecting device of the seventh embodiment.
Figure 35A:
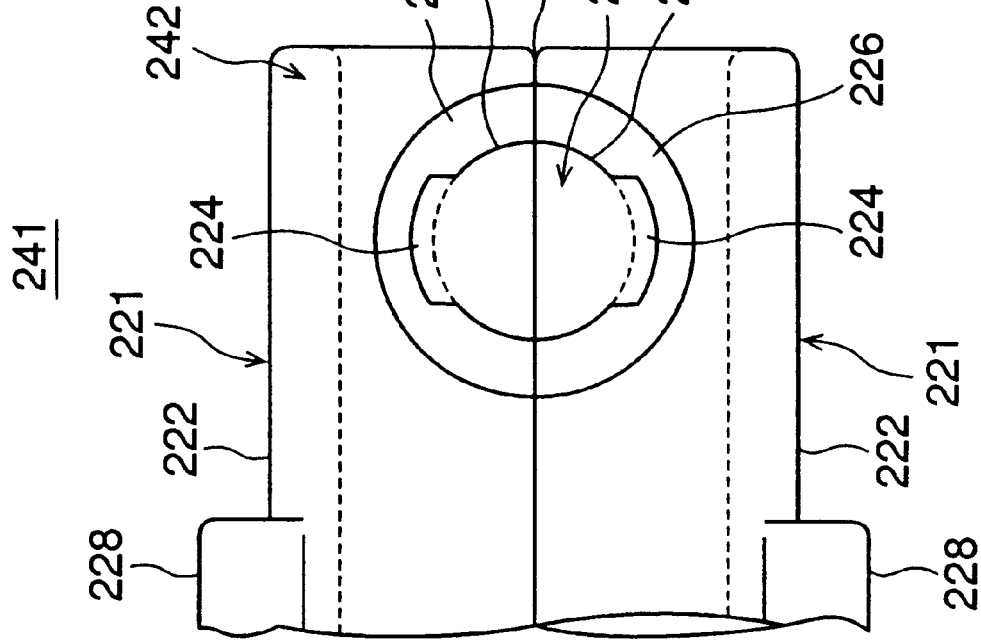

FIGS. 35A and 35B show an installing procedure of the submarine cable protecting device of the seventh embodiment. A pair of the half members 221 of this embodiment are coupled to each other to form a submarine cable protecting device 241. FIG. 35A and FIG. 35B are a side view and a rear view of a portion of the submarine cable protecting device 241.

In FIGS. 35A and 35B, the first cylindrical portions 222 of the two half members 221 are coupled to form a fully cylindrical portion 242, and the projecting shafts 225 of the two half members 221 are coupled to form the pair of the shaft portions 235 mentioned above.

As shown in FIGS. 35A and 35B, the central axis of the shaft portions 235 at the rear end of the cylindrical portion 242 and the central axis of the bearing hole 236 at the front end of the cylindrical portion 242 are at right angles to each other around the central axis of the cylindrical portion 242.

Figure 36B:
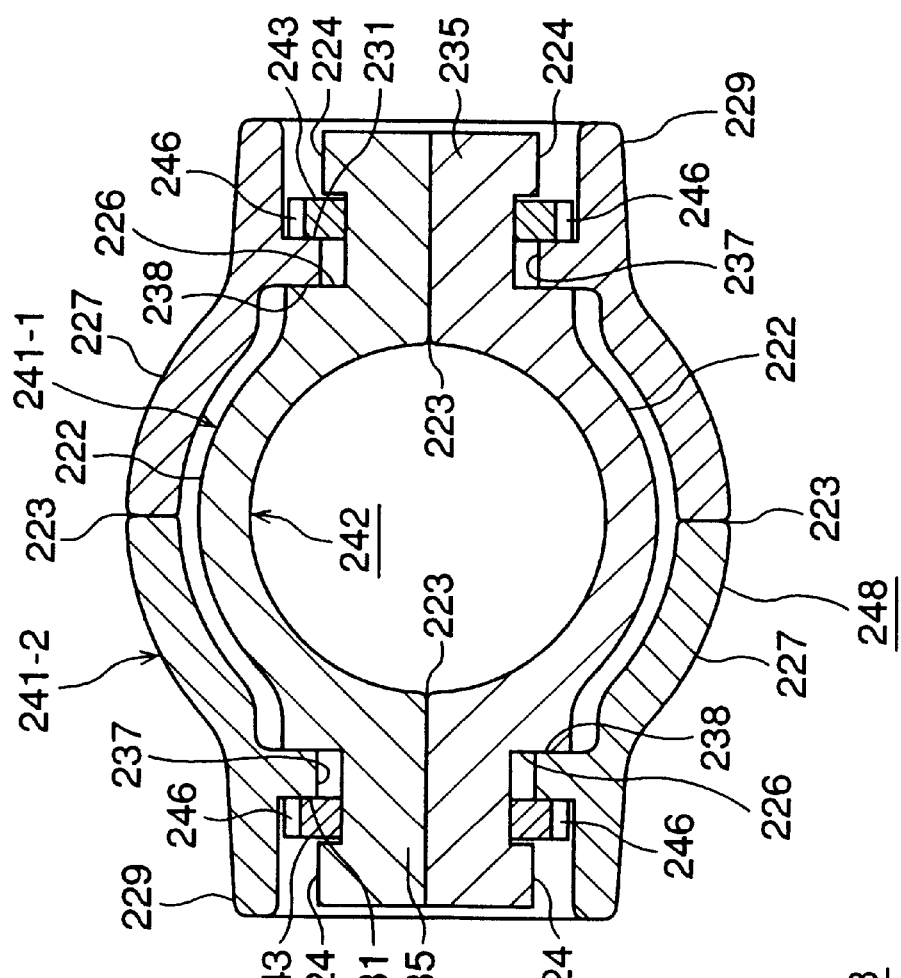
FIGS. 36A and 36B are diagrams for explaining the installing procedure of the submarine cable protecting device of the seventh embodiment of FIGS. 35A and 35B.
Figure 36A:
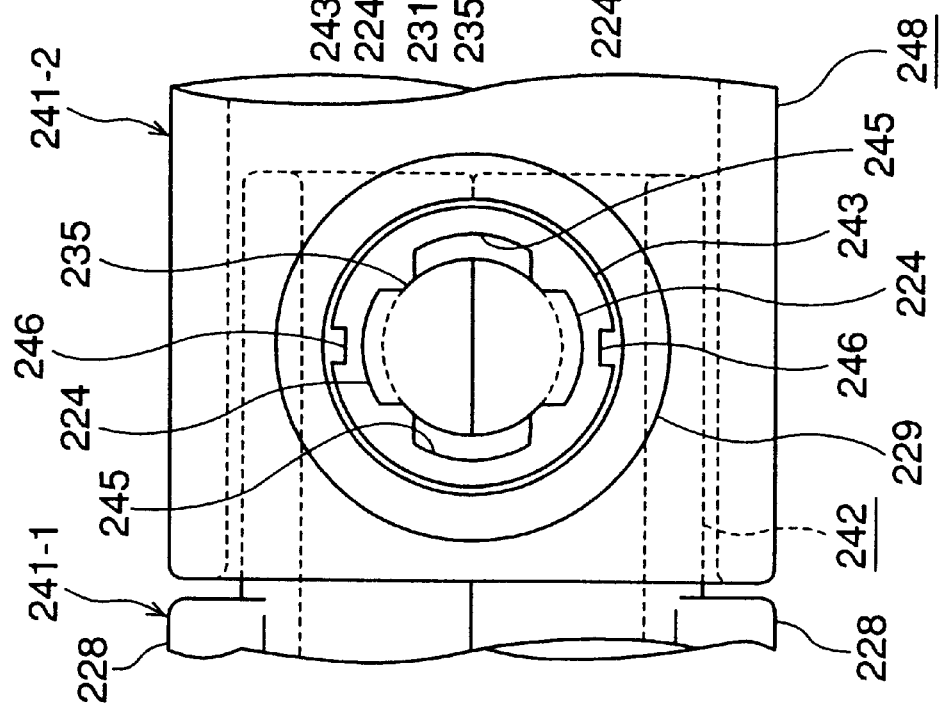

FIGS. 36A and 36B show the installing procedure of the submarine cable protecting device of the seventh embodiment of FIGS. 35A and 35B.

In FIGS. 36A and 36B, a pair of the half members 221 of this embodiment are coupled to each other to form a submarine cable protecting device 241-1 as shown in the installing procedure of FIGS. 35A and 35B. Further, in FIGS. 36A and 36B, another pair of the half members 221 of this embodiment are coupled to each other to form a submarine cable protecting device 241-2, and the second cylindrical portions 227 of the device 241-2 are connected to the cylindrical portion 242 of the device 241-1. The bearing hole 236 of the device 241-2 is fitted into the shaft portions 235 of the device 241-1. FIG. 36A and FIG. 36B are a side view and a rear view of the portion where the two submarine cable protecting devices 241-1 and 241-2 are connected in series.

Further, in FIGS. 36A and 36B, a pair of fitting units 243 are fitted into the shaft portions 235 of the submarine cable protecting device 241-1 so that the two submarine cable protecting devices 241-1 and 241-2 are connected in series.

Figure 37A:
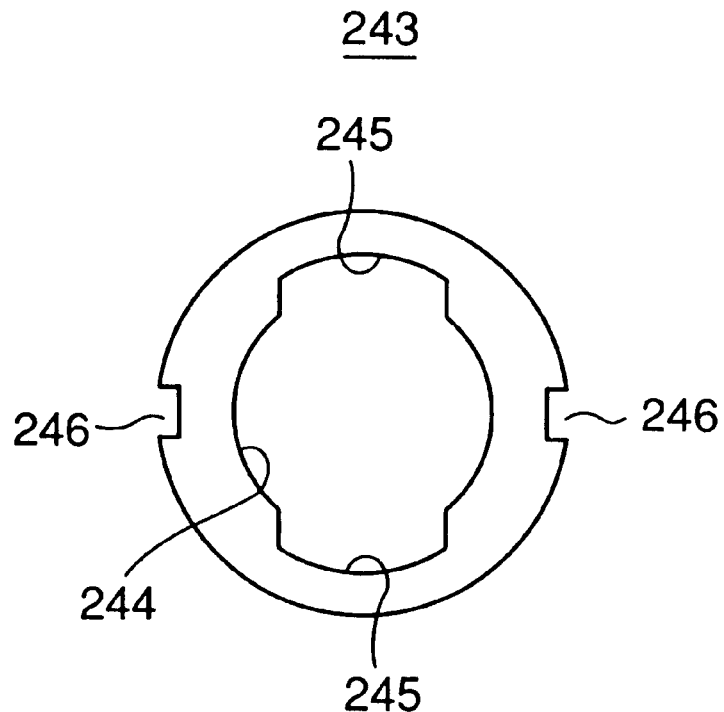
FIGS. 37A and 37B are diagrams of a fitting unit for use in the submarine cable protecting apparatus of the seventh embodiment.
Figure 37B:
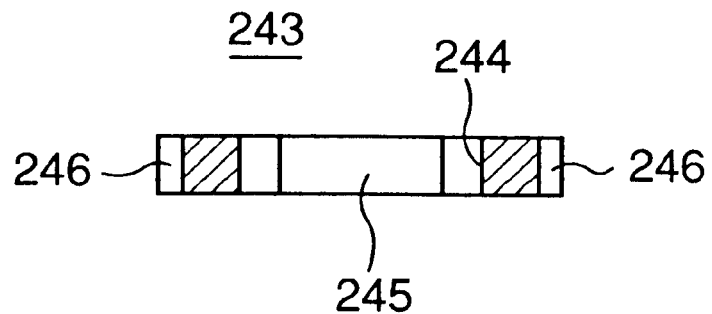

FIGS. 37A and 37B show one of the pair of fitting units 243 for use in the submarine cable protecting apparatus of the seventh embodiment. FIG. 37A and FIG. 37B are a front view and a cross-sectional view of the fitting unit 243 of this embodiment.

As shown in FIGS. 37A and 37B, the fitting unit 243 is in the shape of a generally circular disc. The fitting unit 243 comprises a bearing hole 244 around a central axis of the fitting unit 243. The bearing hole 244 of the fitting unit 243 is snugly fitted onto one of the shaft portions 235.

A pair of inside cut-out portions 245 which oppose each other on the periphery of the bearing hole 244 are formed. The connecting lugs 224 of the two half members 221 coupled to each other can pass through the inside cut-out portions 245 of the fitting unit 243.

Further, a pair of outside cut-out portions 246 which oppose each other on the periphery of the fitting unit 243 are formed. A suitable tightening tool (not shown) can be connected to the outside cut-out portions 246 when the fitting unit 243 on the shaft portion 235 is tightened.

The fitting unit 243 of this embodiment is made of a suitable stainless steel material having a high corrosion resistance and a high salt water resistance.

Referring back to FIGS. 36A and 36B, the submarine cable protecting device 241-2 is formed by the other pair of the half members 221, and the second cylindrical portions 227 of the two half members 221 are coupled to form a fully cylindrical portion 248. The cylindrical portion 248 of the device 241-2 is connected to the cylindrical portion 242 of the device 241-1 such that the cylindrical portion 248 encompasses the cylindrical portion 242 as shown in FIGS. 36A and 36B.

When the half members 221 of the device 241-2 and the half members 221 of the device 241-1 are connected in series, the bearing hole 236 of the device 241-2 is fitted onto the shaft portions 235 of the device 241-1. When the bearing hole 236 is fitted onto the shaft portions 235, the connecting lugs 224 of the device 241-1 pass through the cut-out portions 237 of the device 241-2. Therefore, the device 241-2 and the device 241-1 are easily connected in series without interference. In the present embodiment, the relative positions between the connecting lugs 224 and the cut-out portions 237 are arranged so as to allow the device 241-1 and the device 241-2 to be easily connected in series as mentioned above.

When the bearing hole 236 of the device 241-2 and the shaft portions 235 of the device 241-1 are fitted to each other, the shaft portions 235 cannot be detached from the bearing hole 236. Further, as shown in FIGS. 36A and 36B, there is a small clearance between the inside wall of the cylindrical portion 248 and the outside wall of the cylindrical portion 242. Therefore, the device 241-2 is slightly rotatable around the central axis of the shaft portions 235 relative to the device 241-1.

However, as shown in FIG. 36A, the end surface of the cylindrical portion 248 of the device 241-2 interferes with one of the positioning projections 228 on the top and bottom of the cylindrical portion 242 of the device 241-1 when the device 241-2 is rotated around the central axis of the shaft portions 235. Therefore, the range of the above rotation of the device 241-2 relative to the device 241-1 in both upward and downward directions is restricted to a predetermined range by the positioning projections 228.

In the above-described embodiment, as shown in FIG. 36B, the shaft portions 235 of the device 241-1 are encircled by the annular lands 229 of the cylindrical portion 248 of the device 241-2. As described above, the fitting units 243 are fitted into the shaft portions 235. The cut-out portions 245 of the fitting units 243 are easily inserted into the connecting lugs 224 of the shaft portions 235. After the fitting units 243 are inserted into the shaft portions 235, the fitting units 243 are rotated around the central axis of the shaft portions 235 by 90 degrees, as shown in FIG. 36A, by using a suitable tightening tool connected to the outside cut-out portions 246 of the fitting units 243. The positions of the inside cut-out portions 245 around the central axis of the shaft portions 235 deviate from the positions of the connecting lugs 224, and the fitting units 243 cannot be detached from the connecting lugs 224 of the shaft portions 235.

Further, in the above-described embodiment, in order to prevent the separation of the fitting units 243 from the shaft portions 235, it is necessary to take suitable measures for fixing the fitting units 243 on the shaft portions 235. For example, pins (not shown) for fixing the fitting units 243 or threaded screws (not shown) for fixing the fitting units 243 may be used for this purpose.

As shown in FIG. 36B, the bearing surfaces 226 of the shaft portions 235 on the cylindrical portion 242 of the device 241-1 and the bearing surfaces 238 on the cylindrical portion 248 of the device 242-2 are contacted with each other. The bottoms 231 of the annular lands 229 of the cylindrical portion 248 and the fitting units 243 are contacted with each other. As described above, the separation of the fitting units 243 from the shaft portions 235 is prevented. Therefore, the submarine cable protecting device 241-2 cannot be detached from the previously installed submarine cable protecting device 241-1 after the device 241-2 and the device 241-1 are connected in series as described above.

In FIGS. 35A through 36B, the submarine cable 65 is omitted for the sake of convenience. Actually, the submarine cable 65 is enclosed in the submarine cable protecting device during the installing procedure.

Figure 38:
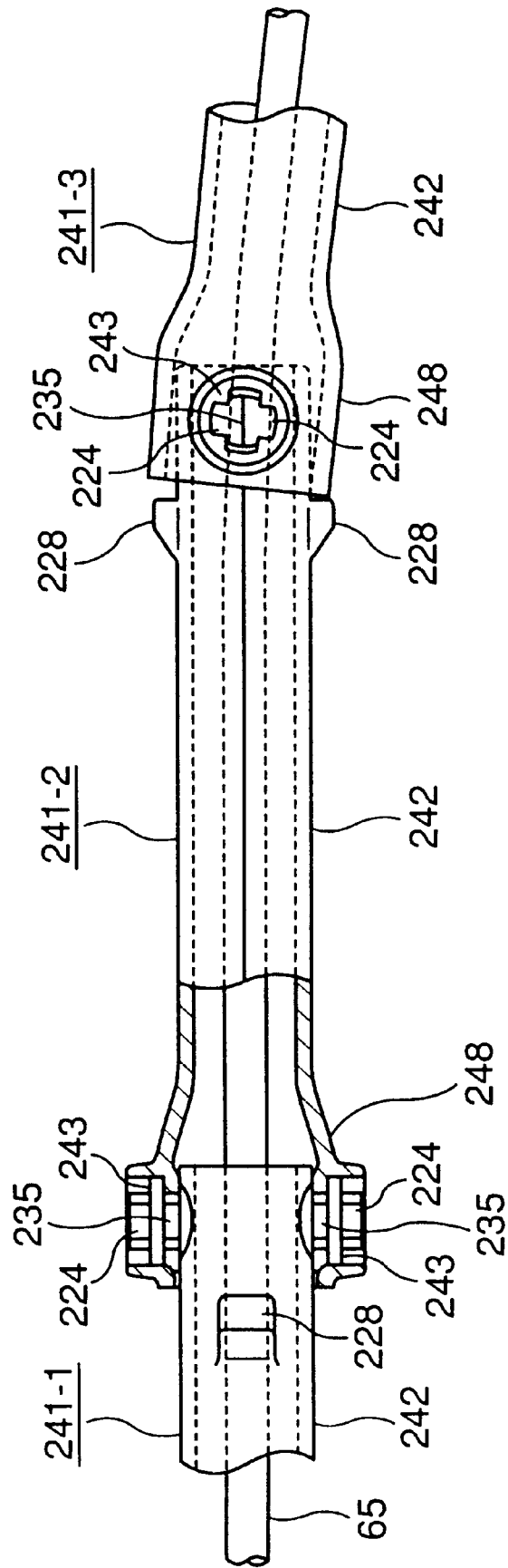
FIG. 38 is a diagram for explaining an installed condition of a plurality of pairs of the half members of the seventh embodiment which are installed in series.

FIG. 38 shows an installed condition of a plurality of pairs of the half members 221 of the seventh embodiment which are installed in series.

As shown in FIG. 38, a submarine cable protecting device 241-1, a submarine cable protecting device 241-2 and a submarine cable protecting device 241-3 are installed in series in this order, and the submarine cable 65 is enclosed therein. The above-described installing procedure is applicable to the installation of these devices. In FIG. 38, the cylindrical portion 242 and the cylindrical portion 248 of the device 241-2 are partially cut away.

Referring to FIG. 38, the submarine cable protecting device 241-1 at the front end of the submarine cable 65 is shown on the left side of FIG. 38. The submarine cable protecting device 241-2 shown in the middle of FIG. 38 is attached such that the cylindrical portion 248 of the device 241-2 is connected to the cylindrical portion 242 of the device 241-1. A pair of the fitting units 243 are attached to the cylindrical portion 248 where the devices 241-1 and 241-2 are connected in series. In this manner, the device 241-1 and the device 241-2 are installed in series and the submarine cable 65 is enclosed therein.

Further, the submarine cable protecting device 241-3 at the rear end of the submarine cable 65 shown on the right side of FIG. 28 is installed to the rear end of the previously installed device 241-2 in the same manner. By performing the same installing procedure, it is possible that a plurality of pairs of the half members 221 of the seventh embodiment be easily installed in series.

As shown in FIG. 38, the device 241-3, for example, is slightly rotatable around the central axis of the shaft portions 235 relative to the device 241-2. The range of the rotation of the device 241-3 around the central axis of the shaft portions 235 relative to the device 241-2 is restricted by the positioning projections 228.

Further, in the above-described embodiment, the central axis of the shaft portions 235 at the rear end of the cylindrical portion 242 and the central axis of the bearing hole 236 at the front end of the cylindrical portion 242 are at right angles to each other around the central axis of the cylindrical portion 242. The pairs of the half members 221 of the seventh embodiment are connected in series, and the direction of the central axis of the shaft portions 235 around the central axis of the cylindrical portion 242 is changed by 90 degrees for each pair.

Further, in the above-described embodiment, the pairs of the half members 221 cannot be rotated around the central axis of the submarine cable 65. It is possible to effectively prevent the submarine cable protecting device of this embodiment from laterally rolling on the sea bottom due to the influences of sea currents or the like.

Further, the present invention is not limited to the above-described embodiments, and various variations and modifications may be made without departing from the scope of the present invention.

For example, the half members 21 and 41 of the first embodiment of FIG. 13 and the half members 111 and 121 of the second embodiment of FIG. 21 can be connected in series. The half members 181 of the fifth embodiment of FIGS. 26A–26E and the half members 201 of the sixth embodiment of FIG. 32 can be connected in series. Further, other combinations of the half members of the above-described embodiments may be made.

Further, one end of the submarine cable protecting device of the present invention at which the inside spherical surface or the outside spherical surface is provided can be connected to the conventional submarine cable protecting device 9 of FIGS. 1 and 2 by using the additional half members of the present invention.

The above-mentioned additional half members include the additional half members 151 of FIG. 23 and the additional half members 171 of FIG. 25. Alternatively, belt-like fasteners may be used for connecting the submarine cable protecting device of the present invention and the conventional submarine cable protecting device 9 in series.

Further, the connecting unit of the present invention is not limited to the connecting unit of the fifth embodiment (the elements 184 and 187 in FIG. 28) and the connecting unit of the sixth embodiment (the elements 204 and 207 in FIG. 32). Alternatively, another connecting unit or connecting pins may be used for positioning the cylindrical portion of the submarine cable protecting device.

Further, the additional half members 151 of FIG. 23 and the additional half members 171 of FIG. 25 which are connected to the half members 21 and 41 in the above-described embodiments can be connected to any other submarine cable protecting devices including the half members 221 of the seventh embodiment of FIG. 38.

The handle portions 28 of the present invention are easily engaged with holes and stones at the locations susceptible to seashore waves or sea currents, and they serve to hold the submarine cable protecting device of the present invention at the installed location. Further, the handle portions 28 are useful for easy installation and easy carrying of the submarine cable protecting device of the present invention.

The outside spherical surfaces 23 and 43 of the above-described first embodiment include the parallel walls 24 and 44 on the sides thereof. However, such parallel walls are not necessarily needed if the outside spherical surfaces 23 and 43 can be easily inserted into the inside spherical surfaces 27 and 47 by using the installing procedure of FIG. 12 or FIG. 14.

What is claimed is:

1. A submarine cable protecting device in which a plurality of pairs of half members are connected in series, in each pair the half members being in parallel and coupled to each other to enclose a submarine cable therein, comprising:
    a generally hollow cylindrical portion provided in each of the half members for enclosing a submarine cable;
    an outside spherical surface at one end of each of the half members extending axially from one end of the cylindrical portion of the half member;
    an inside spherical surface provided at an other end of each of the half members, said inside spherical surface extending axially from the other end of the cylindrical portion of the half member, a continuous opening extending through each said pair from said one end to said other end;
    said inside spherical surface of one pair of said half members encompassing the outside spherical surface of another pair of said half members in a series arrangement of said pairs, said outside spherical surface not being detachable from said inside spherical surface when the two pairs are connected in series because said outside spherical surface cannot fit axially through said opening at said other end,
    the outside spherical surfaces of said one pair of half members having a reduced outside distance when said outside spherical surfaces of said one pair are in contact with each other at said one ends and when the inside spherical surfaces of said one pair of half members are separated from each other at said other ends, said outside spherical surfaces of said one pair being insertable through said opening at said other end into the inside spherical surfaces of said another pair of the half members, said one pair and said another pair of half members becoming connected in series when the inside spherical surfaces of the one pair of half members are moved into contact with each other.

2. The submarine cable protecting device according to claim 1, wherein each pair of the half members comprises:
    a coupling unit for coupling the pair of the half members to each other when the inside spherical surfaces of the pair of the half members are contacted with each other, said coupling unit being provided on one of the half members when the inside spherical surfaces of the half members are separated from each other, and said coupling unit being fitted into through holes of the other of the half members by an actuating force of the coupling unit when the inside spherical surfaces are contacted with each other.

3. The submarine cable protecting device according to claim 2, wherein said coupling unit comprises a spring part and a pair of coupling pins provided at ends of the spring part, said coupling pins being inserted into the through holes by an actuating force of said spring part when the inside spherical surfaces are contacted with each other.

4. The submarine cable protecting device according to claim 2, wherein said coupling unit comprises a leaf spring having rectangular holes at ends of the leaf spring, and a pair of cylindrical coupling pins having rectangular heads fitted into the rectangular holes of the leaf spring.

5. The submarine cable protecting device according to claim 2, wherein said coupling unit comprises a leaf spring having circular holes at ends of the leaf spring, and a pair of cylindrical coupling pins having circular heads fitted into the circular holes of the leaf spring.

6. The submarine cable protecting device according to claim 2, wherein said coupling unit comprises a leaf spring having circular holes at ends of the leaf spring, and a pair of rectangular connecting pins having circular heads fitted into the circular holes of the leaf spring.

7. The submarine cable protecting device according to claim 2, wherein said coupling unit comprises a pair of wire springs, each of said wire springs having fold-back portions at ends of the wire springs, and a pair of rectangular connecting pins each of said rectangular connecting pins having parallel grooves into which the fold-back portions of the wire springs are fitted.

8. The submarine cable protecting device according to claim 1, further comprising:

additional ones of said plurality of pairs of half members for enclosing both the inside spherical surfaces of one pair of the half members which are installed and the outside spherical surfaces of another pair of the half members which are installed.

9. The submarine cable protecting device according to claim 8, wherein each of said additional ones of said plurality of pairs of half members comprises:

a main cylindrical portion provided in a middle of said additional ones of said pairs of half members, said main cylindrical portion encompassing both said inside spherical surfaces and said outside spherical surfaces; and a pair of reduced cylindrical portions provided at ends of said main cylindrical portion, said reduced cylindrical portions enclosing cylindrical portions of said one pair of the half members and cylindrical portions of said another pair of the half members.

10. The submarine cable protecting device according to claim 8, wherein at least one pair of said additional half members has an axial length that is not equal to an axial length of the half members of at least one of said one pair and said another pair of half members.

11. The submarine cable protecting device according to claim 1, wherein each pair of the half members comprises:

a pair of first fitting surfaces provided on a bottom of one of the half members;

a pair of second fitting surfaces provided on a top of the other of the half members; and a connecting unit for positioning the cylindrical portions of the half members when the first fitting surfaces and the second fitting surfaces are contacted with each other such that the cylindrical portions are fixed to each other.

12. The submarine cable protecting device according to claim 11, wherein said connecting unit comprises:

a pair of pin insertion holes provided at portions of the first fitting surfaces; and a pair of connecting pins provided at corresponding portions of the second fitting surfaces, said connecting pins being fitted into said pin insertion holes when the first fitting surfaces and the second fitting surfaces are contacted with each other.

13. The submarine cable protecting device according to claim 1, wherein each pair of the half members comprises:

a coupling unit for coupling the pair of the half members to each other when the inside spherical surfaces of the half members are contacted with each other, said coupling unit being provided on one of the half members when the inside spherical surfaces of the half members are separated from each other, and said coupling unit comprising:

a spring part having holes formed at ends of the spring part; and a pair of coupling pins having heads fitted into said holes of said spring part, said coupling pins being fitted into through holes of the other of the half members by an actuating force of said spring part when the inside spherical surfaces are contacted with each other.

14. The submarine cable protecting device according to claim 1, wherein the inside spherical surfaces of each pair of the half members are substantially an inside surface of a major spherical segment obtained by cutting off part of a first sphere by a plane, and the outside spherical surfaces of each pair of the half members are substantially an outside surface of a minor spherical segment obtained by cutting off part of a second, smaller sphere by a plane.

15. The submarine cable protecting device according to claim 1, wherein each pair of the half members comprises:

a pair of through holes provided on sides of one of the half members;

a pair of first slanting surfaces provided on the bottom of the sides of said one of the half members; and a coupling unit having a spring part and a pair of coupling pins provided at ends of the spring part.

16. The submarine cable protecting device according to claim 15, wherein said coupling unit is provided on the other of the half members when the inside spherical surfaces of the half members are separated from each other, said coupling pins being inserted into said through holes by an actuating force of said spring part when the inside spherical surfaces are contacted with each other, said coupling pins including a pair of second slanting surfaces which are connected to the first slanting surfaces when the coupling pins are inserted into the through holes.

* * * * *